US011640042B2

(12) United States Patent
Yang et al.

(10) Patent No.: US 11,640,042 B2
(45) Date of Patent: May 2, 2023

(54) VANITY MIRROR

(71) Applicant: simplehuman, LLC, Torrance, CA (US)

(72) Inventors: Frank Yang, Rancho Palos Verdes, CA (US); William Patrick Conley, Long Beach, CA (US); Adam Sbeglia, Fullerton, CA (US)

(73) Assignee: simplehuman, LLC, Torrance, CA (US)

( * ) Notice: Subject to any disclaimer, the term of this patent is extended or adjusted under 35 U.S.C. 154(b) by 472 days.

(21) Appl. No.: 16/803,895

(22) Filed: Feb. 27, 2020

(65) Prior Publication Data

US 2020/0278514 A1    Sep. 3, 2020

Related U.S. Application Data

(60) Provisional application No. 62/812,865, filed on Mar. 1, 2019.

(51) Int. Cl.
*A45D 42/16* (2006.01)
*G02B 7/182* (2021.01)
(Continued)

(52) U.S. Cl.
CPC ............ *G02B 7/182* (2013.01); *A45D 42/16* (2013.01); *A47G 1/00* (2013.01); *F16M 11/06* (2013.01); *F16M 11/18* (2013.01); *F21V 3/02* (2013.01); *F21V 23/0471* (2013.01); *G02B 6/001* (2013.01); *A47G 2001/007* (2013.01); *F16M 2200/021* (2013.01); *F21W 2131/302* (2013.01); *F21Y 2115/10* (2016.08); *G02B 7/1827* (2013.01)

(58) Field of Classification Search
None
See application file for complete search history.

(56) References Cited

U.S. PATENT DOCUMENTS

D44,537 S     8/1913   McIsaac
D65,759 S    10/1924   Short
(Continued)

FOREIGN PATENT DOCUMENTS

CA    3037704 A1 *  9/2019 ............ A45D 42/00
CN       3044427D       5/1996
(Continued)

OTHER PUBLICATIONS

U.S. Appl. No. 29/723,452, filed Feb. 6, 2020, Yang et al.
(Continued)

*Primary Examiner* — Steven M Marsh
(74) *Attorney, Agent, or Firm* — Knobbe, Martens, Olson & Bear, LLP

(57) ABSTRACT

A mirror assembly can include a housing, a mirror, and a light source. In certain embodiments, the mirror is rotatable within a support portion of the mirror assembly. In some embodiments, the mirror assembly includes a light pipe configured to emit a substantially constant amount of light along a periphery of the mirror. In some embodiments, the mirror assembly includes a sensor assembly. The sensor assembly can be configured to adjust the amount of emitted light based on the position of a user in relation to the mirror.

20 Claims, 34 Drawing Sheets

(51) Int. Cl.
*A47G 1/00* (2006.01)
*F16M 11/06* (2006.01)
*F16M 11/18* (2006.01)
*F21V 3/02* (2006.01)
*F21V 23/04* (2006.01)
*F21V 8/00* (2006.01)
*F21Y 115/10* (2016.01)
*F21W 131/302* (2006.01)

(56) References Cited

U.S. PATENT DOCUMENTS

| | | |
|---|---|---|
| 1,541,451 A | 6/1925 | Wallace |
| 2,004,166 A | 6/1935 | Low |
| 2,235,281 A | 3/1941 | Carver |
| 2,292,059 A | 8/1942 | Charles |
| D163,481 S | 5/1951 | Rauh |
| 2,687,674 A | 8/1954 | Emilea |
| D208,234 S | 8/1967 | Ely |
| D209,077 S | 10/1967 | Andre |
| D213,392 S | 2/1969 | Andre |
| D216,414 S | 12/1969 | Hanson |
| 3,623,356 A | 11/1971 | Bisberg |
| 3,732,702 A | 5/1973 | Desch |
| 3,794,828 A | 2/1974 | Arpino |
| 3,949,767 A | 4/1976 | Rose |
| D243,301 S | 2/1977 | Ravn |
| D243,478 S | 2/1977 | Jones |
| D254,208 S | 2/1980 | Breslow |
| 4,278,870 A | 7/1981 | Carleton et al. |
| D261,845 S | 11/1981 | Wachtel |
| D266,028 S | 8/1982 | Boyd |
| 4,491,899 A | 1/1985 | Fleming |
| D284,483 S | 7/1986 | Yang |
| D290,662 S | 7/1987 | Basil et al. |
| D307,358 S | 4/1990 | Gerton |
| D309,833 S | 8/1990 | Wahl |
| D317,531 S | 6/1991 | Evans |
| 5,025,354 A | 6/1991 | Kondo |
| 5,164,861 A | 11/1992 | Katz |
| D335,580 S | 5/1993 | Gaullier |
| 5,267,081 A | 11/1993 | Pein |
| 5,267,786 A | 12/1993 | Aisley |
| 5,392,162 A | 2/1995 | Glucksman |
| D378,159 S | 2/1997 | Mulkey |
| D379,125 S | 5/1997 | Simjian |
| D391,773 S | 3/1998 | Zaidman et al. |
| D409,003 S | 5/1999 | Scavini |
| 5,979,976 A | 11/1999 | Ferencik |
| 5,984,485 A | 11/1999 | Poli et al. |
| 6,042,242 A | 3/2000 | Chang |
| D425,313 S | 5/2000 | Zadro |
| D426,182 S | 6/2000 | Brown |
| 6,106,121 A | 8/2000 | Buckley et al. |
| D431,375 S | 10/2000 | Zadro |
| 6,158,877 A | 12/2000 | Zadro |
| 6,206,530 B1 | 3/2001 | Eberts |
| D442,371 S | 5/2001 | Eberts |
| 6,231,992 B1 | 5/2001 | Niebauer et al. |
| 6,241,357 B1 | 6/2001 | Lee |
| 6,270,240 B1 | 8/2001 | Inoue |
| 6,273,585 B1 | 8/2001 | Wu |
| 6,305,809 B1 | 10/2001 | Zadro |
| D454,701 S | 3/2002 | Eric |
| D459,094 S | 6/2002 | Stone et al. |
| 6,420,682 B1 | 7/2002 | Sellgren et al. |
| 6,466,826 B1 | 10/2002 | Nishihira et al. |
| D465,490 S | 11/2002 | Wei |
| 6,496,107 B1 | 12/2002 | Himmelstein |
| 6,553,123 B1 | 4/2003 | Dykstra |
| D474,432 S | 5/2003 | Good |
| 6,560,027 B2 | 5/2003 | Meine |
| 6,594,630 B1 | 7/2003 | Zlokarnik et al. |
| 6,604,836 B2 | 8/2003 | Carlucci et al. |
| 6,676,272 B2 | 1/2004 | Chance |
| D486,964 S | 2/2004 | Prince et al. |
| D488,626 S | 4/2004 | Kruger |
| D492,230 S | 6/2004 | Berger |
| 6,830,154 B2 | 12/2004 | Zadro |
| 6,848,822 B2 | 2/2005 | Ballen et al. |
| D505,555 S | 5/2005 | Snell |
| 6,886,351 B2 | 5/2005 | Palfy et al. |
| D508,883 S | 8/2005 | Falconer |
| D509,369 S | 9/2005 | Snell |
| D511,413 S | 11/2005 | Yue |
| 6,961,168 B2 | 11/2005 | Agrawal et al. |
| D512,841 S | 12/2005 | Dirks |
| 7,004,599 B2 | 2/2006 | Mullani |
| 7,048,406 B1 | 5/2006 | Shih |
| 7,054,668 B2 | 5/2006 | Endo et al. |
| D524,469 S | 7/2006 | Pitot et al. |
| 7,090,378 B1 | 8/2006 | Zadro |
| D532,981 S | 12/2006 | Zadro |
| D540,549 S | 4/2007 | Yue |
| 7,233,154 B2 | 6/2007 | Groover et al. |
| D546,567 S | 7/2007 | Bhavnani |
| D547,555 S | 7/2007 | Lo et al. |
| D558,987 S | 1/2008 | Gildersleeve |
| D562,571 S | 2/2008 | Pitot |
| 7,341,356 B1 | 3/2008 | Zadro |
| 7,347,573 B1 | 3/2008 | Isler |
| 7,349,144 B2 | 3/2008 | Varaprasad et al. |
| D568,081 S | 5/2008 | Thompson et al. |
| D569,671 S | 5/2008 | Thompson et al. |
| 7,370,982 B2 | 5/2008 | Bauer et al. |
| D572,024 S | 7/2008 | Shapiro |
| 7,393,115 B2 | 7/2008 | Tokushita et al. |
| D574,159 S | 8/2008 | Howard |
| 7,417,699 B2 | 8/2008 | Yun et al. |
| 7,423,522 B2 | 9/2008 | O'Brien et al. |
| 7,435,928 B2 | 10/2008 | Platz |
| 7,446,924 B2 | 11/2008 | Schofield et al. |
| 7,455,412 B2 | 11/2008 | Rottcher |
| D582,984 S | 12/2008 | Mininger et al. |
| D584,516 S | 1/2009 | Otomo |
| 7,500,755 B2 | 3/2009 | Ishizaki et al. |
| 7,513,476 B1 | 4/2009 | Huang |
| 7,551,354 B2 | 6/2009 | Horsten et al. |
| 7,570,413 B2 | 8/2009 | Tonar et al. |
| 7,589,893 B2 | 9/2009 | Rottcher |
| 7,621,651 B2 | 11/2009 | Chan et al. |
| 7,626,655 B2 | 12/2009 | Yamazaki et al. |
| 7,636,195 B2 | 12/2009 | Nieuwkerk et al. |
| 7,651,229 B1 | 1/2010 | Rimback et al. |
| 7,679,809 B2 | 3/2010 | Tonar et al. |
| 7,728,927 B2 | 6/2010 | Nieuwkerk et al. |
| 7,805,260 B2 | 9/2010 | Mischel, Jr. et al. |
| D625,930 S | 10/2010 | Merica |
| 7,813,023 B2 | 10/2010 | Baur |
| 7,813,060 B1 | 10/2010 | Bright et al. |
| 7,826,123 B2 | 11/2010 | McCabe et al. |
| 7,853,414 B2 | 12/2010 | Mischel, Jr. et al. |
| 7,855,755 B2 | 12/2010 | Weller et al. |
| 7,856,248 B1 | 12/2010 | Fujisaki |
| 7,859,737 B2 | 12/2010 | McCabe et al. |
| 7,859,738 B2 | 12/2010 | Baur et al. |
| 7,864,399 B2 | 1/2011 | McCabe et al. |
| D635,009 S | 3/2011 | Paterson |
| 7,898,719 B2 | 3/2011 | Schofield et al. |
| 7,903,335 B2 | 3/2011 | Nieuwkerk et al. |
| 7,916,129 B2 | 3/2011 | Lin et al. |
| 7,916,380 B2 | 3/2011 | Tonar et al. |
| 7,953,648 B2 | 5/2011 | Vock |
| D639,077 S | 6/2011 | Debretton Gordon |
| 7,978,393 B2 | 7/2011 | Tonar et al. |
| 8,004,741 B2 | 8/2011 | Tonar et al. |
| D647,444 S | 10/2011 | Manukyan et al. |
| D649,790 S | 12/2011 | Pitot |
| 8,083,386 B2 | 12/2011 | Lynam |
| D652,220 S | 1/2012 | Pitot |
| 8,099,247 B2 | 1/2012 | Mischel, Jr. et al. |
| D656,979 S | 4/2012 | Yip et al. |
| D657,425 S | 4/2012 | Podd |
| D657,576 S | 4/2012 | Pitot |

(56) References Cited

U.S. PATENT DOCUMENTS

| | | |
|---|---|---|
| 8,154,418 B2 | 4/2012 | Peterson et al. |
| 8,162,502 B1 | 4/2012 | Zadro |
| D658,604 S | 5/2012 | Egawa et al. |
| D660,367 S | 5/2012 | Podd |
| D660,368 S | 5/2012 | Podd |
| D660,369 S | 5/2012 | Podd |
| 8,179,236 B2 | 5/2012 | Weller et al. |
| 8,179,586 B2 | 5/2012 | Schofield et al. |
| 8,194,133 B2 | 6/2012 | DeWind et al. |
| 8,228,588 B2 | 7/2012 | McCabe et al. |
| D665,030 S | 8/2012 | Podd |
| D666,010 S | 8/2012 | Farley |
| D670,087 S | 11/2012 | Walker |
| 8,335,032 B2 | 12/2012 | McCabe et al. |
| 8,348,441 B1 | 1/2013 | Skelton |
| 8,356,908 B1 | 1/2013 | Zadro |
| 8,379,289 B2 | 2/2013 | Schofield et al. |
| 8,382,189 B2 | 2/2013 | Li et al. |
| 8,393,749 B1 | 3/2013 | Daicos |
| 8,400,704 B2 | 3/2013 | McCabe et al. |
| D679,101 S | 4/2013 | Pitot |
| D679,102 S | 4/2013 | Gilboe et al. |
| D680,755 S | 4/2013 | Gilboe et al. |
| 8,503,062 B2 | 8/2013 | Baur et al. |
| 8,506,096 B2 | 8/2013 | McCabe et al. |
| 8,508,832 B2 | 8/2013 | Baumann et al. |
| 8,511,841 B2 | 8/2013 | Varaprasad et al. |
| D688,883 S | 9/2013 | Gilboe et al. |
| D689,701 S | 9/2013 | Mischel, Jr. et al. |
| 8,559,092 B2 | 10/2013 | Bugno et al. |
| 8,559,093 B2 | 10/2013 | Varaprasad et al. |
| 8,585,273 B2 | 11/2013 | Pokrovskiy et al. |
| D699,448 S | 2/2014 | Yang et al. |
| D699,952 S | 2/2014 | Yang et al. |
| 8,649,082 B2 | 2/2014 | Baur |
| D701,050 S | 3/2014 | Yang et al. |
| D701,507 S | 3/2014 | Cope |
| 8,705,161 B2 | 4/2014 | Schofield et al. |
| 8,727,547 B2 | 5/2014 | McCabe et al. |
| D707,454 S | 6/2014 | Pitot |
| 8,743,051 B1 | 6/2014 | Moy et al. |
| D711,871 S | 8/2014 | Daniel |
| D711,874 S | 8/2014 | Cope |
| 8,797,627 B2 | 8/2014 | McCabe et al. |
| D712,963 S | 9/2014 | Fleet |
| 8,880,360 B2 | 11/2014 | Mischel, Jr. et al. |
| 8,910,402 B2 | 12/2014 | Mischel, Jr. et al. |
| D727,630 S | 4/2015 | Zadro |
| D729,525 S | 5/2015 | Tsai |
| D729,527 S | 5/2015 | Tsai |
| D730,065 S | 5/2015 | Tsai |
| 9,090,211 B2 | 7/2015 | McCabe et al. |
| D736,001 S | 8/2015 | Yang et al. |
| D737,059 S | 8/2015 | Tsai |
| D737,060 S | 8/2015 | Yang et al. |
| 9,105,202 B2 | 8/2015 | Mischel, Jr. et al. |
| D737,580 S | 9/2015 | Tsai |
| D738,118 S | 9/2015 | Gyanendra et al. |
| 9,170,353 B2 | 10/2015 | Chang |
| 9,173,509 B2 | 11/2015 | Mischel, Jr. et al. |
| 9,174,578 B2 | 11/2015 | Uken et al. |
| 9,205,780 B2 | 12/2015 | Habibi et al. |
| 9,232,846 B2 | 1/2016 | Fung |
| 9,254,789 B2 | 2/2016 | Anderson et al. |
| D751,829 S | 3/2016 | Yang et al. |
| D754,446 S | 4/2016 | Yang et al. |
| 9,327,649 B2 | 5/2016 | Habibi |
| 9,341,914 B2 | 5/2016 | McCabe et al. |
| 9,347,660 B1 | 5/2016 | Zadro |
| D764,592 S | 8/2016 | Zenoff |
| 9,499,103 B2 | 11/2016 | Han |
| 9,510,711 B2 | 12/2016 | Tsibulevskiy et al. |
| 9,528,695 B2 | 12/2016 | Adachi et al. |
| D776,945 S | 1/2017 | Yang |
| D779,836 S | 2/2017 | Bailey |
| D785,345 S | 5/2017 | Yang et al. |
| 9,638,410 B2 | 5/2017 | Yang et al. |
| 9,694,751 B2 | 7/2017 | Lundy, Jr. et al. |
| 9,709,869 B2 | 7/2017 | Baumann et al. |
| D793,099 S | 8/2017 | Bailey |
| D801,060 S | 10/2017 | Hollinger |
| 9,827,912 B2 | 11/2017 | Olesen et al. |
| 9,845,537 B2 | 12/2017 | Mischel, Jr. et al. |
| 9,878,670 B2 | 1/2018 | McCabe et al. |
| 9,897,306 B2 | 2/2018 | Yang et al. |
| 9,921,390 B1 | 3/2018 | Mischel, Jr. et al. |
| 9,933,595 B1 | 4/2018 | Mischel, Jr. et al. |
| D816,350 S | 5/2018 | Yang et al. |
| 10,016,045 B1 | 7/2018 | Hollinger |
| 10,023,123 B2 | 7/2018 | Takada et al. |
| 10,029,616 B2 | 7/2018 | McCabe et al. |
| 10,035,461 B2 | 7/2018 | Lin et al. |
| D825,940 S | 8/2018 | Liu |
| 10,076,176 B2 | 9/2018 | Yang et al. |
| D830,706 S | 10/2018 | Pitot |
| 10,161,622 B1 | 12/2018 | Frazier |
| D845,652 S | 4/2019 | Yang et al. |
| D846,288 S | 4/2019 | Yang et al. |
| D848,158 S | 5/2019 | Yang et al. |
| 10,524,591 B2 | 1/2020 | Kim |
| D874,161 S | 2/2020 | Yang et al. |
| D874,162 S | 2/2020 | Greenwalt |
| 10,652,447 B1 | 5/2020 | Pestl et al. |
| D891,121 S | 7/2020 | Zhao et al. |
| D891,123 S | 7/2020 | Li et al. |
| D891,125 S | 7/2020 | Liu |
| 10,702,043 B2 | 7/2020 | Yang et al. |
| D892,508 S | 8/2020 | Yang |
| 10,746,394 B2 | 8/2020 | Yang et al. |
| D897,694 S | 10/2020 | Lin |
| D897,695 S | 10/2020 | Yang |
| D898,386 S | 10/2020 | Huang |
| D898,387 S | 10/2020 | Yang |
| 10,869,537 B2 | 12/2020 | Yang et al. |
| 11,013,307 B2 | 5/2021 | Yang et al. |
| 11,026,497 B2 | 6/2021 | Yang et al. |
| D925,928 S | 7/2021 | Yang et al. |
| D927,863 S | 8/2021 | Yang et al. |
| 11,371,692 B2 | 6/2022 | Yang et al. |
| 2002/0196333 A1 | 12/2002 | Gorischek |
| 2003/0030063 A1 | 2/2003 | Sosniak et al. |
| 2003/0031010 A1 | 2/2003 | Sosniak et al. |
| 2003/0065515 A1 | 4/2003 | Yokota |
| 2003/0133292 A1 | 7/2003 | Mueller et al. |
| 2003/0223250 A1 | 12/2003 | Ballen et al. |
| 2004/0020509 A1 | 2/2004 | Waisman |
| 2004/0125592 A1 | 7/2004 | Nagakubo et al. |
| 2004/0156133 A1 | 8/2004 | Vernon |
| 2004/0173498 A1 | 9/2004 | Lee |
| 2005/0036300 A1 | 2/2005 | Dowling et al. |
| 2005/0068646 A1 | 3/2005 | Lev et al. |
| 2005/0146863 A1 | 7/2005 | Mullani |
| 2005/0156753 A1 | 7/2005 | Deline et al. |
| 2005/0243556 A1 | 11/2005 | Lynch |
| 2005/0270769 A1 | 12/2005 | Smith |
| 2005/0276053 A1 | 12/2005 | Nortrup et al. |
| 2006/0077654 A1 | 4/2006 | Krieger et al. |
| 2006/0132923 A1 | 6/2006 | Hsiao et al. |
| 2006/0164725 A1 | 7/2006 | Horsten et al. |
| 2006/0184993 A1 | 8/2006 | Goldthwaite et al. |
| 2006/0186314 A1 | 8/2006 | Leung |
| 2007/0050211 A1 | 3/2007 | Mandi |
| 2007/0097672 A1 | 5/2007 | Benn |
| 2007/0146616 A1 | 6/2007 | Nouchi et al. |
| 2007/0159846 A1 | 7/2007 | Nishiyama et al. |
| 2007/0183037 A1 | 8/2007 | De Boer et al. |
| 2007/0263999 A1 | 11/2007 | Keam |
| 2007/0297189 A1 | 12/2007 | Wu et al. |
| 2008/0078796 A1 | 4/2008 | Parsons |
| 2008/0088244 A1 | 4/2008 | Morishita |
| 2008/0118080 A1 | 5/2008 | Gratke et al. |
| 2008/0130305 A1 | 6/2008 | Wang et al. |
| 2008/0244940 A1 | 10/2008 | Mesika |
| 2008/0258110 A1 | 10/2008 | Oshio |

(56) References Cited

U.S. PATENT DOCUMENTS

| | | |
|---|---|---|
| 2008/0265799 A1 | 10/2008 | Sibert |
| 2008/0271354 A1 | 11/2008 | Bostrom |
| 2008/0294012 A1 | 11/2008 | Kurtz et al. |
| 2008/0297586 A1 | 12/2008 | Kurtz et al. |
| 2008/0298080 A1 | 12/2008 | Wu et al. |
| 2009/0027902 A1 | 1/2009 | Fielding et al. |
| 2009/0194670 A1 | 8/2009 | Rains, Jr. et al. |
| 2009/0207339 A1 | 8/2009 | Ajichi et al. |
| 2009/0213604 A1 | 8/2009 | Uken |
| 2009/0244740 A1 | 10/2009 | Takayanagi et al. |
| 2009/0301927 A1 | 12/2009 | Fvlbrook et al. |
| 2010/0033988 A1 | 2/2010 | Chiu et al. |
| 2010/0118422 A1 | 5/2010 | Holacka |
| 2010/0118520 A1 | 5/2010 | Stern et al. |
| 2010/0296298 A1 | 11/2010 | Martin, Jr. |
| 2010/0309159 A1 | 12/2010 | Roettcher |
| 2011/0058269 A1 | 3/2011 | Su |
| 2011/0074225 A1 | 3/2011 | Delnoij et al. |
| 2011/0080374 A1 | 4/2011 | Feng et al. |
| 2011/0194200 A1 | 8/2011 | Greenlee |
| 2011/0211079 A1 | 9/2011 | Rolston |
| 2011/0273659 A1 | 11/2011 | Sobecki |
| 2011/0283577 A1 | 11/2011 | Cornelissen et al. |
| 2012/0056738 A1 | 3/2012 | Lynam |
| 2012/0080903 A1 | 4/2012 | Li et al. |
| 2012/0081915 A1 | 4/2012 | Foote et al. |
| 2012/0229789 A1 | 9/2012 | Kang et al. |
| 2012/0307490 A1 | 12/2012 | Ellis |
| 2013/0026512 A1 | 1/2013 | Tsai |
| 2013/0077292 A1 | 3/2013 | Zimmerman |
| 2013/0120989 A1 | 5/2013 | Sun et al. |
| 2013/0190845 A1 | 7/2013 | Liu et al. |
| 2013/0235610 A1* | 9/2013 | Yang ............... G02B 6/0096 362/135 |
| 2014/0240964 A1 | 8/2014 | Adachi et al. |
| 2015/0060431 A1 | 3/2015 | Yang et al. |
| 2015/0203970 A1 | 7/2015 | Mischel, Jr. et al. |
| 2015/0205110 A1 | 7/2015 | Mischel, Jr. et al. |
| 2015/0305113 A1 | 10/2015 | Ellis |
| 2016/0045015 A1 | 2/2016 | Baldwin |
| 2016/0070085 A1 | 3/2016 | Mischel, Jr. et al. |
| 2016/0082890 A1 | 3/2016 | Habibi et al. |
| 2016/0178964 A1 | 6/2016 | Sakai et al. |
| 2016/0193902 A1 | 7/2016 | Hill et al. |
| 2016/0200256 A1 | 7/2016 | Takada et al. |
| 2016/0243989 A1 | 8/2016 | Habibi |
| 2017/0028924 A1 | 2/2017 | Baur et al. |
| 2017/0139302 A1 | 5/2017 | Tonar |
| 2017/0158139 A1 | 6/2017 | Tonar et al. |
| 2017/0164719 A1 | 6/2017 | Wheeler |
| 2017/0190290 A1 | 7/2017 | Lin et al. |
| 2017/0257543 A1 | 9/2017 | Rowles et al. |
| 2017/0285392 A1 | 10/2017 | Hirata et al. |
| 2017/0297495 A1 | 10/2017 | Lundy, Jr. et al. |
| 2017/0297498 A1 | 10/2017 | Larson et al. |
| 2017/0313251 A1 | 11/2017 | Uken et al. |
| 2017/0349102 A1 | 12/2017 | Habibi |
| 2018/0012526 A1 | 1/2018 | Dunn et al. |
| 2018/0015880 A1 | 1/2018 | Olesen et al. |
| 2018/0017823 A1 | 1/2018 | Saenger Nayver et al. |
| 2018/0032227 A1 | 2/2018 | Broxson |
| 2018/0050641 A1 | 2/2018 | Lin et al. |
| 2018/0105114 A1 | 4/2018 | Geerlings et al. |
| 2018/0147993 A1 | 5/2018 | McCabe et al. |
| 2018/0162269 A1 | 6/2018 | Bredeweg et al. |
| 2018/0172265 A1 | 6/2018 | Yang et al. |
| 2018/0027041 A1 | 9/2018 | Lyle et al. |
| 2018/0251069 A1* | 9/2018 | LaCross ............... B60R 1/12 |
| 2018/0263362 A1* | 9/2018 | Yang ............... A45D 42/16 |
| 2019/0000219 A1 | 1/2019 | Yang et al. |
| 2019/0003699 A1 | 1/2019 | Mondora |
| 2019/0054863 A1 | 2/2019 | Roth |
| 2019/0246772 A1 | 8/2019 | Yang et al. |
| 2019/0291647 A1 | 9/2019 | Yang et al. |
| 2019/0328161 A1 | 10/2019 | Wei |
| 2019/0351830 A1 | 11/2019 | Bosma et al. |
| 2020/0008592 A1 | 1/2020 | Meyers et al. |
| 2020/0085170 A1 | 3/2020 | Yang et al. |
| 2020/0278514 A1* | 9/2020 | Yang ............... F16M 11/18 |
| 2020/0333934 A1* | 10/2020 | Pestl ............... F21V 33/0056 |
| 2021/0137266 A1* | 5/2021 | Pestl ............... G06F 3/147 |
| 2021/0196028 A1 | 7/2021 | Yang et al. |
| 2021/0307491 A1 | 10/2021 | Yang et al. |
| 2021/0364892 A1* | 11/2021 | Copeland ............... A45D 42/00 |
| 2022/0282861 A1 | 9/2022 | Yang et al. |

FOREIGN PATENT DOCUMENTS

| | | |
|---|---|---|
| CN | 2379638 Y | 5/2000 |
| CN | 3357935 D | 3/2004 |
| CN | 2852806 Y | 1/2007 |
| CN | 2925206 Y | 7/2007 |
| CN | 300746709 D | 2/2008 |
| CN | 101160003 | 4/2008 |
| CN | 101382025 A | 3/2009 |
| CN | 300973066 S | 8/2009 |
| CN | 300983799 S | 8/2009 |
| CN | 300990023 S | 8/2009 |
| CN | 301001894 S | 9/2009 |
| CN | 301108997 S | 1/2010 |
| CN | 301209880 S | 5/2010 |
| CN | 101787830 A | 7/2010 |
| CN | 301278203 S | 7/2010 |
| CN | 301340032 S | 9/2010 |
| CN | 301502988 S | 4/2011 |
| CN | 102057756 A | 5/2011 |
| CN | 301583101 S | 6/2011 |
| CN | 301811715 S | 1/2012 |
| CN | 302103915 S | 10/2012 |
| CN | 302140631 S | 10/2012 |
| CN | 302140632 S | 10/2012 |
| CN | 302337970 S | 3/2013 |
| CN | 302363850 S | 3/2013 |
| CN | 302396166 S | 4/2013 |
| CN | 302442518 S | 5/2013 |
| CN | 103300590 A | 9/2013 |
| CN | 302638575 S | 11/2013 |
| CN | 302668773 S | 12/2013 |
| CN | 106377049 A | 2/2017 |
| CN | 108185741 | 6/2018 |
| CN | 207626762 U | 7/2018 |
| CN | 211577476 U | 9/2020 |
| CN | 211600392 U | 9/2020 |
| CN | 111759073 A | 10/2020 |
| CN | 306124222 | 10/2020 |
| DE | 2924529 A1 | 1/1981 |
| DE | 29904039 U1 | 6/1999 |
| DE | 20014279 U1 | 2/2001 |
| DE | 102004042929 A1 | 3/2006 |
| DE | 202007013393 U1 | 12/2007 |
| DE | 102006060781 A1 | 4/2008 |
| DE | 202009004795 U1 | 9/2009 |
| DE | 202010000170 U1 | 7/2010 |
| DE | 202012103555 U1 | 2/2014 |
| EP | 1792553 A2 | 6/2007 |
| FR | 2 788 951 | 8/2000 |
| GB | 2346206 A | 8/2000 |
| GB | 2363712 | 1/2002 |
| JP | S49-131097 | 11/1974 |
| JP | 55-129073 | 10/1980 |
| JP | 59-166769 | 11/1984 |
| JP | 3057292 | 12/1998 |
| JP | 2003-79495 | 3/2003 |
| JP | 2004-290531 A | 10/2004 |
| JP | 2006-202602 A | 8/2006 |
| JP | 2008-073174 A | 4/2008 |
| JP | 2013-172802 | 9/2013 |
| JP | 2014-212075 | 11/2014 |
| KR | 30-0318286 | 2/2003 |
| KR | 2003-0017261 A | 3/2003 |
| KR | 30-0330692 | 8/2003 |
| KR | 30-0507873 | 10/2008 |
| KR | 30-0586341 | 1/2011 |

(56) References Cited

FOREIGN PATENT DOCUMENTS

| KR | 30-0692452 | 5/2013 |
|---|---|---|
| KR | 30-0712086 | 10/2013 |
| WO | WO 2018/045649 A1 | 3/2018 |

OTHER PUBLICATIONS

Jerdon, Model JRT910CL 5X Magnified Lighted Tabletop Rectangular Mirror, Chrome Finish, 67.2 Ounce, https://www.amazon.com/Jerdon-JRT910CL-Magnified-Tabletop-Rectangular/dp/B00N1WE3UC?th=1, Jun. 2015, in 8 pages.
Pinterest, Plug-in wall-mount makeup mirror has adjustment handle, https://www.pinterest.com/pin/856035841641838288/?d=t&mt=login, in 3 pages.
Sharper Image, Model JRT718CL Product Specification, Slimline Series LED Lighted Wall Mount Mirror, copyright 2015, https://www.ameraproducts.com/Shard/ProductLitirature/Jerdon/JRT718CL-amera.pdf, in 1 pages.
Sharper Image, Model JRT950NL , Slimline LED Lighted Tabletop 8X Magnification Mirror, https://www.amazon.com/Sharper-Imange-JRT950NL-Slimline-Magnification/dp/B015W76T3M?th=1, Jan. 20, 2016, in 8 pages.
Zadro Z'fogless Mirror with Light, available from internet at http://www.amazon.com/Zadro-1X-Zfogless-Adjustable-Magnification/dp/B000ARWLIW/ref=sr_1_16?s=beauty&ie=UTF8&qid=1439229012&sr=1-16&keywords=zadro+lighted+fogless+mirror, apparently available Nov. 27, 2006, site visited Aug. 10, 2015.
U.S. Appl. No. 15/073,990, filed Mar. 18, 2016, Yang et al.
U.S. Appl. No. 29/631,301, filed Dec. 28, 2017, Yang et al.
U.S. Appl. No. 29/662,730 issued as U.S. Pat. No. D. 874,161, filed Sep. 7, 2018, Yang et al.
U.S. Appl. No. 29/689,860, filed May 2, 2019, Yang et al.
Advanced Lighting Guidelines, 1993 (second edition), Chapter entitled, "Occupant Sensors", Published by California Energy Commission (CEC Pub.), in 14 pages.
Kore, "Building an intelligent voice controlled mirror," retrieved from the internet on Jul. 11, 2019: https://medium.com/@akshaykore/building-an-intelligent-voice-controlled-mirror-2edbc7d62c9e, Jun. 26, 2017, in 10 pages.
Simple Human Vanity Mirror, available from internet at http://www.bedbathandbeyond.com/store/products/ simplehuman-reg-5x-sensor-vanity-mirror/1041483503?categoryId=12028, apparently available Dec. 19, 2013, site visited Dec. 2, 2014.
Simple Human Sensor Mirror, Internet Archive Wayback Machine webpage capture of http://www.tuvie.com/stainless-steel-sensor-mirror-by-simplehuman/, apparently available Jan. 27, 2013, site visited Dec. 2, 2014.
Simplehuman Mini Sensor Mirror, available from internet at http://www.amazon.com/gp/product/B00FZ3MFAA/ref=pd_lpo_sbs_dp_ss_2?pf_rd_p=1944579862&pf_rd_s=lpo-top-stripe-1&pf_rd_t=201&pf_rd_i=B00M8MC5H4&pf_rd_m=ATVPDKIKX0DER&pf_rd_r=0RHFJEABM9QKSWJKK99N#Ask, apparently available Mar. 11, 2014, site visited Jan. 8, 2015.
Simplehuman Sensor Mirror, available from internet at http://www.amazon.com/simplehuman-Sensor-Sensor-Activated-Lighted-Magnification/dp/B00M8MC5H4#customerReviews, apparently available Dec. 31, 2014, site visited Jan. 8, 2015.
Simplehuman Wall Mount Mirror, available from internet at http://www.amazon.com/simplehuman-Wall-Mount-Sensor-Mirror/dp/B00FN92ELG#customerReviews, available at least as early as Jan. 31, 2013, site visited Jan. 8, 2015.
Simplehuman Wide View Sensor Mirror, available from internet at http://www.amazon.com/simplehuman-Wide-View-Sensor-Mirror/dp/B01C2RXD7K, site visited Aug. 9, 2016.
Simplehuman Sensor Mirror Pro Wide-View, available from internet at http://www.simplehuman.com/wide-view-sensor-mirror, site visited Aug. 9, 2016.
Brookstone Shower Mirror, available from internet at http://www.brookstone.com/9-Lighted-Fogless-Shower-Mirror?bkiid=?SubCategory_Bath_Spa_Mirrors_Lighting_Makeup_Mirrors%7CSubCategoryWidget%7C608364p&catId=n/, apparently available Jan. 15, 2013, site visited Dec. 2, 2014.
Jerdon Wall Mounted Mirror, available from internet at http://www.amazon.com/Jerdon-HL1016NL-9-5-Inch-Lighted-Magnification/dp/B00413G9K2/ref=sr_1_26?ie=UTF8&qid=1420579897&sr=8-26&keywords=wall+mounted+mirror#customerReviews, apparently available Feb. 21, 2009, site visited Jan. 8, 2015.
Jerdon Wall Mounted Mirror, available from internet at http://www.amazon.com/Jerdon-JD7C-9-Inch-Lighted-Magnification/dp/B001DKVC08/ref=sr_1_54?ie=UTF8&qid=1420580127&sr=8-54&keywords=wall+mounted+mirror, apparently available Oct. 6, 2010, site visited Jan. 8, 2015.

\* cited by examiner

VANITY MIRROR

This application claims the benefit of U.S. Provisional Application No. 62/812,865, filed Mar. 1, 2019, which is hereby incorporated by reference in its entirety herein.

FIELD

The present disclosure relates to reflective devices, such as mirrors.

DESCRIPTION OF THE RELATED ART

Vanity mirrors are mirrors that are typically used for reflecting an image of a user during personal grooming, primping, cosmetic care, or the like. Vanity mirrors are available in different configurations, such as free-standing mirrors, hand-held mirrors, mirrors connected to vanity tables, bathroom wall mirrors, car mirrors, and/or mirrors attached to or produced by electronic screens or devices.

SUMMARY

Some embodiments disclosed herein pertain to a mirror assembly comprising one or more of a base, a reflective face connected with the base, a sensor (e.g., a proximity sensor or a reflective type sensor), an electronic processor, and/or a light source. In some embodiments, the reflective face of the mirror assembly can provide magnification. For example, in some embodiments, the reflective face can be parabolic and can magnify the reflected image. In some embodiments, the mirror assembly comprises a plurality of reflective faces, positioned on the same and/or on different (e.g. opposing) sides of the mirror assembly. In some embodiments, where more than one reflective face is present, at least two reflective faces can have a different level of magnification from each other. In some embodiments, where more than one reflective face is present on the same side of the mirror assembly, the reflective faces can have a different level of magnification from one other.

Any of the embodiments described above, or described elsewhere herein, can include one or more of the following features.

In some embodiments, the mirror assembly comprises a front side and a back side and a housing portion. In some embodiments, the mirror assembly comprises a support portion. In some embodiments, the mirror assembly comprises a support portion coupled to a housing portion. In some embodiments, the mirror assembly comprises a mirror head. In some embodiments, the mirror head comprises a first side and a second side. In some embodiments, the mirror head is coupled to a support portion of the mirror assembly. In some embodiments, the mirror head is coupled to the support portion via a swivel joint. In some embodiments, the support portion is positioned around at least a portion of a periphery of the mirror head. In some embodiments, the support portion is positioned around the entire perimeter (or around substantially the entire perimeter) of the mirror head and/or of a reflective face of the mirror head. In some embodiments, the swivel joint allows rotation of the mirror head about an axis formed by the swivel joint. In some embodiments, a first mirror and a second mirror (e.g., the reflective face of a mirror) can be viewed separately from the front side of the mirror assembly by rotating the mirror head about the axis of the swivel joint. In some embodiments, when the first mirror is facing the front side of the mirror assembly, the second mirror is directed toward the back side of the mirror assembly. In some embodiments, when the second mirror is facing the front side of the mirror assembly, the first mirror is directed toward the back side of the mirror assembly.

In some embodiments, the mirror assembly further comprises a light source. In some embodiments, the mirror assembly further comprises a light path having a length. In some embodiments, the light path and/or a length of the light path is positioned around at least a portion of a periphery of the first mirror when the first mirror is facing the front side of the mirror assembly. In some embodiments, the light path and/or the length of the light path is positioned around at least a portion of a periphery of the second mirror when the second mirror is facing the front side of the mirror assembly. In some embodiments, the light path of the mirror assembly is disposed on the support portion such that when the either the first or second mirror is facing the front side of the mirror, the light path (or a length of the light path) is positioned around at least a portion of the periphery of the first or second mirror when facing the front side of the mirror.

In some embodiments, at least one of the first mirror and the second mirror are magnifying mirrors. In some embodiments, the first mirror and the second mirror have different magnification powers. In some embodiments, the first mirror has at least a 5× magnification power. In some embodiments, the second mirror has essentially no magnification power.

In some embodiments, the mirror assembly further comprising a third mirror disposed on the second side of the mirror head. In some embodiments, the second mirror and third mirror together form a face of the mirror head. In some embodiments, one or both the second mirror and the third mirror are magnifying mirrors. In some embodiments, the second and third mirror have different magnification powers.

In some embodiments, the second mirror and the third mirror have respective focal points that are generally coincident. In some embodiments, a user can focus on a body part by simply looking from the second mirror to the third mirror, or vice versa, without having to reposition the body to bring the body part back into focus.

In some embodiments, as described elsewhere herein, the second mirror can be a partial shape. In some embodiments, the third mirror is also a coinciding partial shape and, when placed together with second mirror, the second and third mirror provide a complete shape. In some embodiments, for example, the second mirror and the third mirror are shaped to provide a substantially circular mirrored mirror head face. For example, in some embodiments, the second mirror forms a portion of a mirrored circle (e.g., a semi-circle, a part of a circle, not a full or complete circle, etc.) and the third mirror forms a coinciding portion of a mirrored circle (e.g., a semi-circle, a part of a circle, not a full or complete circle, etc.) such that, after the second and third circle are combined, they provide a substantially complete circle. In some embodiments, the second mirror can be other shapes (e.g., a partial square, a partial rectangular, etc.) and the third mirror can fit into a portion of the partial shape to complete the shape (e.g., resulting in a square or substantially square mirror face, a rectangular or substantially rectangular mirror face, an oval or substantially oval mirror face, a rhomboidal or substantially rhomboidal mirror face, a triangular or substantially triangular face, etc.).

In some embodiments, the mirror head further comprises a handle that can be used to move the mirror head about the axis of the swivel joint. In some embodiments, the handle engages the support portion via a first bay when the first mirror is facing the frontside of the mirror assembly. In some embodiments, the handle engages the support portion via a second bay when the second mirror is facing the frontside of the mirror assembly. In some embodiments, the handle abuts the support portion preventing 360° movement of the mirror head about the swivel joint axis. In some embodiments, the handle allows 360° movement of the mirror head about the swivel joint axis. The handle can alternatively or additionally be provided with one or more internal electronic components (e.g., one or more switches or dials) in electronic communication with a controller that are configured to actuate or adjust one or more electronic parameters or features of the mirror assembly, such as the intensity, brightness, color of the light emitted by the mirror, color temperature, and/or any other adjustable light variable disclosed herein, by actuating the handle in one or more additional ways (e.g., twisting, pushing, and/or pulling the handle, etc.). In some embodiments, the handle can be actuated to turn the power to the mirror assembly on or off. In some embodiments, a first handle can be provided to change the orientation of the mirror head and a second handle can be provided to actuate or adjust one or more of the electronic parameters or features of the mirror.

In some embodiments, the light source comprises at least a first light emitting diode and a second light emitting diode disposed to emit light in a general direction along the length of the light path. In some embodiments, the mirror assembly comprises a controller configured to adjust light emitted from the light source to simulate a plurality of different lighting environments including natural sunlight and indoor light.

In some embodiments, the controller comprises a touch sensor (e.g., a capacitive touch sensor) in electronic communication with the light source and configured to transmit information sent by a user to the light source. In some embodiments, the capacitive touch sensor is located on a portion of the support portion of the mirror assembly.

Some embodiments disclosed herein pertain to a mirror assembly comprising one or more of a mirror head, a housing, a light source, and a light path. In some embodiments, the mirror head is coupled to the housing. In some embodiments, the mirror head comprises a first side comprising a first mirror and a second mirror. In some embodiments, a user can focus on a body part by simply looking from the first mirror to the second mirror, or vice versa, without having to reposition the body to bring the body part back into focus. In some embodiments, the first mirror and the second mirror have respective focal points that are generally coincident. In some embodiments, the light path has a length and is positioned around at least a portion of a periphery of the first mirror.

In some embodiments, the mirror assembly further comprises a support portion and a housing portion. In some embodiments, the mirror head is coupled to the support portion via a swivel joint and the support portion is coupled to the housing portion. In some embodiments, the support portion is positioned around at least a portion of a periphery of the mirror head. In some embodiments, the mirror head further comprises a second side comprising a third mirror. In some embodiments, the swivel joint allows rotation of the mirror head about an axis formed by the swivel joint. In some embodiments, the first mirror and the third mirror can separately be viewed from a front side of the mirror assembly by rotating the mirror head about the axis of the swivel joint within the support portion. In some embodiments, the mirror head further comprises a handle or other actuator that can be used to move the mirror head about the axis of the swivel joint. In some embodiments, the handle engages the support portion via a first bay when the first mirror is facing a frontside of the mirror assembly and via a second bay when the third mirror is facing the frontside of the mirror assembly. In some embodiments, the handle abuts the support portion preventing 360° rotation of the mirror head within the support portion and about a swivel joint axis.

Some embodiments disclosed herein pertain to a mirror assembly comprising one or more of housing portion, a mirror head, a light source, and a light path. In some embodiments, the mirror head is coupled to the housing. In some embodiments, the mirror head comprises a first side. In some embodiments, the first side of the mirror head comprises a first mirror and a second mirror separated by a seam. In some embodiments, the at least one of the first mirror and the second mirror are magnifying mirrors and have different magnification powers. In some embodiments, the first mirror and second mirror are positioned with respect to each in such a way that, as an object is moved from a first position where the object's reflection is present in the first mirror to a second position where object's reflection is present in the second mirror, at least a portion of the reflection of the object is uninterrupted as the object's reflection crosses and/or transitions across the seam. In some embodiments, the light path has a length and is positioned around and/or adjacent to at least a portion of a periphery of the first mirror. In some embodiments, a user can focus on a body part by simply looking from the first mirror to the second mirror, or vice versa, without having to reposition the body to bring the body part back into focus.

In some embodiments, the mirror assembly further comprises a support portion and a housing portion, the mirror head being coupled to the support portion via a swivel joint and the support portion being coupled to the housing portion. In some embodiments, the support portion is positioned around at least a portion of a periphery of the mirror head. In some embodiments, the mirror head further comprises a second side comprising a third mirror. In some embodiments, the swivel joint allows rotation of the mirror head about an axis formed by the swivel joint. In some embodiments, the first mirror and the third mirror can separately be viewed from a front side of the mirror assembly by rotating the mirror head about the axis of the swivel joint within the support portion. In some embodiments, the mirror head further comprises a handle that can be used to move the mirror head about the axis of the swivel joint. In some embodiments, the handle engages the support portion via a first bay when the first mirror is facing a frontside of the mirror assembly and via a second bay when the third mirror is facing the frontside of the mirror assembly. In some embodiments, the handle abuts the support portion preventing 360° rotation of the mirror head within the support portion and about a swivel joint axis.

Some embodiments pertain to a method of manufacturing a mirror assembly. In some embodiments, the method comprises coupling a support portion to a housing portion. In some embodiments, the method comprises coupling a rotatable joint to the support portion. In some embodiments, the method comprises coupling a mirror head to the support portion via the rotatable joint. In some embodiments, the method comprises coupling a first mirror to a first side of the mirror head and a second mirror to the second side of the mirror head. In some embodiments, the method comprises disposing a light source on or within the support portion.

In some embodiments, the method further comprises coupling a third mirror to the second side of the mirror head. In some embodiments, the method further comprises adjusting the focal point of the second mirror and the third mirror so that they are roughly, approximately, or substantially coincident.

In some implementations, the sensor is configured to detect, and generate a signal indicative of, the distance between an object and the sensor. The electronic processor can be configured to receive the signal from the sensor and can control the light source, for example, by varying the quantity or quality of light emitted by the light source depending on the detected distance between the object and the sensor.

In some embodiments, a mirror assembly comprises a base, a reflection face, one or more light sources, and a light-conveying pathway such as a light pipe. In combination, the light sources and light pipe reflect substantially constant light along a length of the light pipe. For example, in certain embodiments, the light conveying pathway is generally disposed around some, substantially all, or all of a periphery of the reflection face.

Certain aspects of this disclosure are directed toward a mirror assembly. The mirror assembly can include a mirror coupled with the housing portion, and a light source disposed at a periphery of the mirror. The mirror assembly can include a light path, such as a light pipe, having a length and positioned around at least a portion of the periphery of the mirror. The mirror assembly can include a light scattering region, such as a plurality of light scattering elements disposed along the length of the light pipe. The light scattering elements can have a pattern density that varies depending, at least in part, on the distance along the light path from the light source. The light scattering elements can be configured to encourage a portion of the light impacting the light scattering elements to be emitted out of the light path along a desired portion of the length of the light path. The amount of light scattering elements on the light path can vary depending, at least in part, on the distance along the light path from the light source. In certain embodiments, the pattern density can be less dense in a region generally adjacent the light source and more dense in a region spaced away from, or generally opposite from, the light source along the periphery of the mirror, thereby scattering the light to a greater degree as the intensity of the light diminishes further from the light source, and facilitating a substantially constant amount of light emitted along the length of the light pipe.

Any of the vanity mirror features, structures, steps, or processes disclosed in this specification can be included in any embodiment. The light scattering elements in the region generally adjacent the light source can be smaller compared to the light scattering elements in the region spaced from, or generally opposite from, or generally furthest from, the light source. The light source can be positioned near an upper portion of the mirror. The light pipe can be disposed along substantially all of the periphery of the mirror. The light source can emit light in a direction generally orthogonal to a standard viewing direction of the mirror. The light pipe can be generally circular and can include a first end and a second end. The light source can emit light into the first end, and another light source can emit light into the second end. In some embodiments, the light scattering elements can be generally uniformly distributed along at least a portion of the light pipe.

Certain aspects of this disclosure are directed toward a mirror assembly including a mirror coupled with a housing portion and one or more light sources disposed at a periphery of the mirror. The one or more light sources can be configured to emit light in a direction generally orthogonal to a primary viewing direction of the mirror. The light pipe can have a length and can be disposed along substantially all of the periphery of the mirror. The light pipe can be configured to receive light from the one or more light sources and distribute the light generally consistently along the length, thereby providing a generally constant level of illumination to the periphery of the mirror and/or to the object reflected in the mirror.

Any of the vanity mirror features, structures, steps, or processes disclosed in this specification can be included in any embodiment. The one or more light sources can include a first light source configured to project light in a first direction around the periphery of the mirror and a second light source configured to project light in a second direction around the periphery of the mirror. The one or more light sources can be two light sources. Each of the light sources can use less than or equal to about three watts of power. The one or more light sources can have a color rendering index of at least about 90. The one or more light sources can include light emitting diodes. The light pipe can be configured to transmit at least about 95% of the light emitted from the one or more light sources.

Certain aspects of this disclosure are directed toward methods of manufacturing a mirror assembly, such as any of the mirror assemblies disclosed in this specification. The methods can include coupling a mirror and a housing portion. The method can include disposing a light source at a periphery of the mirror. The method can include positioning a light pipe around at least a portion of the periphery of the mirror. The method can include disposing a plurality of light scattering elements along the length of a light pipe. In certain embodiments, the plurality of light scattering elements can have a pattern density. The light scattering elements can be configured to encourage a portion of the light impacting the light scattering elements to be emitted out of the light pipe. The pattern density can be less dense in a region generally adjacent the light source, and the pattern density can be more dense in a region generally opposite from, spaced from, or furthest from, the light source along the periphery of the mirror, thereby facilitating a substantially constant amount of light emitted along the length of the light pipe. In certain embodiments, the method can include positioning the light source near an upper portion of the mirror. In certain embodiments, the method can include disposing the light pipe around substantially all of the periphery of the mirror. In certain embodiments, the method can include positioning the light source to emit light in a direction generally orthogonal to a main viewing direction of the mirror. In certain embodiments, the method can include positioning the light source to emit light into a first end of the light pipe and positioning another light source to emit light into a second end of the light pipe. In certain embodiments, the method can include disposing the light scattering elements in a generally uniform pattern along at least a portion of the light pipe.

Certain aspects of this disclosure are directed toward a mirror assembly having a housing portion, a mirror, one or more light sources, a proximity sensor, and an electronic processor. The mirror can be coupled with the housing portion. The one or more light sources can be disposed at a periphery of the mirror. The proximity sensor can be configured to detect an object within a sensing region. The proximity sensor can be configured to generate a signal indicative of a distance between the object and the proximity sensor. The electronic processor can be configured to generate an electronic signal to the one or more light sources for emitting a level of light that varies depending on the distance between the object and the sensor.

Any of the vanity mirror features, structures, steps, or processes disclosed in this specification can be included in any embodiment. The proximity sensor can be positioned generally near a top region of the mirror. The electronic processor can be configured to generate an electronic signal to the one or more light sources to deactivate if the proximity sensor does not detect the presence and/or movement of the object for a predetermined period of time. The proximity sensor can be configured to have increased sensitivity after the proximity sensor detects the object (e.g., by increasing the trigger zone distance, by increasing the sensitivity to movement within a trigger zone, and/or by increasing the time period until deactivation). The mirror assembly can include an ambient light sensor configured to detect a level of ambient light. In some embodiments, the sensing region can extend from about 0 degrees to about 45 degrees downward relative to an axis extending from the proximity sensor. The proximity sensor can be mounted at an angle relative to a viewing surface of the mirror. The mirror assembly can include a lens cover positioned near the proximity sensor. In certain embodiments, a front surface of the lens cover can be positioned at an angle relative to the proximity sensor. The mirror assembly can include a light pipe having a length and being disposed along substantially all of the periphery of the mirror. The light pipe can be configured to receive light from the one or more light sources and distribute the light generally consistently along the length, thereby providing a substantially constant level of illumination to the periphery of the mirror.

Certain aspects of this disclosure are directed toward a method of manufacturing a mirror assembly. The method can include coupling a mirror with a housing portion. The method can include disposing one or more light sources at a periphery of the mirror. The method can include configuring a proximity sensor to generate a signal indicative of a distance between an object and the proximity sensor. The method can include configuring an electronic processor to generate an electronic signal to the one or more light sources for emitting a level of light that varies depending on the distance between the object and the sensor.

Any of the vanity mirror features, structures, steps, or processes disclosed in this specification can be included in any embodiment. The method of manufacturing the mirror assembly can include positioning the proximity sensor generally near a top region of the mirror. The method can include configuring the electronic processor to generate an electronic signal to the one or more light sources to deactivate if the proximity sensor does not detect the object for a period of time. The method can include configuring the proximity sensor to have increased sensitivity after the proximity sensor detects the object. The method can include configuring an ambient light sensor to detect a level of ambient light. The method can include configuring the proximity sensor to detect an object within a sensing region extending from about 0 degrees to about 45 degrees downward relative to an axis extending from the proximity sensor. The method can include mounting the proximity sensor at an angle relative to a viewing surface of the mirror. The method can include positioning a lens cover near the proximity sensor. In certain embodiments, the method can include positioning a front surface of the lens cover at an angle relative to the proximity sensor. The method can include disposing a light pipe along substantially all of the periphery of the mirror. The light pipe can be configured to receive light from the one or more light sources and distribute the light generally consistently along the length, thereby providing a substantially constant level of illumination to the periphery of the mirror.

Certain aspects of the present disclosure may be directed to a mirror assembly including a mirror head having a front side and a back side, a housing portion, and/or a support portion coupled to the housing portion and positioned around at least a portion of a periphery of the mirror head. The mirror assembly may also include a pivot assembly configured to allow rotation of the mirror head about an axis formed by the pivot assembly, and a drive assembly. The drive assembly may be disposed within the mirror head, support portion, housing portion, or anywhere in the mirror assembly. The drive assembly may be configured to rotate the mirror head about the axis formed by the pivot assembly. The drive assembly may include an actuator (e.g., button, dial, capacitive touch sensor, motion sensor, etc.) configured to initiate the drive assembly to rotate, tilt, flip, or otherwise move the mirror head together with or relative to the support portion along a transverse, longitudinal, or other axis of the mirror assembly. The actuator may or may not require user contact to control operations of the mirror assembly. In some configurations, the drive assembly includes a motor and a drive shaft. The drive shaft may be a flexible or rigid cable. The drive shaft may be directly or indirectly connected to the pivot assembly along or offset from the axis formed by the pivot assembly. In some configurations, the mirror assembly may include a bridge member through which the drive shaft extends. The bridge member may be configured to stop rotation of the mirror head when the drive shaft contacts an end of the bridge member. In some configurations, the mirror assembly includes a sensing element (e.g., potentiometer) configured to provide an indication of a position of the mirror head. The mirror assembly may include a controller configured to stop rotation of the mirror head based on the indication of the position of the mirror head. In some configurations, the mirror assembly may include a clutch mechanism configured to receive torque from the drive assembly to rotate the mirror head, the clutch mechanism being configured to move relative to the drive assembly when the mirror head is rotated generally without operation of the drive assembly. In some configurations, the mirror assembly may include a display. The display may be mounted within the mirror head such that content on the display can be viewed through a mirror on the front side of the mirror head. The display is activated by a proximity sensor, actuator, or other control. In some configurations, the mirror assembly may include a second actuator (e.g., button, dial, capacitive touch sensor, motion sensor, etc.) configured activate and/or control content on the display.

Certain aspects of the present disclosure may be directed to a mirror assembly having a mirror head comprising a front side and a back side, a housing portion, and/or a support portion coupled to the housing portion and positioned around at least a portion of a periphery of the mirror head, the support portion comprising at least one light source configured to emit light. The mirror head may include an actuator (e.g., button, dial, capacitive touch sensor, motion sensor, etc.) configured to control one or more operations of the mirror assembly. In some embodiments, the actuator may be the sole actuator on the mirror assembly configured to control mirror operations. The actuator may or may not require user contact to control operations of the mirror assembly. The actuator may initiate rotation of the mirror head between the front side and the back side and/or control a parameter of the light emitted from the at least one light source. The mirror assembly may include a pivot assembly configured to allow rotation of the mirror head about an axis formed by the pivot assembly and a drive assembly disposed within the mirror head, support portion, housing portion, or other portion of the mirror assembly. The drive assembly may be directly or indirectly connected to the drive assembly. The drive assembly may be configured to rotate the mirror head about the axis formed by the pivot assembly. The drive assembly may include a motor and a drive shaft that is directly or indirectly connected to the pivot assembly. In some configurations, the mirror assembly includes a sensing element (e.g., potentiometer) configured to provide an indication of a position of the mirror head. The mirror assembly may include a controller configured to stop rotation of the mirror head based on the indication of the position of the mirror head. In some configurations, the mirror assembly may include a clutch mechanism configured to move relative to the drive assembly when the mirror head is rotated generally without operation of the drive assembly. In some configurations, the mirror assembly may include a display. One or more display parameters may be controlled by the actuator, an additional actuator, or the display itself.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable.

BRIEF DESCRIPTION OF THE DRAWINGS

The above-mentioned and other features of the mirror assembly disclosed herein are described below with reference to the drawings of certain embodiments. The illustrated embodiments are intended to illustrate, but not to limit the present disclosure. The drawings contain the following Figures.

DETAILED DESCRIPTION OF CERTAIN EMBODIMENTS

Figure 1:
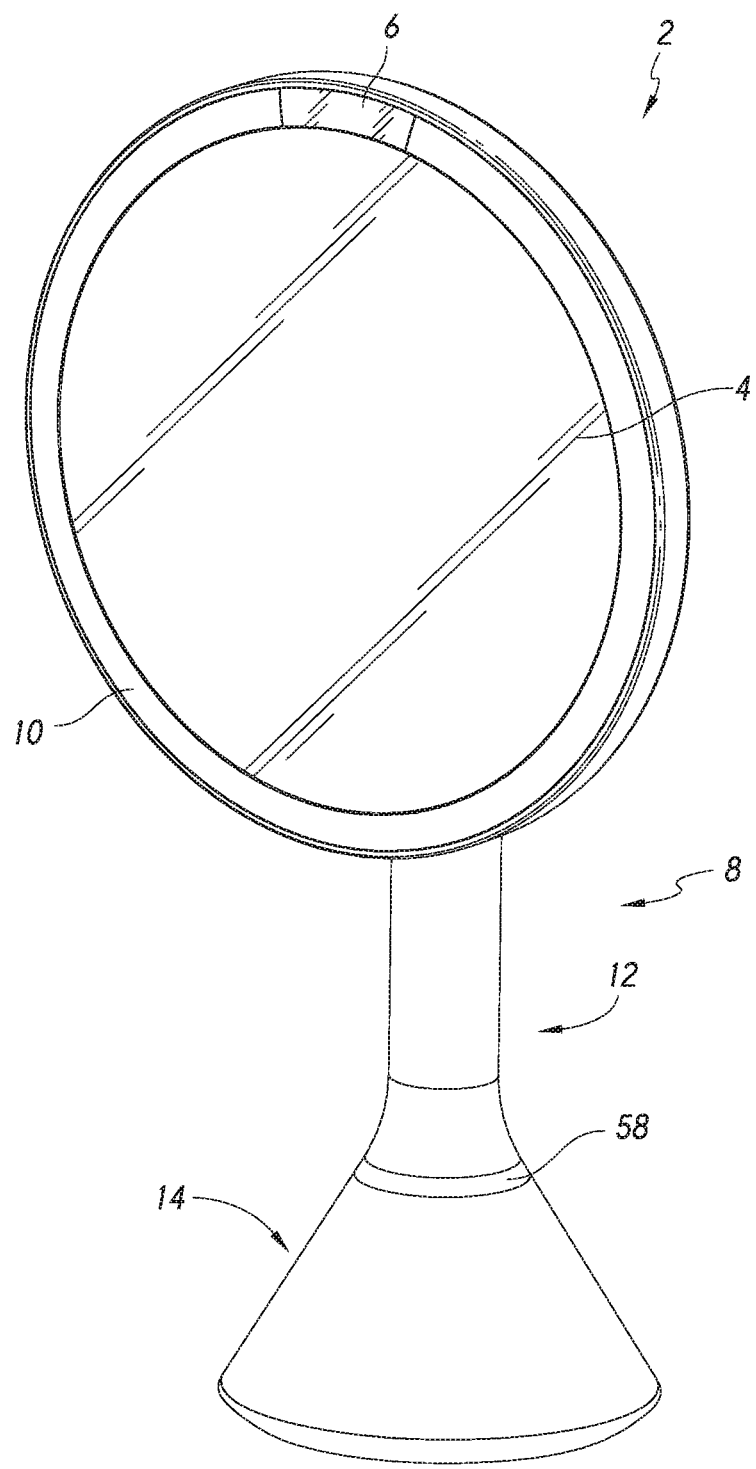
FIG. 1 illustrates a perspective view of an embodiment of a mirror assembly.
Figure 2:
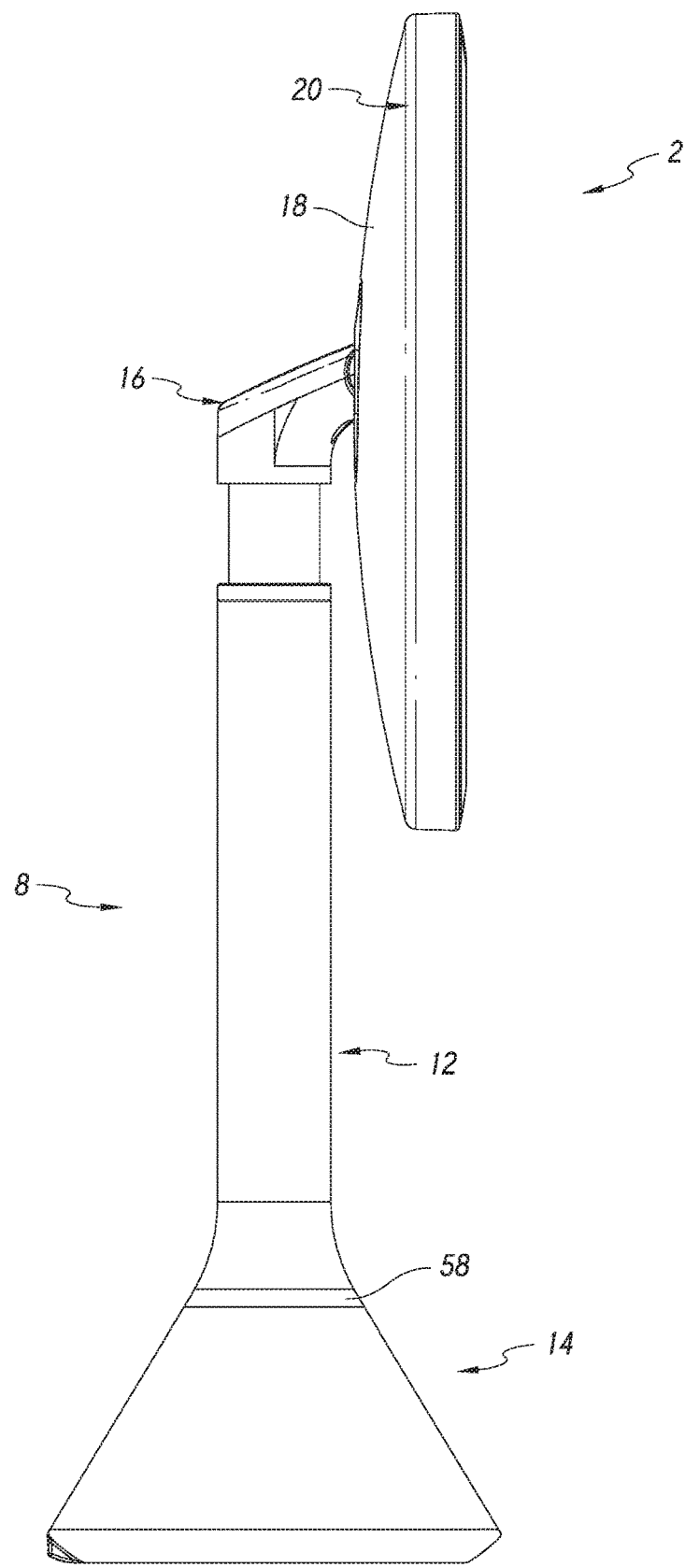
FIG. 2 illustrates a side view of the embodiment of FIG. 1.
Figure 3:
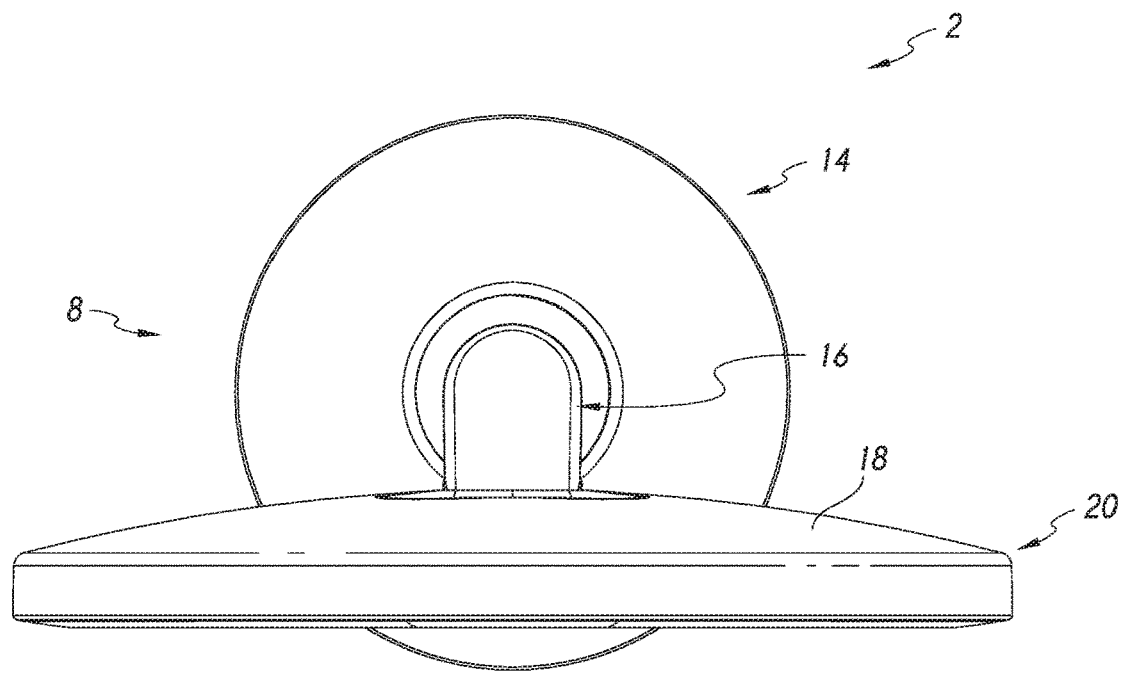
FIG. 3 illustrates a top view of the embodiment of FIG. 1.
Figure 4:
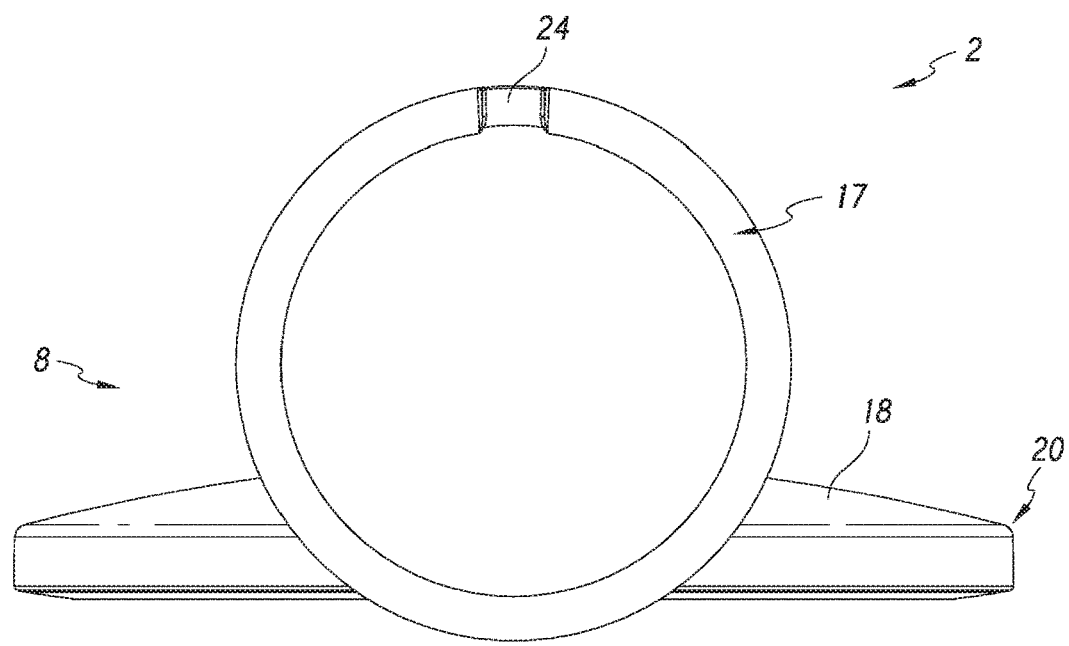
FIG. 4 illustrates a bottom view of the embodiment of FIG. 1.
Figure 5:
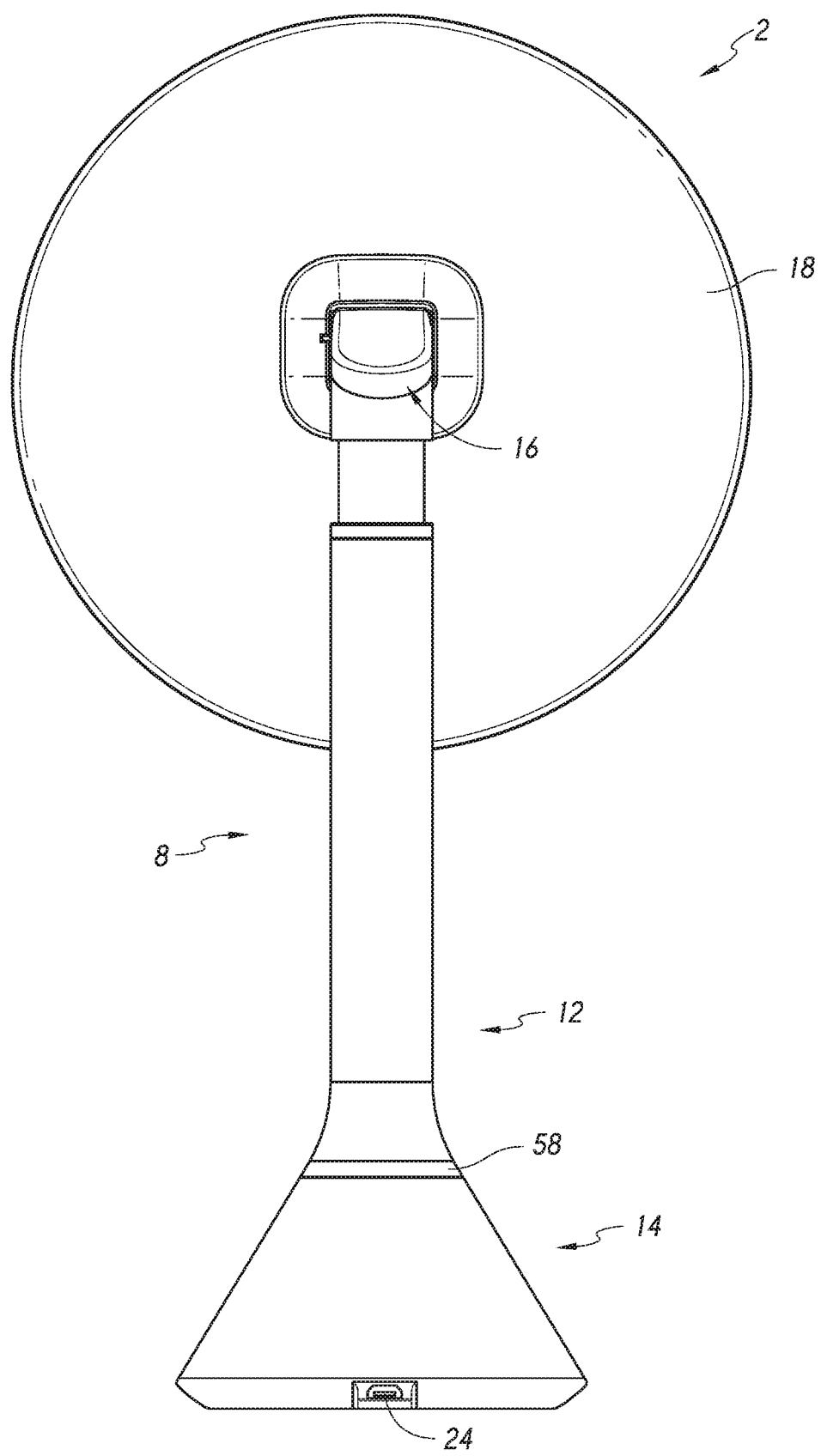
FIG. 5 illustrates a rear view of the embodiment of FIG. 1.

Certain embodiments of a mirror assembly are disclosed in the context of a portable, free-standing vanity mirror, as it has particular utility in this context. However, the various aspects of the present disclosure can be used in many other contexts as well, such as wall-mounted mirrors, mirrors mounted on articles of furniture, automobile vanity mirrors (e.g., mirrors located in sun-visors), and otherwise. None of the features described herein are essentially or indispensable. Any feature, structure, or step disclosed herein can be replaced with or combined with any other feature, structure, or step disclosed herein, or omitted. While some implementations described herein provide various dimensions and qualities of a single mirror, it is to be appreciated that the various dimensions and qualities can be applied to another mirror in the mirror assembly and/or to multiple mirrors of the mirror assembly (e.g., in mirror assemblies having multiple mirrors). Moreover, as described elsewhere herein, different mirrors can be combined to provide a mirror assembly with a plurality of different mirror qualities in different mirrors of the assembly. For instance, in some embodiments, where multiple mirror surfaces are present in a mirror assembly, a mirror having one shape is combined with a mirror having a different shape in a mirror assembly. In some embodiments, a mirror having one tint is combined with a mirror having a different tint in a mirror assembly. In some embodiments, a mirror having one power of magnification is combined with another mirror having a different magnification. In some embodiments, a mirror having one size is combined with another mirror having a different size. This ability to combine different mirror features can help provide multiple options of use for a user of the mirror assembly.

As shown in FIGS. 1-5, the mirror assembly 2 can include a housing portion 8 and a visual image reflective surface, such as a mirror 4. The housing portion 8 can include a support portion 20, a shaft portion 12, and/or a base portion 14. The housing portion 8 can also include a pivot portion 16 connecting the support portion 20 and the shaft portion 12. The pivot portion 16 can include one or more of a ball joint (e.g., or another joint allowing multidirectional movement), one or more hinges, or otherwise. Certain components of the housing portion 8 can be integrally formed or separately formed and connected together to form the housing portion 8. The housing 8 can include plastic, stainless steel, aluminum, or other suitable materials, and/or one or more compressible materials, such as rubber, nylon, and/or plastic, on at least a portion of its outer surface.

Figure 9:
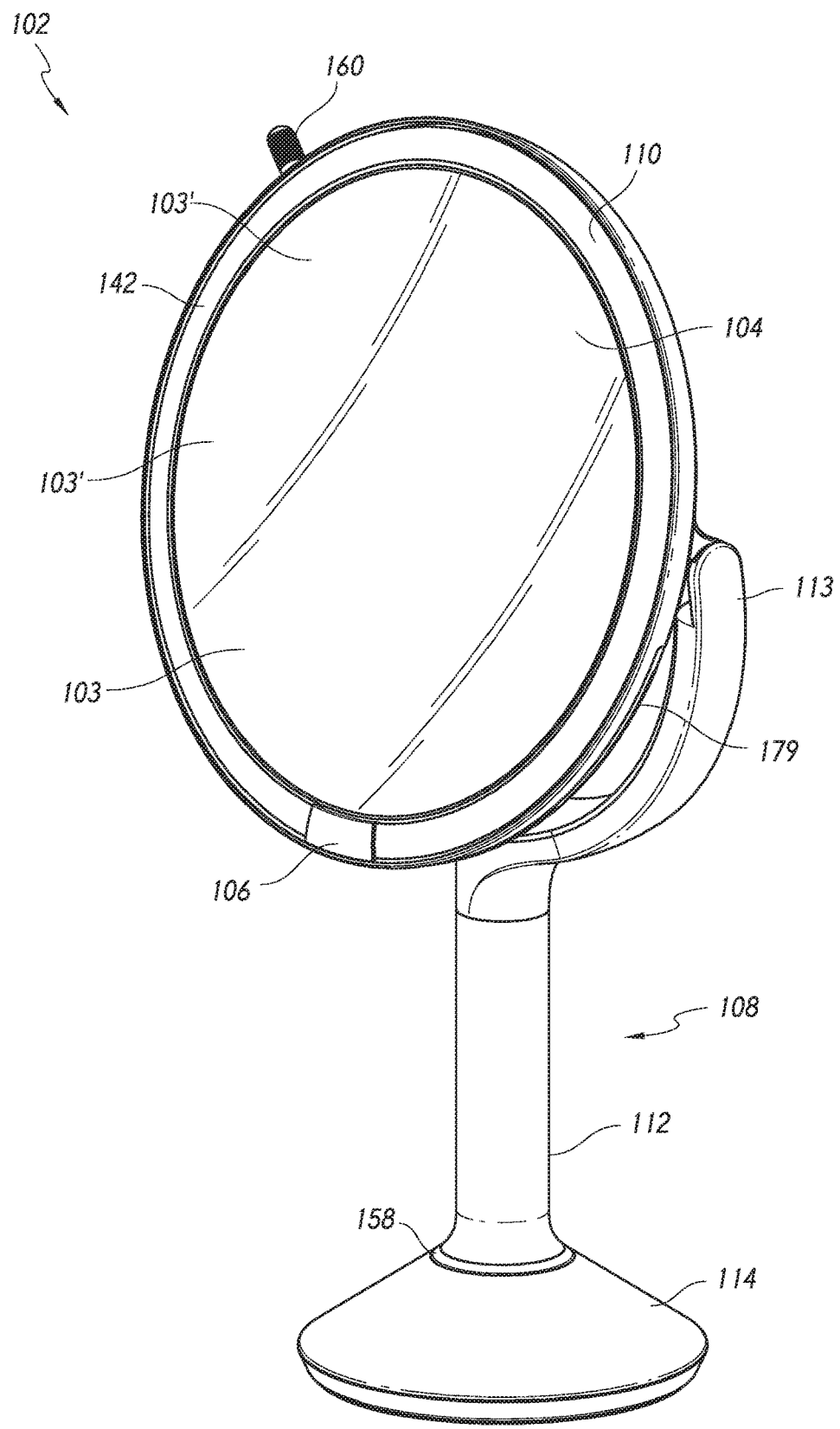
FIG. 9 illustrates a perspective view of an embodiment of a mirror assembly.

The mirror assembly 2 can include one or more of the components described in connection with FIGS. 6-8C. FIG. 9 illustrates another mirror assembly 102 including many components similar to the mirror assembly 2 components. Throughout this disclosure, different embodiments (e.g., different mirror assemblies such as 2 and 102, etc.) can comprise one or more corresponding features. Any structure, feature, material, or step that is illustrated or described in one embodiment can be omitted, or can be used with or instead of any structure, feature, material, or step that is illustrated or described in another embodiment. Where features of one embodiment correspond with features of another embodiment (e.g., are the same, substantially the same, achieve the same or similar purposes, etc.), those features are offset numerically by factors of 100 (while having the same ones and tens numerical value). As an illustration, feature 10 of mirror assembly 2 can correspond to feature 110 of mirror assembly 102. For example, mirror assembly 2 of FIG. 1 comprises a visual image reflective surface, such as a mirror 4, and the mirror assembly 102 of FIG. 9 comprises a visual image reflective surface, such as a mirror 104.

Figure 10:
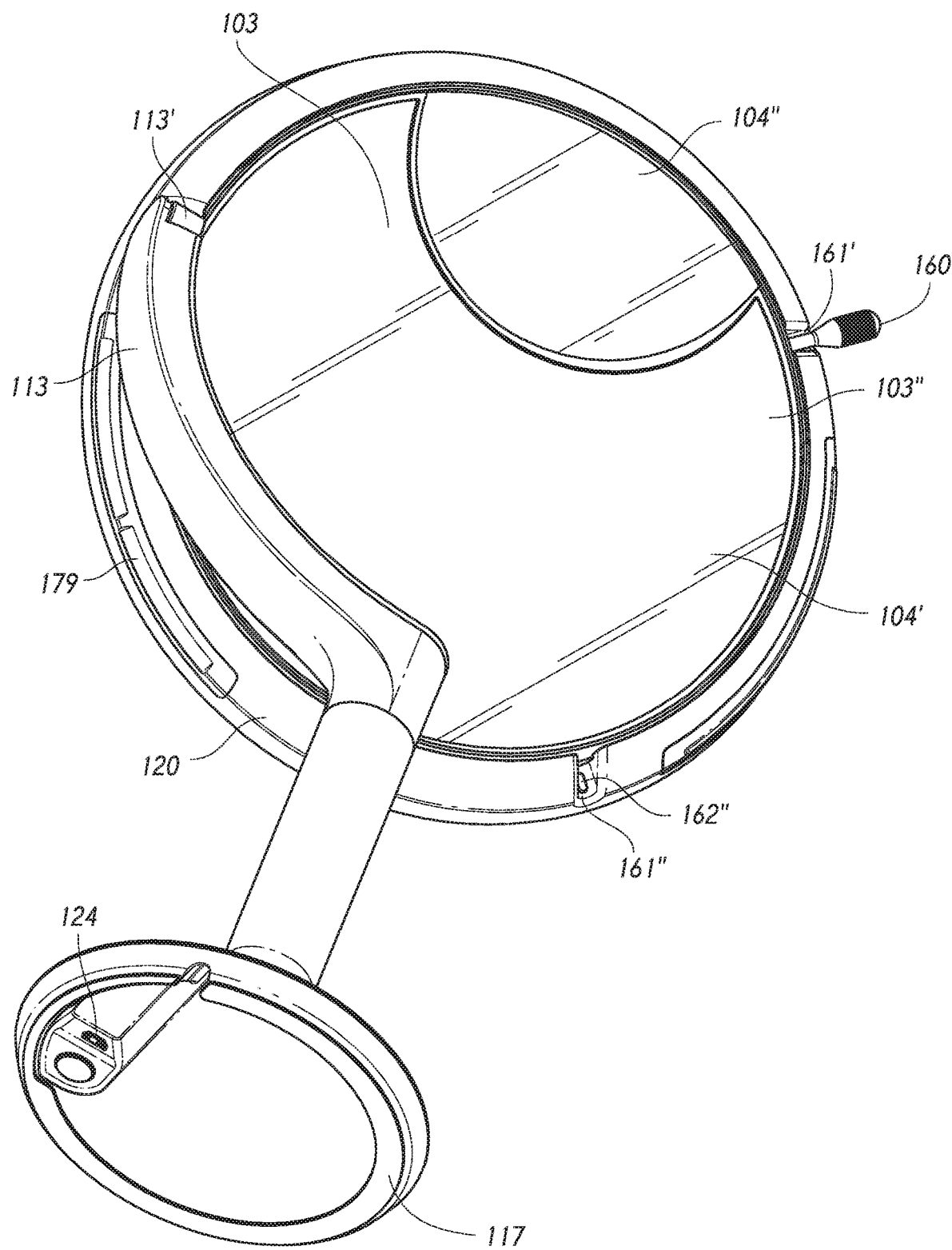
FIG. 10 illustrates a perspective view of the bottom of the embodiment of FIG. 9.
Figure 11:
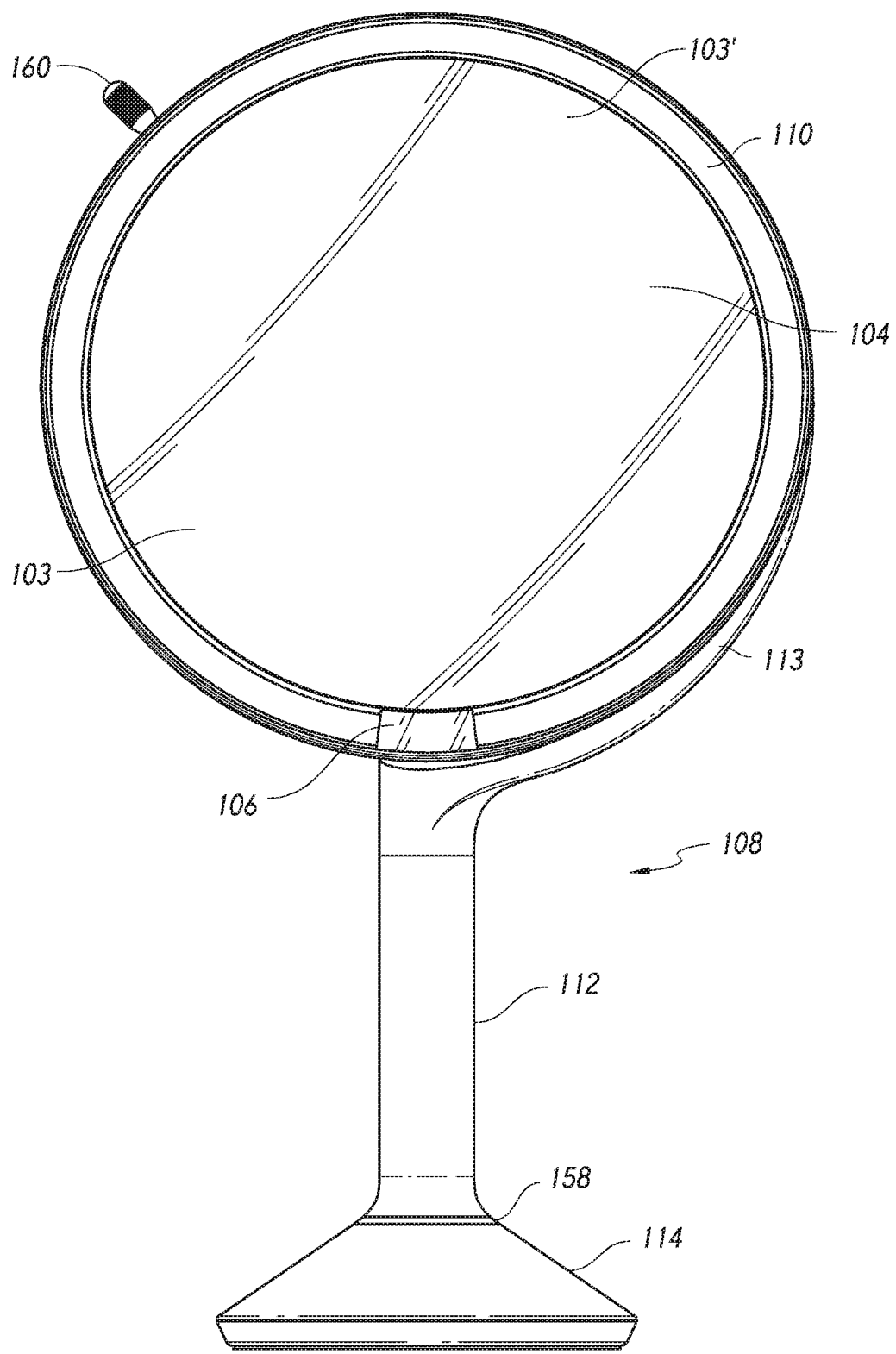
FIG. 11 illustrates a front view of the embodiment of FIG. 9.

In some embodiments, the mirror assembly 102 comprises a housing portion 108. In some embodiments, the housing portion 108 can include one or more of a shaft portion 112, and/or a base portion 114. The housing portion 108 can also include a pivot portion 116 for connecting a support portion 120 to the housing 108. In some embodiments, the mirror assembly 102 comprises a mirror head 103. In some embodiments, the mirror head 103 of the mirror assembly 102 is connected to the pivot portion 116 and shaft portion 112 via a support portion 120 and an arm 113. In some embodiments, as illustrated in FIGS. 9 and 10, the shaft portion 112 and/or the arm 113 can be connected to one of more portions of the mirror head 103 or the support portion 120 on a side thereof, and/or not in an interior or central region thereof, to permit the mirror head 103 or some portion thereof to rotate by a wide angle about an axis that traverses through the mirror head 103, such that respective front and rear surfaces of the mirror head 103 can be made to selectively switch positions on the mirror assembly 102.

In some embodiments, as described elsewhere herein, multiple mirrors (e.g., 2, 3, 4, etc.) are provided on a single mirror assembly 102 to provide multiple different optical capabilities or features, such as different magnification levels to a user. One or more other optical capabilities that can be provided in different mirrors in the same mirror assembly 102 are different lighting intensity, different color temperature, different tint, different mirror reflectivity, etc. For example, in some embodiments, as shown in FIGS. 9 and 10, a first mirror 104, a second mirror 104', and a third mirror 104" can be provided. As shown, in FIGS. 9-12, more than one mirrored surface with multiple different optical capabilities or features can be provided (e.g., 2, 3, etc.) on a side (e.g., the back face 103") of the mirror head 103. In some embodiments, the front face 103' of the mirror head 103 comprises the first mirror 104. In some embodiments, the back face 103" comprises the second mirror 104' and the third mirror 104". In some implementations, the back face of the mirror head comprises one mirror. In some variants, more than one mirror is provided on the front face of the mirror head.

In some embodiments, the mirror(s) 4, 104, 104', 104" can include a generally flat or generally spherical surface, which can be convex or concave. The radius of curvature can depend on the desired optical power. In some embodiments, the radius of curvature can be at least about 15 inches and/or less than or equal to about 30 inches. The focal length can be half of the radius of curvature. For example, the focal length can be at least about 7.5 inches and/or less than or equal to about 15 inches. In some embodiments, the radius of curvature can be at least about 18 inches and/or less than or equal to about 24 inches. In some embodiments, the mirror can include a radius of curvature of about 20 inches and a focal length of about 10 inches. In some embodiments, the mirror is aspherical, which can facilitate customization of the focal points.

Figure 12:
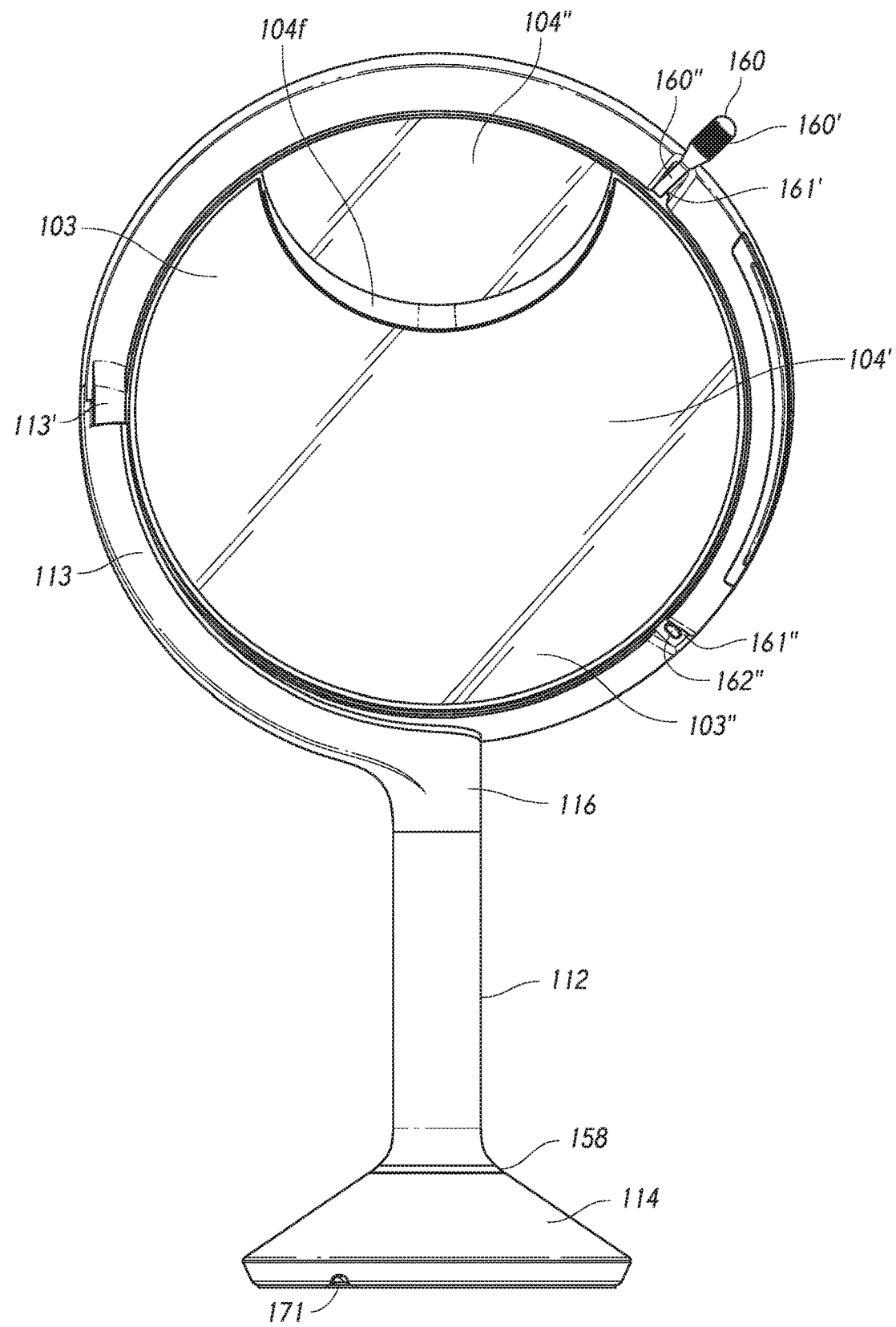
FIG. 12 illustrates a rear view of the embodiment of FIG. 9.
Figure 13:
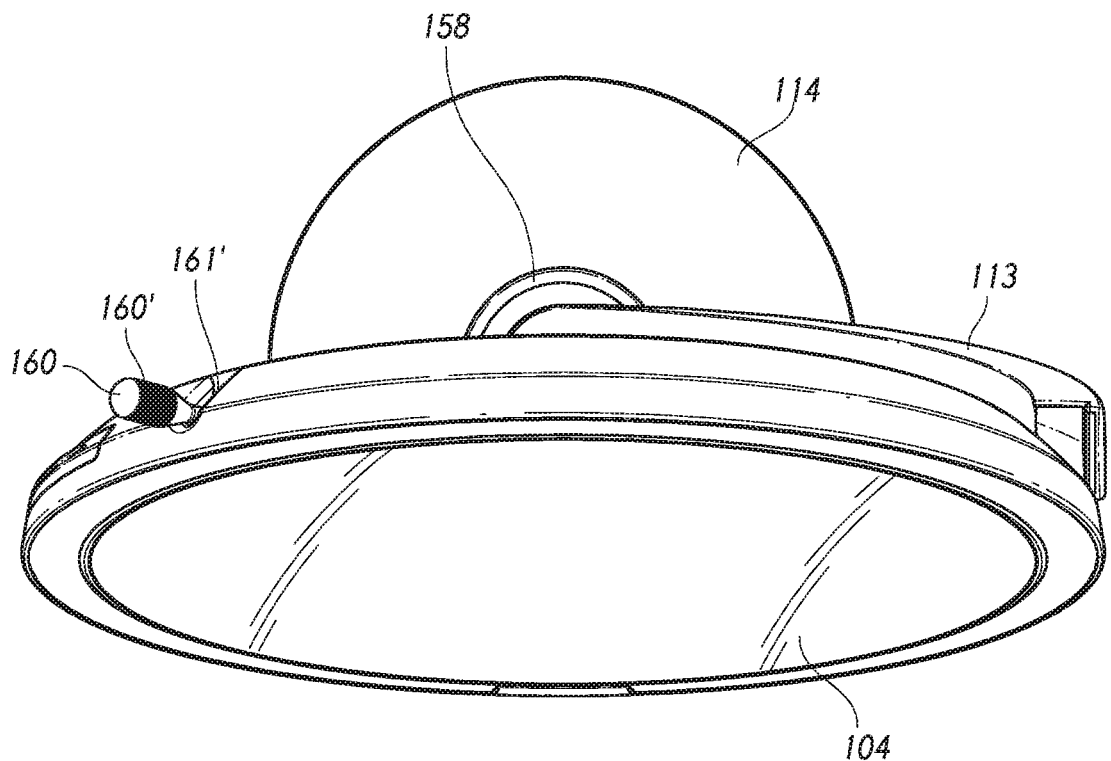
FIG. 13 illustrates a top view of the embodiment of FIG. 9.
Figure 14:
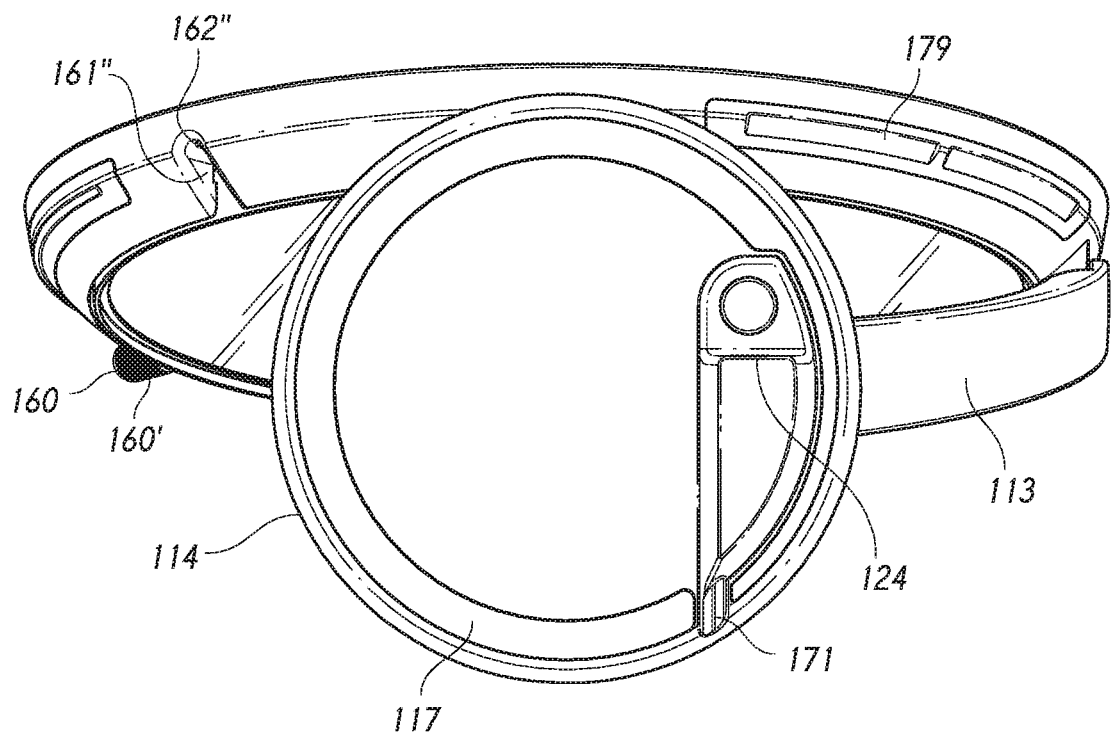
FIG. 14 illustrates a bottom view of the embodiment of FIG. 9.

As shown in FIGS. 1 and 9, one or more of the mirrors of the mirror assembly 4, 104 can have a generally circular shape. In other embodiments, one or more of the mirrors can have an overall shape that is generally elliptical, generally square, generally rectangular, or any other shape. In some embodiments, as shown in FIGS. 10 and 12, one or more of the mirrors can have a partial shape that forms part of a standard shape such as a circle (e.g., 104"), an ellipse, square, rectangular, rhomboidal, triangular, or any other shape. In some embodiments, the mirrors can be in the shape of a waxing or waning gibbous or crescent moon that, when combined, form a circle, and/or the mirrors can each be in the shape of separate corresponding or complimentary parts that, when placed together, form a substantially complete shape such as a substantially complete circle, square, rectangle, etc. In some embodiments, one or more of the mirrors of the mirror assembly can have a diameter of at least about 8 inches and/or less than or equal to about 12 inches. In some embodiments, one or more of the mirrors can have a diameter of about 8 inches. In certain embodiments, one or more of the mirrors of the mirror assembly can have a diameter of at least about 12 inches and/or less than or equal to about 16 inches. In some embodiments, where multiple mirrors are present on a single mirror assembly, mirror faces having different diameters can be used in a single assembly.

In some embodiments, the radius of curvature of the mirror 4, 104, 104', 104" is controlled such that the magnification (optical power) of the object can be varied. In some embodiments, the image of an object reflected is not magnified (e.g., has a magnification of 1×). In some embodiments, the magnification is equal to or at least about 2 times larger (e.g., 2×) and/or less than or equal to about 10 times larger (e.g., 10×). For instance, at the focal point of the mirror, the image of the object appears to be equal to or at least about 2 times larger (e.g., 2×) and/or less than or equal to about 10 times larger (e.g., 10×) than an unmagnified image. In certain embodiments, the magnification of the image of the object is equal to or at least about 5 times larger (e.g., 5×) than the object.

In some embodiments, where multiple mirrors are provided, the mirrors may be of different magnification or the same magnification. For instance, in some embodiments, as shown in FIGS. 9 and 10, the first mirror 104 is a 5× mirror, the second mirror 104' is a 1× mirror, and the third mirror 104" is a 10× mirror. In some embodiments, the first mirror 104 is a 2× mirror, the second mirror 104' is a 1× mirror, and the third mirror 104" is a 10× mirror. In some embodiments, the first mirror 104 is a 5× mirror, the second mirror 104' is a 2× mirror, and the third mirror 104" is a 10× mirror. Other arrangements, modifications, and combinations of magnification levels can be used. For example, any one or more of the mirrors 104, 104', 104" can have a magnification equal to or less than about: 0.25×, 0.5×, 1×, 2×, 5×, 10×, or ranges including and/or spanning the aforementioned values. In some embodiments, these different mirror magnifications can allow the user to quickly and/or to easily view portions of the face or body at different magnifications by moving the user's eyes without requiring the user to otherwise change body position or to move or reorient the mirror.

In some embodiments, where two mirrors (or 3, 4, etc.) are present on the same face of the mirror head (e.g., the back or front face), the focal point of the mirrors on the same face can be positioned at about the same location in three-dimensional space. For example, based on the curvature and/or the shape of a mirrored surface, its focal point and degree of magnification can be adjusted and manipulated. In some embodiments, two mirrors 104', 104" on one face of the mirror head 103 are shaped to have different magnification levels but are shaped and/or oriented such that the respective focal points (e.g., the points where the mirror image appears focused to the user) of each mirror are coincident, and/or are substantially or approximately coincident.

In some embodiments, for instance, when viewing the respective images of the two mirrors 104', 104" of the mirror assembly 102, a user can focus on a portion of a body part at different magnification levels by simply looking (e.g., shifting the user's eyes) from one mirror (e.g., mirror 104') to the other mirror (e.g., 104") on the same side of the mirror assembly 102, and vice versa, without requiring the user to move his or her head or body and/or without moving or otherwise adjusting the mirror. For example, the user can focus on one facial feature or body part (e.g., the eyes, eyebrows, cheeks, nose, forehead, neck, shoulder, etc.) at two magnification levels by simply moving the eyes from one mirror to the other without appreciably moving any other body part (e.g., not appreciably moving the head, or neck, etc.) to bring the reflected image into focus. In some embodiments, the respective focal points of the mirrors are identical, substantially identical, or at least located near each other, so the viewer can view one body part at a plurality of different magnification levels by moving the eyes. For example, in some embodiments, the distance between the respective foci of a plurality of mirrors on the same side of a face of the mirror assembly 102 can be less than or equal to about the average focal length of the human eye in the target population for which the mirror is made. In some embodiments, the respective focal points of the mirrors are generally coincident and/or generally collinear and/or generally within the same focal depth. A 1× mirror has a focal length that is infinite. In some embodiments, the image created by the 1× mirror will be in focus everywhere and therefore not blurry at the location where a user has positioned her face to view an image created by another mirror having a different level of magnification at a particular focal point. Thus, the user can focus on a body part (e.g., a facial feature) in, for instance, a magnifying mirror and in the 1× mirror on the same side of the mirror assembly at about the same distance from the mirror, without having to move the body part when the user shifts her gaze from one mirror to the other mirror.

In some embodiments, the user can focus on a face or body part at two magnifications substantially simultaneously. Likewise, in some embodiments, where the focal points of two mirrors on a single mirror side (e.g., mirror face) are roughly coincident, the user can contract (e.g., shrink, reduce, etc.) the image size of the facial feature and/or body part reflected in the mirror by simply shifting eyes from one mirror to the other (e.g., from 1× to 10×, etc.). Because the user need only shift her eyes from one mirror to the other to magnify or contract a body part, the user is able to apply make-up quicker and easier, for example, without having to reposition the body or the mirror to achieve higher or lower magnification of the same facial feature.

Figure 24A:
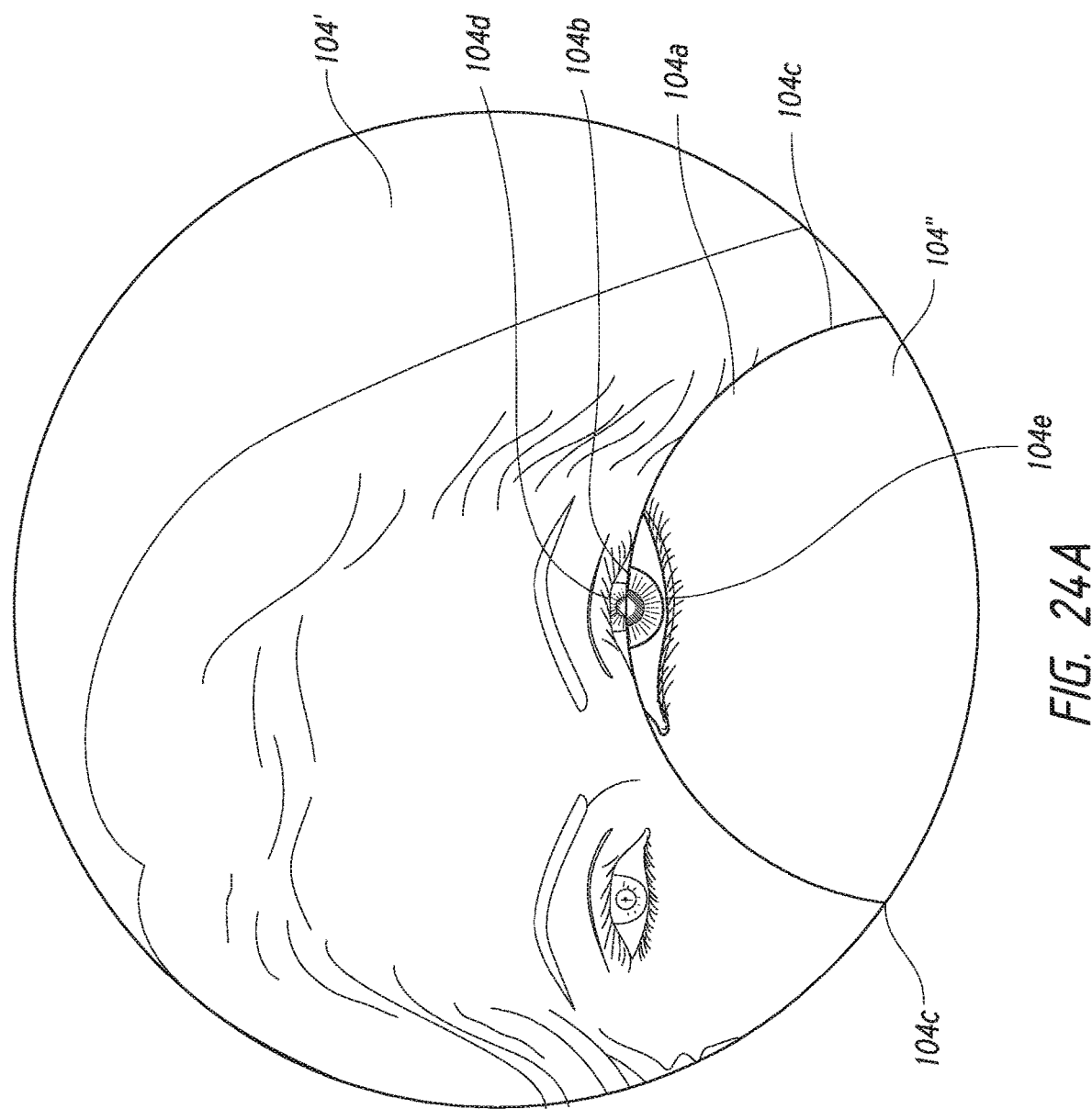
FIG. 24A illustrates a person viewing her reflection in the mirror assembly of FIG. 9.

In FIG. 24A, a user's reflected eye is viewed at a transition area from one mirror 104' to the next 104" across a seam 104a (e.g., the interface) between the mirrors 104', 104". In some embodiments, as shown in FIG. 24A, the mirrors 104', 104" of one mirror face 103" can be positioned (e.g., angled, oriented, recessed, and/or aligned) such that there is substantially no break, interruption, and/or delay in or along at least one pathway traversed by a point in the reflected image 104d, 104e of a moving object as it passes from one mirror to the next (e.g., from mirror 104' to the mirror 104", or vice versa). In some embodiments, the mirrors 104', 104" can be positioned (e.g., angled, oriented, recessed, and/or aligned) such that there is substantially no detectable jump in or along at least one pathway traversed by a point in the reflected image 104d, 104e of a moving object as it passes from one mirror to the next. In some embodiments, as shown, there is substantially no break, interruption, and/or delay in at least one pathway traversed by a point in the reflected image 104d, 104e as the point straddles a seam 104a between the mirrors 104', 104". In some embodiments, as shown, this smooth transition can occur even when the mirrors 104', 104" have different magnification levels. As shown in FIG. 24A, the smaller mirror 104" is of higher magnification power than the larger mirror 104'.

In some embodiments, this substantially unbroken pathway of a point or image (e.g., intact image, uninterrupted image, etc.) and/or the smooth transition occurs at a particular area 104b (an uninterrupted transition point and/or position) along the transition 104a between a first mirror 104' and a second mirror 104". In some embodiments, the mirrors are positioned so that a substantially unbroken image and/or smooth transition occurs at multiple and/or all the positions along the interface of a first mirror and a second mirror. In some embodiments, as shown in FIG. 24A, the uninterrupted transition position of the mirrors 104', 104" is at an area near or substantially at the center or mid-point of the interface 104b between the mirrors 104', 104". In some embodiments, the transition of the reflected image becomes less smooth (e.g., more broken) as the reflected image is viewed at positions farther away from the smooth transition area 104b (e.g., at points near the start of the interface 104c of the mirrors 104', 104"). As discussed elsewhere herein, this broken image may occur because the surfaces of the mirrors 104', 104" are not in parallel planes at positions farther from the smooth transition area 104b. In some embodiments, away from the smooth transition area 104b, a break in an image results and at least a portion of a reflected object disappears at the seam between the mirrors (and/or the reflection jumps from one mirror to the other). In some embodiments, the mirrors are positioned so that a smooth transition is achieved anywhere along the interface between the mirrors (e.g., at or near the periphery of the seam, at or near the start of the seam, at or near the end of the seam, at or near the midpoint of the seam, etc.).

Figure 24B:
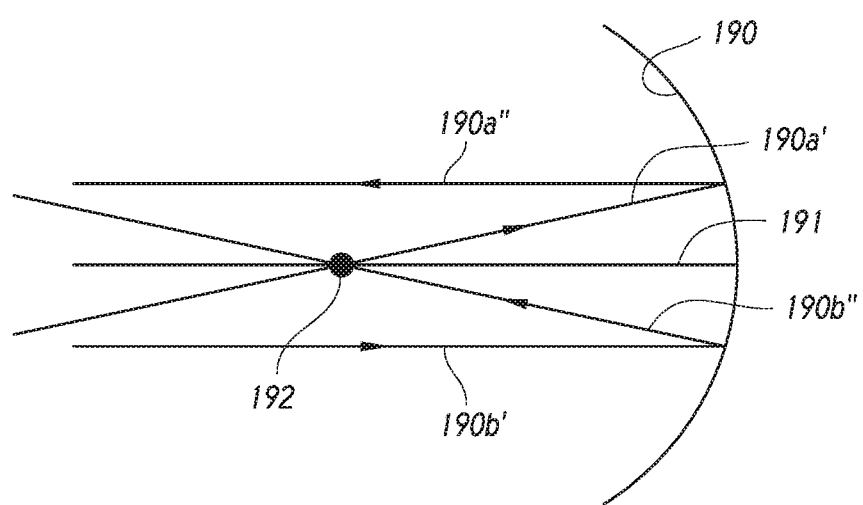
FIG. 24B is a schematic showing reflection patterns of a concave mirror.

FIG. 24B is provided for illustration of certain properties of a concave mirror 190 (e.g., a mirror that substantially conforms to a portion of a sphere, a mirror that substantially conforms to a portion of a paraboloid, an aspherical mirror, etc.). As shown, in some embodiments, a concave mirror 190 has a principal axis 191 normal to the center of the concave mirror 190 and passing through its focal point 192. Incident light traveling normal to the mirror 190 along the principal axis of the mirror 190 travels through the focal point 192 and reflects directly backward along the principal axis 191 and back through the focal point 192. Incident light traveling toward the concave mirror along the principal or optical axis 191 is also reflected directly backward along the path of the incoming incident light ray (not shown). As shown in FIG. 24B, an incident ray 190b' traveling parallel to the principal axis 191 on the way to the mirror is reflected at an angle as a ray 190b" that travels back through the focal point. An incident ray 190a' that passes through the focal point 192 on the way to the mirror 190 is reflected as a ray 190a" that travels parallel to the principal axis 191.

Figure 24C:
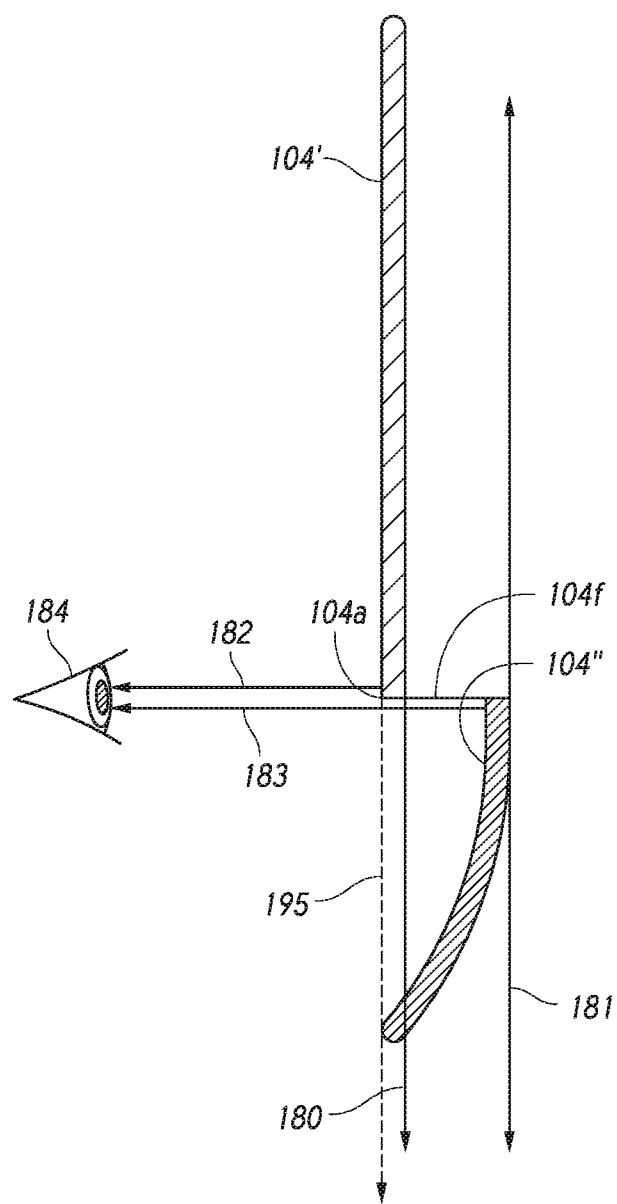
FIG. 24C illustrates a bisected side view of the mirror of FIG. 9.
Figure 24D:
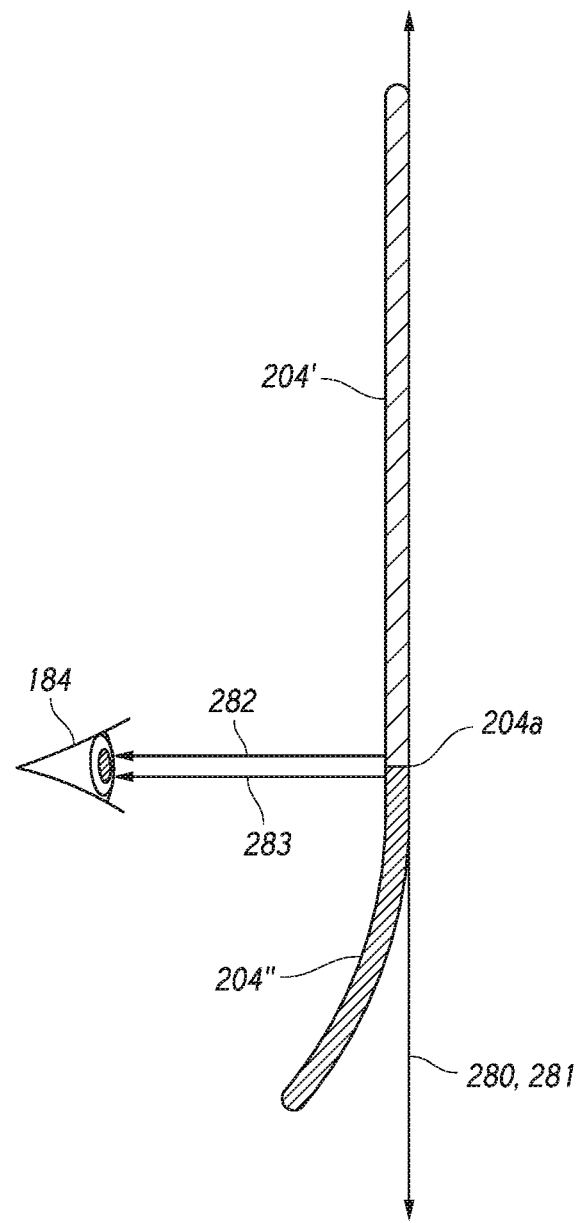
FIG. 24D illustrates a bisected side view of an embodiment of a mirror face.

In some embodiments, the uninterrupted transition occurs as a result of the sight lines 182 and 183 on edges of the mirrors 104', 104" adjacent to the seam being generally or substantially parallel with or substantially or generally collinear with the principal or optical axis of the mirror 104". In some embodiments, the uninterrupted transition occurs as a result of at least a portion of the surface of the planar mirror 104' being in an approximately or substantially parallel plane with respect to a tangential plane 181 of the curved mirror 104" (as shown in FIG. 24C) when viewed at a normal viewing angle in front of the mirror face 103" and across the seam 104a. In some embodiments, the uninterrupted transition occurs as a result of at least a portion of the surface of a planar mirror 104' being in approximately or substantially the same plane as a tangential plane of the curved mirror 104" (as shown in FIG. 24D) when viewed at a normal viewing angle in front of the mirror face 103" and across the seam 104a. FIGS. 24C and 24D show side views of tangential planes 181, 281 of concave mirrors 104", 204". Where a concave mirror 104" has a tangential plane 181 that is approximately parallel to the plane 180 of a planar mirror 104", a smooth transition can be achieved when an object is moved across the seam and viewed along different sight lines 182, 183 traversing the seam 104a of the mirrors 104', 104". This effect can also be achieved where a concave mirror 204" has a tangential plane 281 that is approximately or substantially in the same plane 280. In some embodiments, the radius of curvature of the convex mirror 104" falls on the sight light 183 at which the smooth transition occurs. In some embodiments, the sight light 183 is perpendicular to the tangential plane 181 of the concave mirror 104".

In other embodiments, any suitable combination of different orientations and/or angles between the planar mirror and the curved mirror can be used to eliminate image jump between mirrors. For example, in some embodiments, a tipping or canting or convergence of a line normal to the reflective surface of one mirror toward a line normal to the reflective surface of another mirror can avoid or resist image jump. Other optical properties of the mirrors can be responsible for the smooth transition instead of or in addition to a parallel orientation between the sight lines 182 and 183 and the principal or optical axis of the plane of a planar mirror and the tangential plane of a curved mirror, or the angle formed by the lines normal to the reflective surfaces of the respective mirrors.

In some embodiments, as shown in FIGS. 12 and 24C, at the position across which the smooth transition occurs, the mirrors 104', 104" are not in the same plane. In some embodiments, as shown, a step 104f exists between the two mirrors 104', 104" at the smooth transition area 104b. As illustrated in FIG. 24A, this step can be essentially "invisible" (e.g., positioned behind the mirrored surface 104') when the mirror face 103' is viewed at a normal viewing angle. In some embodiments, a very small or essentially no distracting visible interruption occurs between the mirrors 104', 104" when viewed at a normal viewing angle. In some embodiments, this step becomes smaller and smaller toward the periphery of the mirror head. In some embodiments, at the periphery of the mirror head as shown in FIG. 24C, the mirrors 104', 104" are substantially or approximately flush 195.

In some embodiments, where two mirrors exist on a single face 103" of the mirror head, one of the mirrors 104' is planar and the other mirror 104" is not. In some embodiments, one of the mirrors 104' is planar and the other mirror 104" is magnifying (e.g., concave). In some embodiments, one mirror 104" is recessed within and/or inset within the other mirror 104'. In some embodiments, where one mirror 104" is recessed and/or inset within the other mirror 104', at least a portion of the perimeter of the inset mirror 104" is even with and/or is not inset from the other mirror 104'. In some embodiments, the mirrors share at least portion of their perimeters and/or other boundaries. In some embodiments, the combined outer perimeters of the mirrors form a complete or substantially complete shape (e.g., a circle, square, rectangle, etc.). In some embodiments, each mirror 104', 104" forms a portion of a perimeter of a complete or substantially complete shape (e.g., a circle, square, rectangle, etc.). In some embodiments, the mirrors 104', 104" are permanently attached to the mirror head 103 such that the mirrors 104', 104" cannot be removed by a user without tools or risk of damage (e.g., are not magnetically attached). In some embodiments, the mirrors 104', 104" are oriented on the mirror face 103" to share at least a focal point within the viewing area of the mirror assembly 102. In some embodiments, the mirrors 104', 104" are differently shaped (e.g., have different circumferences shapes and/or sizes and/or have differently shaped and/or sized perimeters). In some embodiments, an imaginary plane formed atop one of the mirrors 104" and resting on at least three of the topmost points of the mirror 104" is not parallel to or coplanar with an imaginary plane formed atop of the other mirror 104' and resting on at least three topmost points of the other mirror 104'. In some embodiments, these imaginary planes converge towards one another when traveling in one direction and diverge from each other when traveling a different direction.

In some embodiments, one or more of the arm 113, the support portion 120, and the mirror head 103 are rotatable or twistable to provide multiple mirror angles with respect to the base portion 114 of the mirror assembly 102. Thus, the user is able to reposition the mirror image based on the user's height, body position (e.g., sitting or standing), etc. As shown in, for example, FIGS. 10 and 12, in some embodiments, the support portion 120 of the mirror assembly 102 is attached to the arm 113 via a hinge 113'. In some embodiments, the hinge 113' allows axial movement of the support portion 120 and, consequently, the mirror head 103 about the axis of the hinge 113'. In some embodiments, the hinge 113' can include one or more of a ball joint, one or more hinges, or otherwise. In certain embodiments, hinge 113' allows the mirror head to be pivoted in one or more directions (e.g., up, down, right, left, clockwise, counterclockwise, etc.). As shown in FIG. 10, the hinge 113' can comprise a vertical swivel joint (allowing up and down movement). In some embodiments, the hinge 113' allows the mirror to be viewed at different upward or downward viewing angles. For example, in some embodiments, by rotation about the hinge 113', the front mirror face 103' and support member 120 can be moved from a substantially vertical to a substantially horizontal position (so that the mirror face 103' is directed upwardly, forwardly, or downwardly). In some embodiments, the hinge 113' enables positioning of the support portion 120 (and, consequently, the mirror face(s)) at various different angles, where an angle of approximately 0° indicates that the support structure 120 is substantially vertical and where 90° indicates that the support structure is substantially horizontal (and directed upwardly). For example, in some embodiments, the hinge 113' enables positioning of the support portion 120 at angles of equal to about 0°, equal to or less than about 45°, equal to or less than about 90°, or ranges including and/or spanning the aforementioned values. In some embodiments, a hinge 113' on the arm 113 and the support portion 120 is static relative to the arm and/or can be locked in place and held in a static position (e.g., by using a locking joint). In some embodiments, where the support portion 120 does not rotate with respect to the arm 113, the support portion is fixed at an angle equal to about 0°, less than or equal to about 15°, less than or equal to about 40°, or ranges including and/or spanning the aforementioned values.

In some embodiments, the pivot portion 116 enables positioning of the mirror head 103 and support portion 120 at different side-to-side angles relative to a central position including angles equal to or at least: about 10°, about 20°, about 45°, or ranges spanning the aforementioned values. In some embodiments, the pivot portion 116 comprises a lateral swivel joint (allowing right to left movement). In some embodiments, the pivot portion 116 does not move and/or can be locked in a neutral and/or central position. In some embodiments, where the hinge 113' and the pivot portion 116 both move, the user can position the mirror face at several angles in any one of the aforementioned up-and-down and side-to-side angles simultaneously. This movability increases the ease with which the mirror 104, 104', 104" can be directed to provide easy viewing of a desired body part (e.g., a facial feature).

Figure 16:
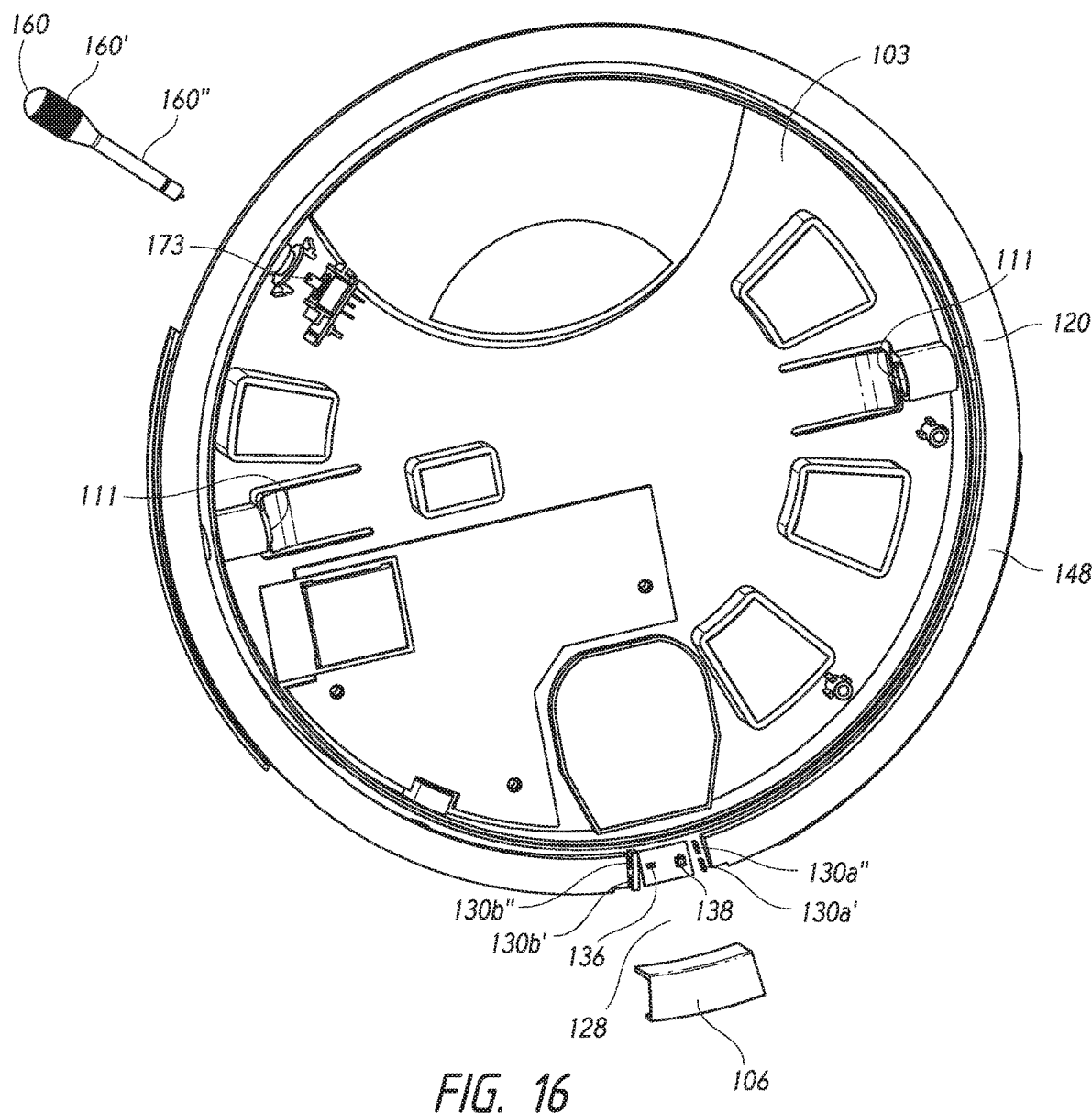
FIG. 16 illustrates an enlarged view of a portion of the embodiment of FIG. 9, with front mirror removed and the light pipe cover removed, showing a sensor assembly.
Figure 17:
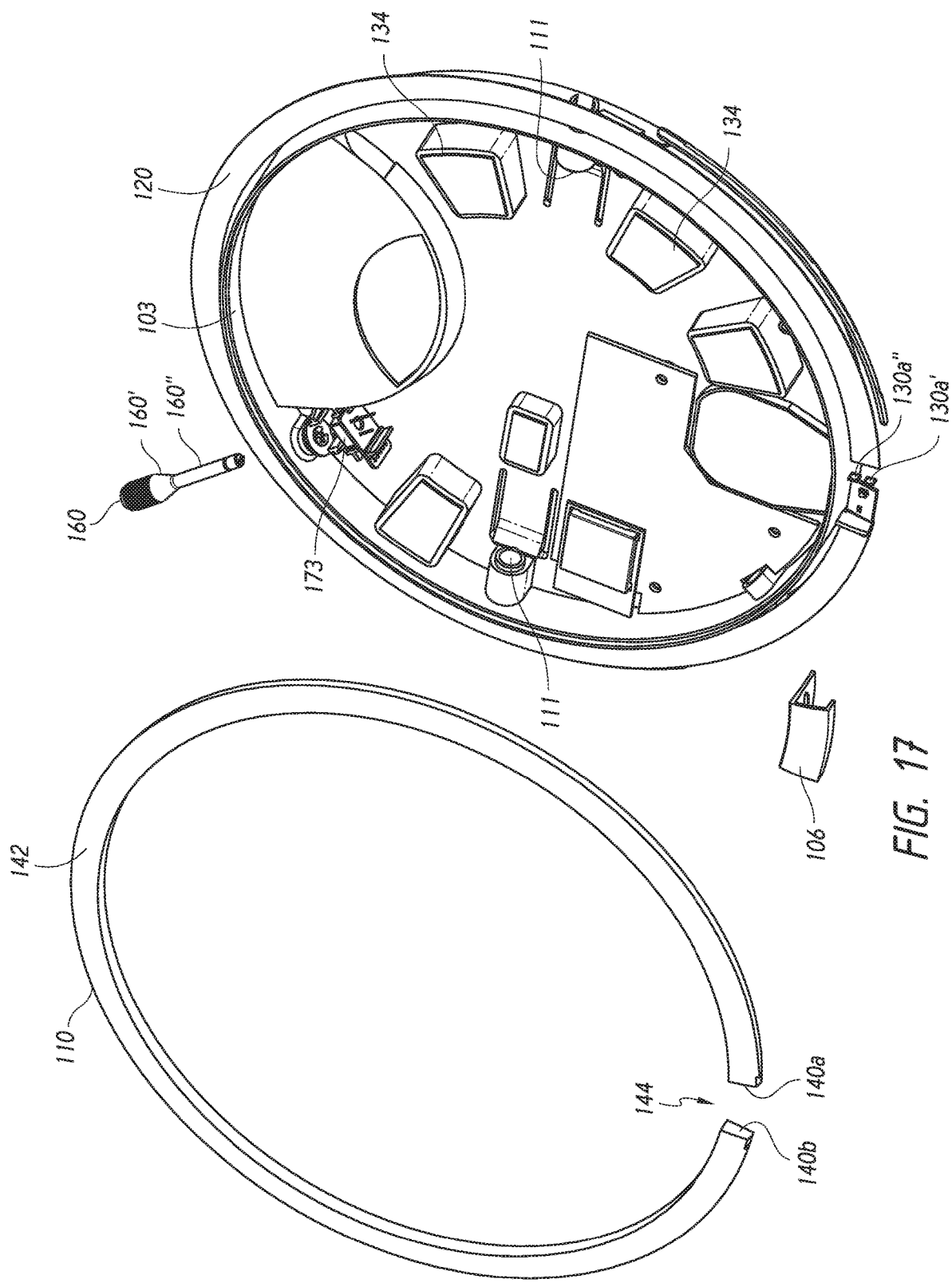
FIG. 17 illustrates an enlarged view of a portion of the embodiment of FIG. 9, with the front mirror removed and light pipe detached.
Figure 18:
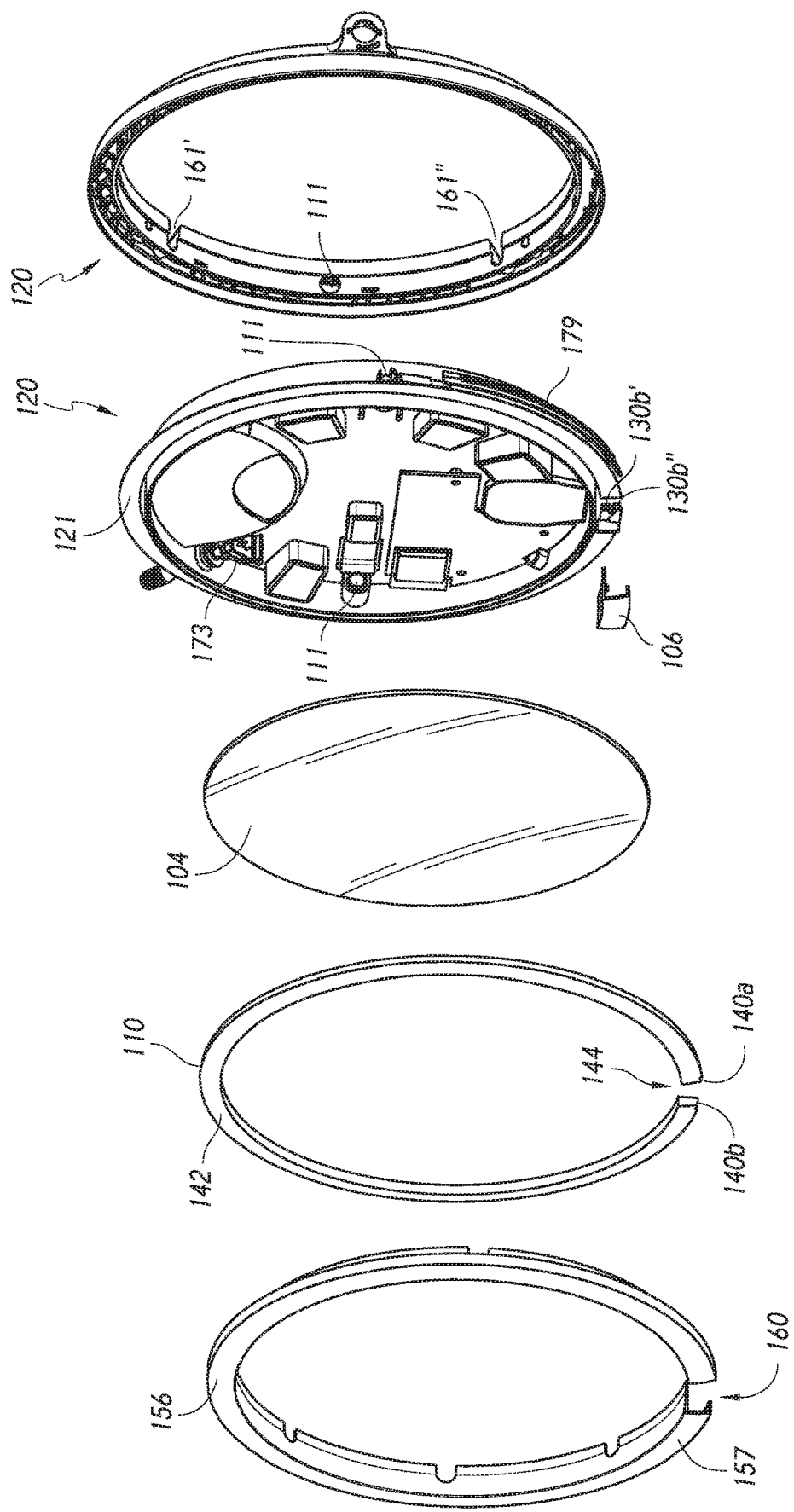
FIG. 18 illustrates a partially exploded view of a portion of the embodiment of FIG. 9.
Figure 19:
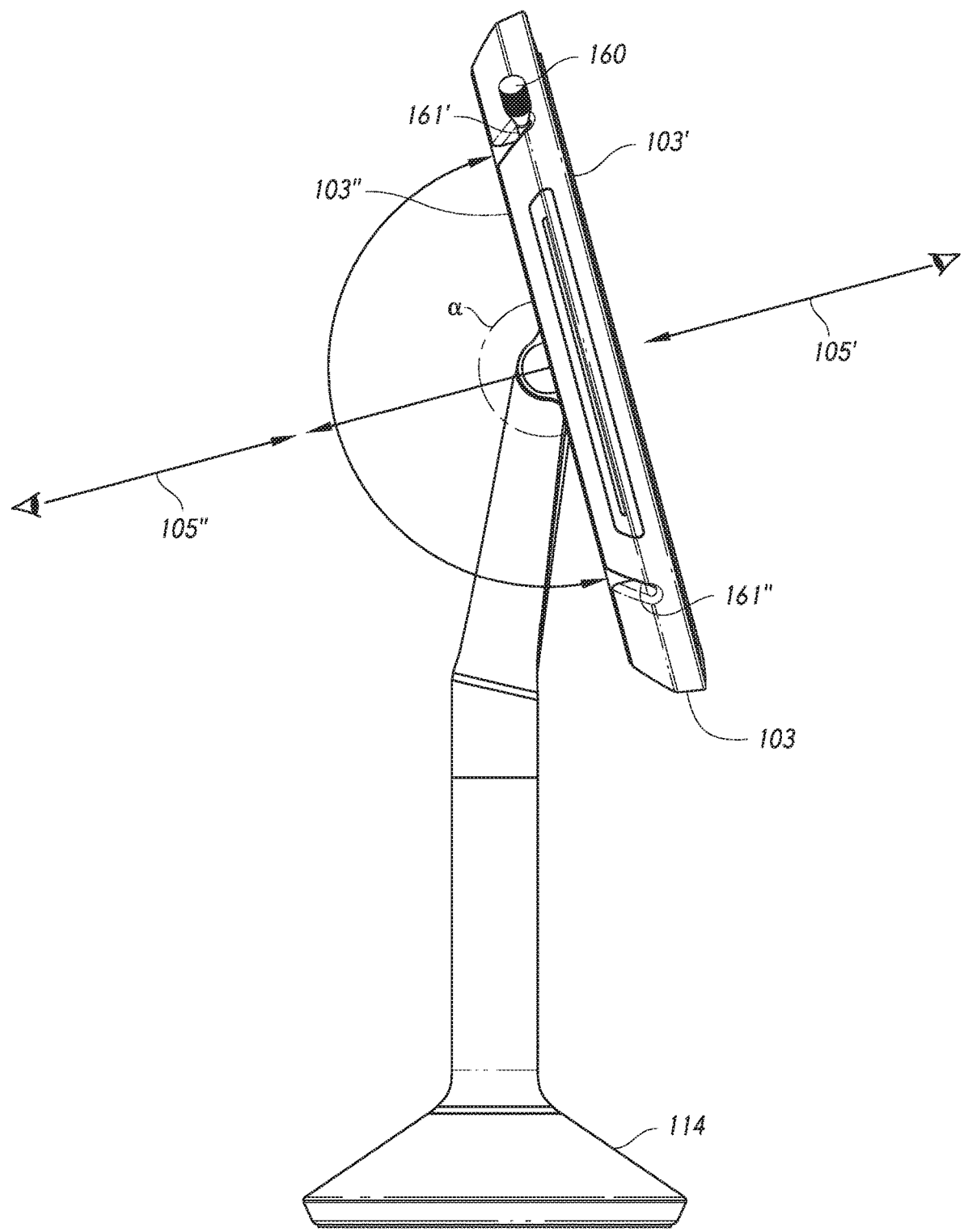
FIG. 19 illustrates a first side view of the embodiment of FIG. 9.

In some embodiments, the mirror head 103 and support portion 120 are attached to each other via a hinge assembly 111 (a hinge, swivel, ball-joint, etc.) shown in FIGS. 16-18 from the front face of the mirror assembly 103' with the mirror 104 removed. In some embodiments, the mirror head 103 can be rotated about the axis of the hinge assembly 111 within the support portion 120. In some embodiments, this rotation allows the user to transition from the front face 103' (e.g., mirror 104) to the back face 103" (e.g., mirrors 104', 104") by flipping (e.g., rotating on an axis, etc.) the mirror head 103 within the support portion 120 (e.g., moving the mirror head 103 backward or forward) without movement of the support portion 120. For instance, in some embodiments, the mirror head 103 moves axially about an axis created by the hinge assembly 111 while the support portion 120 remains in place and/or static (e.g., without movement via the hinge 113' or the pivot portion 116). In some embodiments, by using the hinge assembly 111, the mirror head 103 can be moved within the support portion 120 from a start position (e.g., an angle α of about 0°, shown in FIG. 19) to an end position (e.g., an angle α of about 180°). The mirror head 103 can then be rotated back by moving it from the end position (e.g., an angle α of about 180°) back to the starting position (e.g., an angle α of about 0°).

In some embodiments, as shown in FIGS. 9-19, the mirror assembly comprises a handle 160 (e.g., a knob, lever, pop-pin, etc.). In some embodiments, the handle 160 is affixed to, connected to, unitary with, or otherwise attached to the mirror head 103. In some embodiments, the handle 160 facilitates movement from the front mirror face 103' to the back mirror face 103" (or vice versa), by simply rotating, flipping, turning the mirror head 103 via the handle 160 about an axis of within the support portion 120 of the mirror head 103 (as shown in FIGS. 16-18) as described above. In some embodiments, the handle 160 can be used to rotate the mirror head 103 about the hinge assembly 111 axis while the support portion 120 remains in place (e.g., static), without requiring the user to touch any mirror face or side, thus avoiding smudges or finger prints on the mirror face. For instance, in some embodiments, where the user is positioned in front 105' of the mirror assembly 102 (shown in FIG. 19) and is viewing the mirror 104 of the front face 103', the user can rotate the mirror head 103 within the support portion 120 to view the back face 103" mirrors 104', 104". This movement can be accomplished, for example, when the user pushes or presses the handle 160 away from her through an arc of motion. In other words, the user moves the handle 160 in the backward direction along an arc (from an angle α of about 0°) to achieve an angle α of about 90° and, after passing an angle α of about 90°, pulls the handle 160 downwardly and towards the support portion 120 to achieve an angle α of about 180° Likewise, the front face 103' of the mirror assembly can again be viewed by pushing the handle 160 back and upward to rotate the mirror head 103 from the second position (e.g., an angle α of about 180°) to achieve an angle α of about 90°. Once an angle α of about 90° is achieved, the user can pull the handle 160 upwardly along an arc and toward the user to achieve an angle α of about 0°. In some embodiments, instead or in addition to a handle, the mirror assembly comprises an actuator (a button, switch, sensor, or capacitive touch sensor module) that, upon actuation (e.g., by pressing a button, swiping a finger across a portion of a sensor, pressing a sensor, etc.) moves the mirror head from an angle α of about 0° to about 180° or vice versa.

Figure 20:
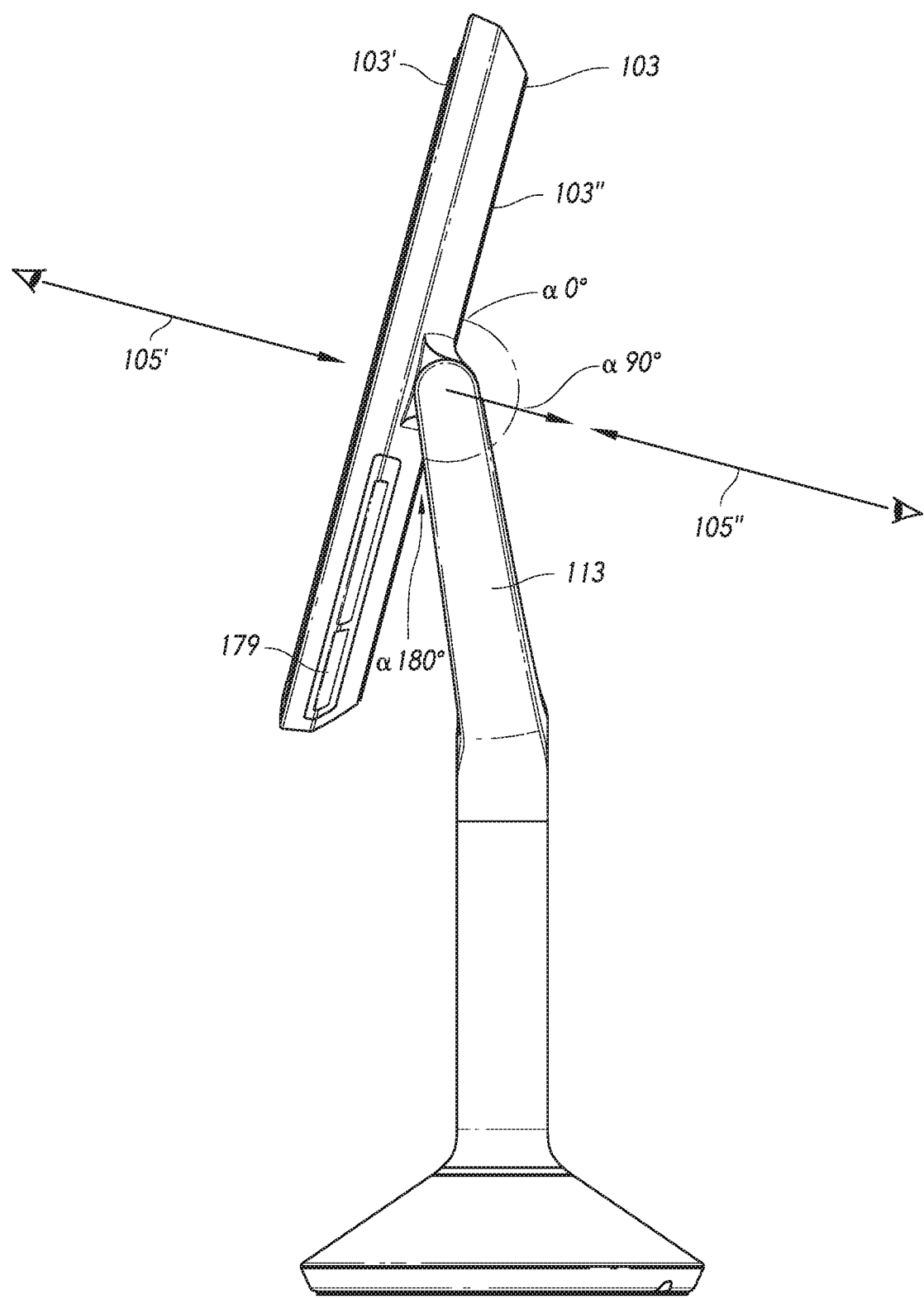
FIG. 20 illustrates a second side view of the embodiment of FIG. 9.

In some embodiments, the hinge assembly 111 is spring-loaded. In some embodiments, the spring (not shown), or another similar feature that causes directional resistance (e.g., a magnet, a friction pad, a cam, etc.), can imbue the mirror head 103 with a weighted feel. For example, in some embodiments, when moving the mirror head 103 from its start position (from an angle α of 0°, shown in FIGS. 19 and 20), an initial resistance is felt by the user and then less resistance as movement continues until the mirror head 103 reaches its end position (an angle α of 180°) or some intermediate position. Likewise, in some embodiments, when moving the mirror head 103 from its end position (an angle α of 180°), an initial resistance is felt by the user and then less resistance as movement continues until the mirror head 103 reaches the start position (angle α of 0°, shown in FIGS. 19 and 20), or some other position. In some embodiments, once the mirror head 103 is moved out of the start position, the user can let go of the handle 160 and the hinge assembly 111 allows a generated momentum to carry the mirror head 103 to the end position (an angle α of 180°). In some embodiments, once the mirror head 103 moved out of the end position by the user, the user can let go of the handle 160 and the hinge assembly 111 allows generated momentum to carry the mirror head 103 back into the start position.

Figure 15:
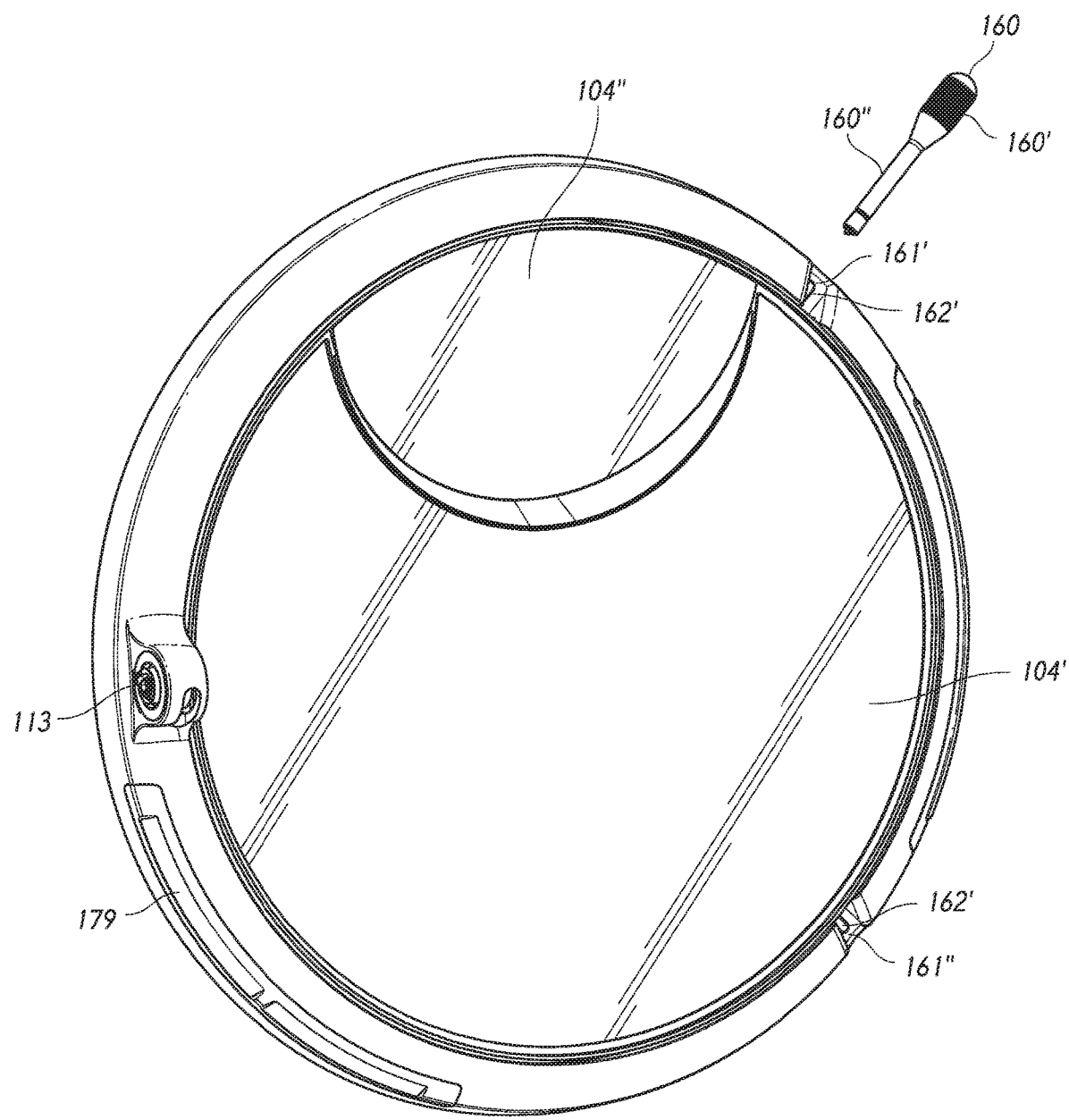
FIG. 15 illustrates an enlarged rear view of a portion of the embodiment of FIG. 9 showing the rear mirrors.

In some embodiments, the handle 160 is configured to move from a first retaining portion, such as a bay 161' (e.g., groove, aperture, slot, etc.), in the support portion 120 to a second bay 161" (e.g., groove, aperture, slot, etc.) in the support portion 120 (as shown in, for example, FIG. 15). In some embodiments, the first bay 161' is an upper slot on the support portion 120 located above the second bay 161". In some embodiments, the second bay is a lower slot on the support structure 120, located below the first bay 161' (as shown in FIG. 12). In some embodiments, the bays 161', 161" of the support portion 120 engage the handle 160 (e.g., frictionally, magnetically, or otherwise) to hold the handle 160 in the bay 161', 161" until the user applies enough force to move the mirror head 103 out of the bay 161', 161" (e.g., via the handle 160). In some embodiments, as shown in FIG. 15, the bays 161', 161" comprise magnets 162', 162" to engage, attract and/or hold the handle 160.

In some embodiments, the handle 160 comprises frictional elements (e.g., knurlings, roughenings, ribs, rubber) and/or the bay has frictional elements (e.g., knurlings, roughenings, ribs, rubber) to hold the stem in the bay. In some embodiments, the handle 160 comprises a magnet (or is magnetic) and the bay 161', 161" comprises an oppositely polarized magnet (or a magnetic insert attracted by the handle). In some embodiments, the bay is sized slightly smaller than a stem so that the walls of the bay engage the stem as the handle is moved into position in the bay. In some embodiments, the bay has an entrance (e.g., mouth) that comprises one or more resilient materials but slightly deformable materials (e.g., plastic, rubber, Teflon, etc.) so that a small amount of force must be applied to the handle to move the handle past the entrance of the bay and into the bay. In some embodiments, beyond the mouth of the bay, the bay comprises an opening section where the walls of the bay do not contact the stem or handle. In some embodiments, the handle is held in the opening section of the bay until moved past the mouth of the bay again.

In some embodiments, the handle 160 comprises a securing member (e.g., pop-pin, etc.) that engages the support portion 120 of the mirror assembly 102 (e.g., in a bay or via a hole in the support portion 120) via a catch-mechanism 173 (as shown in, for example, FIGS. 16-18). In some embodiments, the securing member recoils through an aperture in the support portion 120 of the catch-mechanism 173. In some embodiments, the handle 160 snaps into place in the start position (a of about 0°) or end position (a of about 180°). In some embodiments, the securing member comprises a spring-loaded pop-pin. In some embodiments, using the pop-pin design, the securing member may be physically mounted (e.g. welded or screwed into place) or unitary with a portion of the mirror head 103. In some embodiments, by pulling the pop-pin out and away from the support portion 120, the handle 160 releases and the mirror head 103 freely moves with respect to the support portion 120. In some embodiments, the handle 160 can be released after the pin portion of the pop-pin exits the aperture (e.g., an aperture in a bay) and the pin will automatically pop and/or snap back into place when it reaches the start (a of about 0°) or end position (a of about 180°). In other words, the pop-pin can be pulled out to allow movement of the mirror head from one position to the next even after the pop-pin has been let go. In some embodiments, the pop-pin can be released from a bay by actuating it, such as by depressing it (e.g., pushing the handle into or toward the mirror assembly). In some embodiments, the pop-pin design can be used with or without other design features pertaining to the movement of the mirror head described elsewhere herein. For example, in some embodiments, the mirror head 103 has a pop-pin, but also one or more elements that imbue it with a weighted feel during movement and/or features that provide an initial resistance and then less resistance as movement continues until the mirror head reaches its next position.

The handle can alternatively or additionally be provided with one or more internal electronic components (e.g., one or more switches or dials) in electronic communication with a controller that are configured to actuate or adjust one or more electronic parameters or features of the mirror assembly. In some embodiments, the handle interacts with a controller configured to actuate or adjust the intensity, brightness, color, and/or temperature of the light emitted by the mirror. In some embodiments, the handle is in electronic communication with a controller configured to actuate or adjust any other adjustable light variable disclosed herein. In some embodiments, the handle can be actuated to turn the power to the mirror assembly on or off. In some embodiments, actuation of the handle activates a display (e.g., a virtual display, LCD, OLED, LED, or the like) as described elsewhere herein. In some embodiments, once a display is activated, the handle can be used to select settings from the display. In some embodiments, the handle can be used to select downloaded light settings as described elsewhere herein. In some embodiments, the handle is actuated in one or more ways (e.g., by twisting, pushing, and/or pulling the handle, etc.). In some embodiments, a plurality of handles (2, 3, 4, or more) is provided. In some embodiments, for example, a first handle can be provided to change the orientation of the mirror head and a second handle can be provided to actuate or adjust one or more of the electronic parameters or features of the mirror.

In some embodiments, the support portion 120 does not comprise a bay. In some embodiments, instead of a bay, a different retaining portion, such as a pad or flat surface, is used to retain or sequester the mirror head 103 in place. In some embodiments, the pad may be a material or other feature (e.g., a dimple, a nub, etc.) that is magnetic or adhesive and that attracts or sticks to the handle (not shown). In some embodiments, the pad can be substantially flat. In some embodiments, as discussed above, an aperture in the support portion 120 can be used to fix the mirror head 103 in place (e.g., with a pop-pin).

In some embodiments, the handle 160 advantageously allows the user to avoid making direct physical contact with the mirror 104, 104', 104". The user can avoid making fingerprints or smudges on any of the mirror surfaces as the mirror is transitioned between one face 103' to the next 103".

Thus, a user can transition from one mirror face to the next without needing to wash one of the mirror surfaces. In some embodiments, avoiding smudges leads to less wear on the mirror over time because the mirror surface need not be washed (e.g., with cloth or tissue that can abrade the mirror surface). Washing of the mirror surface can eventually lead to dulling of the surface and loss of image brilliance. By not having to wash the mirror head, the risk that electronic components of the mirror assembly 102 are damaged by water, cleaning solution, etc. is lowered or minimized.

As shown in FIG. 12 and discussed elsewhere herein, in some embodiments, the handle 160 comprises a stem 160". FIG. 15 shows the handle removed from the head 103 of the mirror (shown) with the arm 113, shaft portion 112, and base 114 removed. In some embodiments, as shown in FIGS. 12-17, for example, the handle 160 comprises a grip 160'. In some embodiments, the stem 160" has a diameter that is smaller than or equal to the diameter of the grip 160'. In some embodiments, the diameter of the grip is about 2 times larger than (e.g., about twice as large as) the diameter of the stem. In some embodiments, as shown, the grip 160' has frictional elements (e.g., knurlings, rougheings, ribs, rubber, etc.) that allow it to be easily grasped by the user to facilitate movement of the mirror head 103.

In some embodiments, the handle 160 can be located at various positions about the mirror head 103. In some embodiments, for positioning purposes, when viewing the mirror assembly 102 from the front 105' (as in FIG. 11), a "12 o'clock" position of the mirror can be viewed as the 0°/360° position (e.g., the 0°/360° mark of a 360° protractor). For illustration, these degree marks can be denoted as values of "° β". For instance, moving clockwise from the 0° β position viewing the mirror from the front, the "3 o'clock" position coincides to a 90° β mark, the 6 o'clock position coincides to a 180° β mark, the 9 o'clock position coincides to a 270° β mark, etc. In some embodiments, as shown in FIGS. 12 (viewing the mirror head 103 from the back), 13 (viewing the mirror head from the top), and 14 (viewing the mirror head from the bottom), the top bay 161' is positioned between about 340° β and about 290° β and the bottom bay 161" is positioned between about 200° β and about 250° β. In some embodiments, as shown in the FIG. 15, the top bay 161' is positioned at about 315° β and the bottom bay 161" is positioned at about 225° β. In some embodiments, the bays and the handle are located on the other side of the mirror head 103. For example, in some embodiments, the top bay is positioned between about between about 20° β and about 70° β and the bottom bay is positioned between about 110° β and about 160° β. In some embodiments, the top bay is positioned at or about at 45° β and the bottom bay is positioned at or about at 135° β. In some embodiments, the arm may also be on either side of the mirror.

In some embodiments, one or more mirrors 104, 104', 104" of the mirror assembly 102 can have a thickness of at least about 2 mm and/or less than or equal to about 3 mm. In some embodiments, the thickness is less than or equal to about two millimeters and/or greater than or equal to about three millimeters, depending on the desired properties of the mirror (e.g., reduced weight or greater strength). In some embodiments, as shown in FIG. 9, the surface area of a mirror 104 of the mirror assembly can be substantially greater than the surface area of the base 114. In other embodiments, the surface area of the image-reflecting surface of the mirror is greater than or equal to the surface area of the base.

Many vanity mirrors distort the reflected image because of, for example, poor quality reflective surfaces, harsh light sources, and/or uneven distribution of light. Additionally, the light sources of conventional vanity mirrors are typically energy inefficient. Further, the light sources of conventional vanity mirrors are not adjustable or are difficult to effectively adjust. Certain embodiments disclosed herein solve these problems by providing highly adjustable and variable light sources and/or high quality mirror surfaces.

In some embodiments, one or more of the mirrors can be highly reflective (e.g., can have at least about 90% reflectivity). For instance, in some embodiments, one or more of the mirrors have greater than about 70% reflectivity and/or less than or equal to about 90% reflectivity. In other embodiments, one or more mirrors have at least about 80% reflectivity and/or less than or equal to about 100% reflectivity. In certain embodiments, one or more mirrors have about 87% reflectivity. In some embodiments, one or more of the mirrors can be cut out or ground off from a larger mirror blank so that mirror edge distortions are diminished or eliminated. In some embodiments, one or more filters can be provided on the one or more of the mirrors to adjust one or more parameters of the reflected light. In some embodiments, the filter comprises a film and/or a coating that absorbs or enhances the reflection of certain bandwidths of electromagnetic energy. In some embodiments, one or more color adjusting filters, such as a Makrolon filter, can be applied to the one or more mirrors to attenuate desired wavelengths of light in the visible spectrum.

In some embodiments, one or more of the mirrors can be highly transmissive (e.g., nearly 100% transmission). In some embodiments, transmission can be at least about 90%. In some embodiments, transmission can be at least about 95%. In some embodiments, transmission can be at least about 99%. In some embodiments, the one or more mirrors can be optical grade and/or comprise glass. For example, one or more of the mirrors can include ultraclear glass. Alternatively, the one or more of the mirrors can include other translucent materials, such as plastic, nylon, acrylic, or other suitable materials. In some embodiments, one or more of the mirrors can also include a backing including aluminum or silver. In some embodiments, the backing can impart a slightly colored tone, such as a slightly bluish tone to the mirror. In some embodiments, an aluminum backing can prevent rust formation and provide an even color tone. The one or more mirrors can be manufactured using molding, machining, grinding, polishing, or other techniques.

Figure 7:
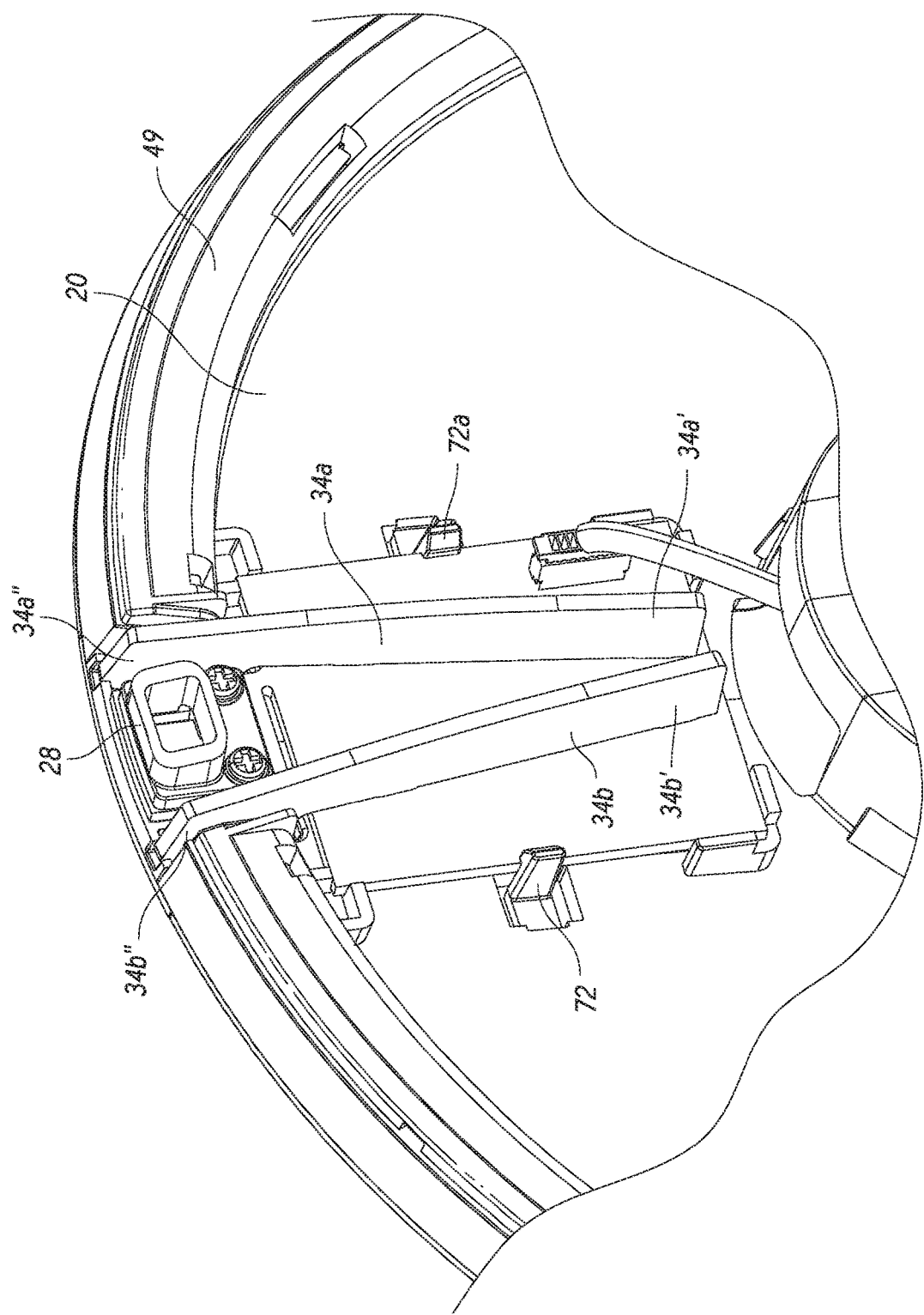
FIG. 7 illustrates an enlarged view of a portion of the embodiment of FIG. 1, with the rear cover portion removed.
Figure 8:
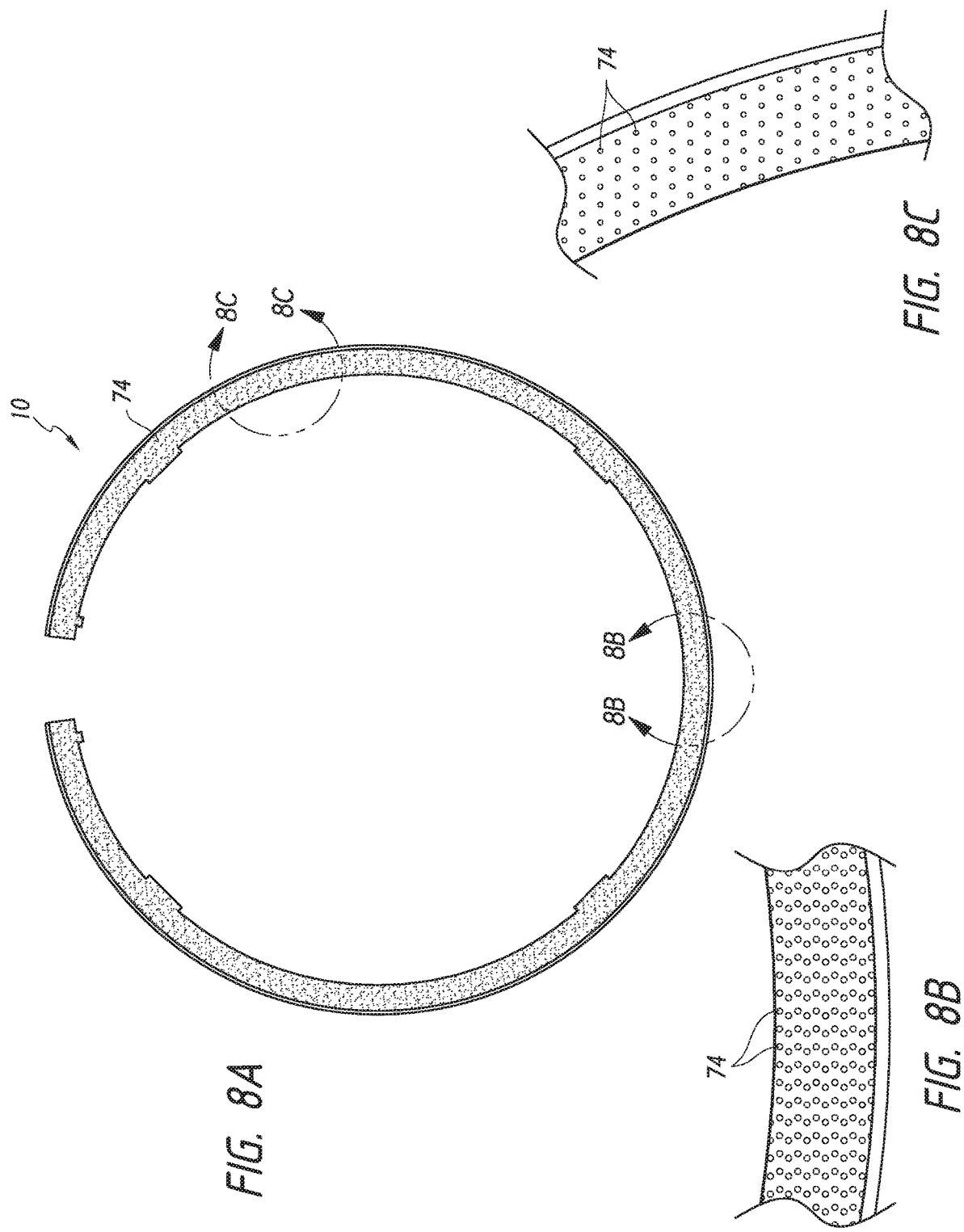
FIG. 8A illustrates a light conveying pathway of the embodiment shown in FIG. 1.
FIGS. 8B-8C illustrate enlarged views of portions of the light conveying pathway shown in FIG. 8A.

The mirror assembly 2, 102 can include one or more light sources configured to transmit light. For example, as shown in FIGS. 7 and 16, the mirror assembly 2, 102 can include a plurality (e.g., 2, 3, 4, 5, 6, 7, 8, or more) of light sources 30a, 30b, 130a', 130a", 130b', 130b". Various light sources can be used and can be housed behind the cover member 6, 106. In some embodiments, the light sources can include light emitting diodes (LEDs). In some embodiments, other light emitters can be used (e.g., fluorescent light sources, incandescent light sources, halogen light sources, etc.). In some embodiments, LEDs may offer advantages over other light emitters, including longer lifetimes and higher color rendering indices.

In some embodiments, as shown in FIGS. 16 and 17, each light source can comprise a plurality (e.g., one, two, three, four, five, or more) of LEDs (or other light emitters). In some embodiments, for example, the left light source 130b', 130b" can comprise two, as shown in FIG. 16 (or four LEDs) and the right light source can comprise two (130a', 130a") or four LEDs. In some embodiments, one or more LEDs within a single light source can be the same or different (e.g., have the same or a different color or color temperature). For example, in certain variants, a light source comprising four LEDs can comprise two pairs of two LEDs where the each LED in a pair is identical (e.g., a pair of two red LEDs and a pair of two blue LEDs). In other embodiments, each LED in a single light source is different. In some embodiments, the light sources can comprise LEDs that are the same (e.g., having the same color, temperature, and number of LEDs in an each light source) or different (e.g., having one or more LED that is different from an LED of different light source). In some embodiments, different light sources of the mirror assembly are independently adjustable to provide accomplish any lighting environment desired. In some embodiments, LEDs can be paired with other LEDs of lower or higher color temperatures. In certain implementations, LEDs can be paired with other LEDs of with colors that have lower or higher wavelengths.

Figure 6:
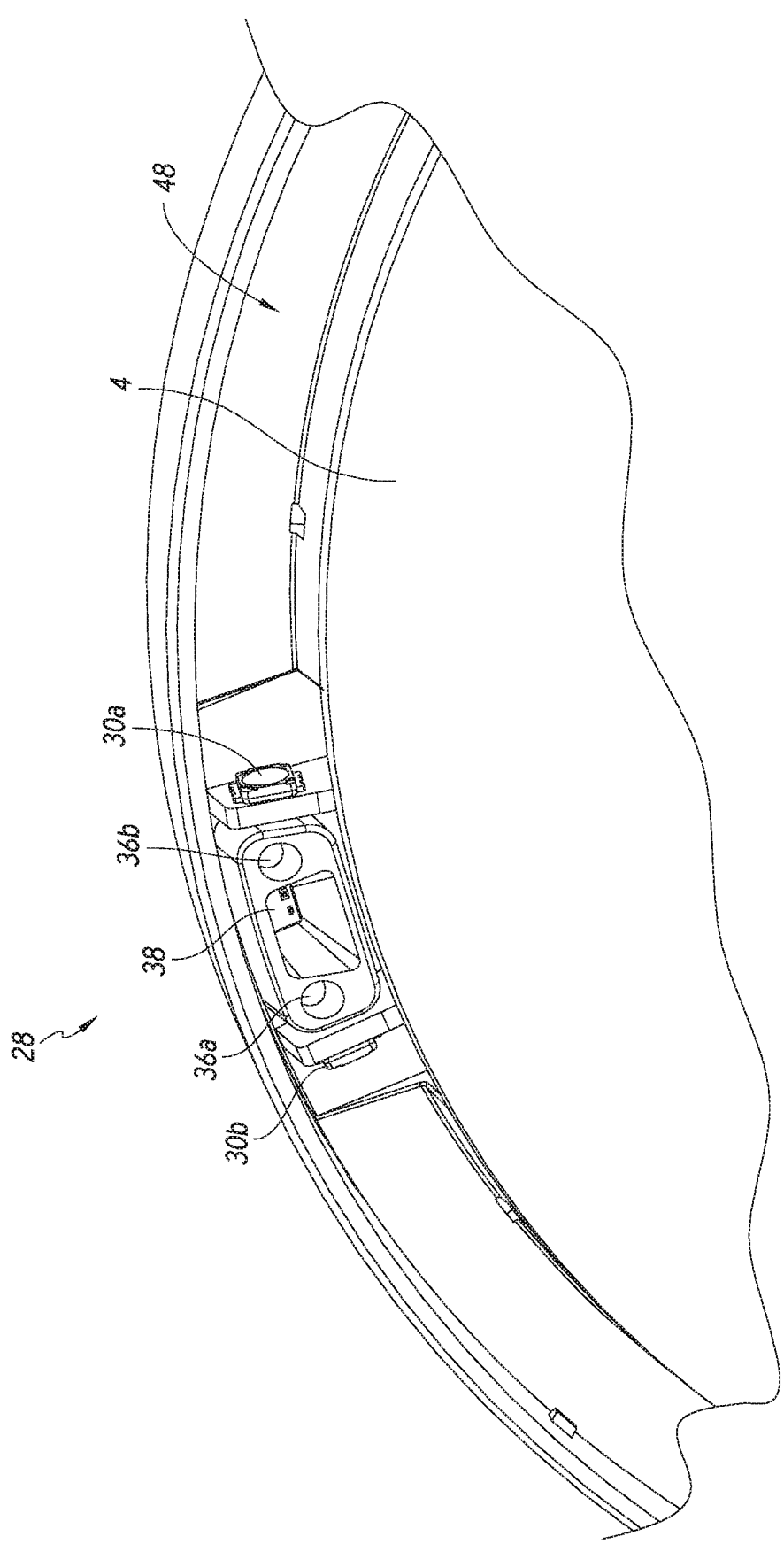
FIG. 6 illustrates an enlarged view of a portion of the embodiment of FIG. 1, with the light pipe cover removed, showing a sensor assembly.

The light sources can be positioned in various orientations in relation to each other, such as side-by-side, back-to-back, or otherwise. In certain embodiments, the light sources can be positioned to emit light in opposing directions (as shown in FIGS. 6 and 16). For example, as shown in FIG. 6, a first light source 30a projects light in a first direction (e.g., clockwise) around the periphery of the mirror 4, and a second light source 30b projects light in a second direction (e.g., counter-clockwise) around the periphery of the mirror 4. As shown, the light source 30a can project light toward a channel 48 that holds the light pipe 10 (not shown) of the mirror assembly 2. As shown in FIG. 15, in some embodiments, multiple light sources can be positioned to direct light into a channel 148 that houses the light pipe. As shown, a first light source 130a', 130a" projects light in a first direction (e.g., counter-clockwise) around the periphery of the mirror 104 (not shown), and a second light source 130b', 130b" projects light in a second direction (e.g., clockwise) around the periphery of the mirror 104. In certain embodiments, the light sources can be positioned to emit light generally and/or substantially orthogonally to the viewing surface of the mirror assembly 2, 102. In certain embodiments, the light sources can be positioned to emit light tangentially in relation to the periphery of the mirror 4, 104, 104', 104".

In some embodiments, the light sources are configured to provide multiple colors of light and/or to provide varying colors of light. For example, the light sources can provide two or more discernable colors of light, such as red light and yellow light, or provide an array of colors (e.g., red, green, blue, violet, orange, yellow, and otherwise). In certain embodiments, the light sources are configured to change the color or presence of the light when a condition is met or is about to be met. For example, certain embodiments momentarily change the color of the emitted light to advise the user that the light is about to be deactivated.

In some implementations, either or both the color and color temperature of the light emitted from the mirror assembly 2, 102 is independently adjustable. Using this adjustability, the light emitted from the light sources can be configured to mimic or closely approximate light encountered in one or a plurality of different natural or non-natural light environments. For example, in some variations, the light emitted from the mirror can mimic natural light (e.g., ambient light from the sun, moon, lightning, etc.). In certain implementations, lighting conditions that match (or closely approximate) restaurants (e.g., incandescent lights, candlelight, etc.), offices (e.g., fluorescent lights, incandescent lights, and combinations thereof), outdoor venues at different times of day (dawn, morning, noon, afternoon, sunset, dusk, etc.), outdoor venues at different seasons (spring, summer, fall, winter), outdoor venues having different weather conditions (sunny, overcast, partly cloudy, cloudy, moonlit, starlit, etc.), sporting arenas, opera houses, dance venues, clubs, auditoriums, bars, museums, theatres, and the like can be achieved using the mirror assembly. In some variants, the light emitted from the mirror comprises a substantially full spectrum of light in the visible range. The mirror assembly can be configured to permit a user to select among the different types of light (e.g., color, temperature, intensity, etc.) emitted from the one or more light sources, either on the mirror assembly or from a remote source, or the mirror assembly can be configured to automatically select among the different types of light emitted from the one or more light sources.

In some variants, the intensity of individual light sources (e.g., LEDs or combinations of LEDs) is independently adjustable. In certain implementations, changes in color temperatures can be achieved by pairing and/or mixing one or more LEDs having one color temperature with one or more other LEDs having different color temperatures. The relative intensity of light from those LEDs can then be individually adjusted (e.g., by adjusting the brightness of one or more LEDs) to increase or decrease the color temperature. In some embodiments, changes in colors (e.g., hues, shades, tints, tones, tinges, etc.) can be achieved by pairing one or more LEDs having one color with one or more LEDs having a different color. In some embodiments, as described above, the intensity of light emitted from different colored LEDs can be individually adjusted to cause a color change (e.g., to a color an individual LED or to colors achieved through combinations of the light emitted from the LEDs—color mixing). Adjusting the relative intensity of different LEDs can allow the user to adjust the color of the light emitted by the light sources, the color temperature of the light emitted by the light sources, the brightness of the light emitted by the light sources, or combinations thereof. In some embodiments, the intensity of individual LEDs can be adjusted automatically (by selecting a preset light configuration, a downloaded light configuration, or an uploaded configuration) or manually (e.g., by adjusting color, tint, brightness, intensity, temperature, or others with manual user adjustments). In some embodiments, these adjustments allow a user to select the light conditions that mimic any light environment.

In some embodiments, the light sources have a color temperature of greater than or equal to about 4500 K and/or less than or equal to about 6500 K. In some embodiments, the color temperature of the light sources is at least about 5500 K and/or less than or equal to about 6000 K. In certain embodiments, the color temperature of the light sources is about 5700 K. As an example and as discussed elsewhere herein, in some embodiments, light emitters can be paired with other light emitters to give desired colors and color temperatures. For instance, in some embodiments, LEDs (e.g., 1, 2, 3, 4 or more) having one color temperature (e.g., of 2700K) can be paired and/or mixed with LEDs (e.g., 1, 2, 3, 4 or more) having a different color temperature (e.g., of 6500K) to form a single light source. In some variants, one or more LEDs (e.g., 1, 2, 3, 4 or more) having a first color (e.g., red, orange, yellow, green, blue, indigo, violet, and the like) can be paired with one or more LEDs (e.g., 1, 2, 3, 4 or more) having a different color. In certain variants, a light source can be formed using LEDs (e.g., one or more LEDs) that emit incandescent light color temperatures and LEDs (e.g., one or more LEDs) that emit sunlight color temperatures. In certain variants, a pair of LEDs that emit warm (e.g., yellow-orange) color temperatures and a pair of LEDs that emit white light (e.g., cool white light) are used.

In some embodiments, LEDs having color temperatures of at least: about 1700K, about 1800 K, about 1900K, about 2000 K, about 2200 K, about 2400K, about 2600K, about 2800 K, about 3000 K, about 3200 K, about 3400 K, about 3600 K, about 3800 K, about 4000 K, about 4200 K, about 4400 K, about 4600 K, about 4800 K, about 5000 K, about 5200 K, about 5400 K, about 5600 K, about 5800 K, about 6000 K, about 6200 K, about 6400 K, about 6600 K, about 6800 K, about 7000 K, ranges spanning any two of the aforementioned values, values greater than the aforementioned values, or otherwise can be selected for use in the mirror assembly 2, 102. In some embodiments, LEDs having color temperatures in the range from about 1700 K to about 2500 K, from about 2500K to about 3500 K, from about 3500 K to about 4500 K, from about 4500K to about 5500 K, from about 5500 K to about 6500K or from about 6500K to about 7000K can be independently paired with LEDs having colors temperatures within these same or different ranges. In some embodiments, emitted light with color temperatures of at least: about 1700K, about 1800 K, about 1900K, about 2000 K, about 2200 K, about 2400K, about 2600K, about 2800 K, about 3000 K, about 3200 K, about 3400 K, about 3600 K, about 3800 K, about 4000 K, about 4200 K, about 4400 K, about 4600 K, about 4800 K, about 5000 K, about 5200 K, about 5400 K, about 5600 K, about 5800 K, about 6000 K, about 6200 K, about 6400 K, about 6600 K, about 6800 K, about 7000 K, ranges spanning any two of the aforementioned values, values greater than the aforementioned values, or otherwise can be achieved using mirror assembly. In some embodiments, the light sources can be adjusted to have a color temperature in the range from about 1700 K to about 6500 K from about 4500K to about 6500 K. In some embodiments, the light sources have a color temperature of greater than or equal to about 2400 K and/or less than or equal to about 6800 K. In some embodiments, the color temperature of the light sources is at least about 5500 K and/or less than or equal to about 3000 K. In certain embodiments, the color temperature of the light sources is about 2700 K or about 6500K.

Color temperatures and intensities can be selected by a user to duplicate or replicate particular light environments to improve the selection of make-up color palates, to apply make-up in optimal configurations and patterns, and to optimize grooming and make-up application outcomes. For instance, a person applying make-up to be worn at a candlelit restaurant may wish to match the color temperature and light intensity of that environment when applying make-up. A person who is applying make-up to be worn at a sunlit picnic may wish to match the color temperature and light intensity of that environment when applying make-up. Thus, a user can select particular temperatures of light to replicate lighting conditions.

In certain embodiments, differing light emitters (e.g., LEDs) can be positioned at each end of a light pipe to increase the number of colors, color temperatures, brightness settings, etc., that can be achieved.

In certain variants, the light emitters are controlled by an algorithm that selects individual light emitter intensities to provide an array of intensities, color temperatures, and color palates.

In some embodiments, the light sources have a color rendering index of at least about 70 and/or less than or equal to about 90. Certain embodiments of the one or more light sources have a color rendering index (CRI) of at least about 80 and/or less than or equal to about 100. In some embodiments, the color rendering index is high, at least about 87 and/or less than or equal to about 92. In some embodiments, the color rendering index is at least about 90. In some embodiments, the color rendering index can be about 85. In some embodiments, the light sources have a color rendering index of at least about 45 and/or less than or equal to about 95. Certain embodiments of the one or more light emitters 64 have a color rendering index of at least about 50 and/or less than or equal to about 100. In some embodiments, the light emitters have a color rendering index of at least about 87 and/or less than or equal to about 92. In some embodiments, the light emitters have a color rendering index of at least about 80 and/or less than or equal to about 85. In some embodiments, the light emitters have a color rendering index of at least about 70 and/or less than or equal to about 75. In some embodiments, the light emitters have a color rendering index of at least about 45 and/or less than or equal to about 55.

In some embodiments, the luminous flux can be in a range from about 1 lm to about 110 lm. In some embodiments, the luminous flux can be adjusted to be less than or equal to about 1 lm, about 10 lm, about 20 lm, about 30 lm, about 40 lm, about 50 lm, about 60 lm, about 70 lm, about 80 lm, about 90 lm, about 100 lm, about 110 lm, about 140 lm, about 160 lm, about 170 lm, about 180 lm, values between the aforementioned values, ranges spanning the aforementioned values, or otherwise. In some embodiments, the luminous flux can be at least about 80 lm and/or less than or equal to about 110 lm. In some embodiments, the luminous flux can be at least about 90 lm and/or less than or equal to about 100 lm. In some embodiments, the luminous flux can be about 95 lm.

In some embodiments, each light source consumes at least about 2 watts of power and/or less than or equal to about 3 watts of power. In certain embodiments, each light source consumes about 2 watts of power. In some embodiments, the forward voltage of each light source can be at least about 2.4 V and/or less than or equal to about 8.0 V. In some embodiments, the forward voltage can be at least about 2.8 V and/or less than or equal to about 3.2 V. In some embodiments, the forward voltage is about 3.0 V. In some embodiments, the forward voltage can be at least about 5.5 V and/or less than or equal to about 7.5 V. In some embodiments, the forward voltage is about 2.5 to about 3.5 V.

In certain embodiments, the width of each the light pipe 10, 110 (measured generally radially from the center of the mirror 4, 104) can be less than or equal to about 30 mm, about 20 mm, about 10 mm, about 7.5 mm, about 6.5 mm, about 5.0 mm, about 4.0 mm, values between the aforementioned values, or otherwise.

The mirror assembly 2 can include a sensor assembly. In some embodiments, as shown in FIG. 1, the sensor assembly can be positioned near a lower region of the mirror assembly 2 behind the cover member 6. In some embodiments, as in FIG. 9, the sensor assembly can be positioned near an upper region of the mirror assembly 102 behind the cover member 106 or elsewhere (e.g., the bottom, a side, or otherwise). Alternatively, the sensor assembly can be disposed along any other portion of the mirror assembly 2, 102 or not positioned on the mirror assembly 2, 102. For example, the sensor assembly can be positioned in any location in a room in which the mirror assembly 2, 102 sits. In some embodiments, the sensor assembly can be located in a phone or other handheld device that activates the mirror assembly 2 when the user is in proximity to it.

In some embodiments, the sensor assembly 28, 128 can include one or more transmitters 36a, 36b, 136 and receivers 38, 138 as shown in FIGS. 6 and 16. In certain embodiments, as shown in FIG. 6, the sensor assembly 28, 128 comprises a housing 28' that supports the one or more light transmitters and one or more receivers, each of which can be provided behind the cover member 6, 106. In some implementations, the housing comprises hard or rigid plastic (e.g., injection molded or otherwise), rubber, synthetic polymer, metal, composite, or another similar material. In some embodiments, the housing comprises a projection (e.g., a step, lip, elevated platform, etc.; not shown) that projects from the main body of the sensor assembly 28, 128. In some embodiments, the sensor assembly 80 further comprises a gasket. In certain variants, the sensor assembly further comprises a coverslip (not shown). In some embodiments, the coverslip fits over and/or holds the gasket in contact with or within the housing and the gasket is held in place by the housing via the projection. In some variants, the coverslip fastens into the housing using a fastener (e.g., a snap, clip, screw, etc.). In certain embodiments, the coverslip provides consistent distributed pressure against the gasket partially compressing it and/or holding it flush against the housing via the projection. In some variants, the coverslip, the gasket, housing assembly reproducibly provides a separation of a signal from the transmitter 36a, 36b, 136 signal from the receiver 38, 138 signal.

In some embodiments, housing of the sensory assembly 28, 128 beneficially lessens and/or minimizes bleeding of signal from the transmitters 36a, 36b, 136 to the receiver 38, 138 (e.g., laterally escaping or otherwise diffusing from the transmitters to the receiver through a portion of the sensor assembly). In some embodiments, this configuration can facilitate replacement and fixation of the sensor assembly in the mirror assembly 2, 102.

In some embodiments, the gasket is composed of a soft, resilient, and/or flexible material, such as a material selected from one or more of the following: silicone, PTFE, rubber, polyethylene, nylon, polypropylene, composite, and the like.

The sensor assembly can include a proximity sensor or a reflective-type sensor. For example, the sensor can be triggered when an object (e.g., a body part) is moved into, and/or produces movement within, a sensing region. The transmitters can be configured to produce a signal (e.g., electromagnetic energy such as infrared light), and the receiver can be configured to receive that signal (e.g., electromagnetic energy such as infrared light). In some embodiments, the cover member 6, 106 is two-way mirror (e.g., a partially transparent and partially reflective portion of the mirror where, when one side of the mirror is lit and the other is dark, it allows viewing—or transmission—through the mirror from the darkened side but not from the lit side). In some embodiments, the cover member 6, 106 appears to be a mirrored surface but it allows signal emitted from the transmitters can pass through it. In some embodiments, the beam of light emitting from the transmitters 36a, 36b, 136 can define a sensing region. In certain variants, the transmitter can emit other types of energy, such as sound waves, radio waves, or any other signals. The transmitter and receiver can be integrated into the same sensor or configured as separate components.

In some embodiments, the transmitters 36a, 36b, 136 can emit light in a generally perpendicular direction from the front face of the mirror assembly. In some embodiments, the transmitters 36a, 36b, 136 emit light at an angle from a perpendicular to the front face of the mirror assembly by at least about 5 degrees and/or less than or equal to about 45 degrees. In some embodiments, the transmitters 36a, 36b, 136 emit light at an angle from a perpendicular to the front face of the mirror assembly by at least about 15 degrees and/or less than or equal to about 60 degrees. In certain embodiments, the transmitters 36a, 36b, 136 emit light at a downward angle of about 15 degrees.

In some embodiments, the sensor assembly 28, 128 can detect an object within a sensing region. In certain embodiments, the sensing region can have a range from at least about 0 degrees to less than or equal to about 45 degrees downward and/or upward relative to an axis extending from the sensor assembly 80, and/or relative to a line extending generally perpendicular to a front surface of the sensor assembly, and/or relative to a line extending generally perpendicular to the front face of the mirror and generally outwardly toward the user from the top of the mirror assembly. In certain embodiments, the sensing region can have a range from at least about 0 degrees to less than or equal to about 25 degrees downward and/or upward relative to any of these axes or lines. In certain embodiments, the sensing region can have a range from at least about 0 degrees to less than or equal to about 15 degrees downward relative to any of these axes or lines. In some embodiments, the sensing region extends a particular distance away from a mirrored surface of the mirror system, such that any objected detected within such distance will cause the sensor assembly 28, 128 to trigger, causing the one or more mirror lights, or some other functionality of the mirror system, to actuate. Any feature, structure, material, or step that is described and/or illustrated in U.S. Patent Application Publication Nos. 2013/0235610 and 2016/0255941 for sensing proximity to assist in actuating one or more functions, or for increasing the sensitivity of a sensor assembly, can be used with or instead of any feature, structure, material, or step that is described and/or illustrated in the rest of this specification, as with all other disclosure.

In some embodiments, the sensing region can be adjusted by modifying one or more features of the cover member 6, 106. In certain embodiments, the cover member 6, 106 can include a lens material. In certain embodiments, the cover member 6, 106 can include a generally rectangular cross-section. In certain embodiments, the cover member 6, 106 can include a generally triangular cross-section. In certain embodiments, the cover member 6, 106 can include a front surface generally parallel or coplanar with a front surface of the mirror 4, 104, 104'. In certain embodiments, the cover member 6, 106 can include a front surface at an angle relative to the front surface of the mirror 4, 104, 104'. In certain embodiments, the front surface of the cover member 6, 106 can be positioned at an angle relative to the sensor assembly 28.

In some embodiments, the sensing area generally widens as the front surface of the cover member 6, 106 moves from the configuration generally parallel or coplanar with the front surface of the mirror 4, 104, 104' to the configuration at an angle relative to the front surface of the mirror 4, 104, 104'. In certain embodiments, when the front surface of the cover member 6, 106 is generally parallel or coplanar with the front surface of the mirror, the sensing region can have a range from about 0 degrees to about 15 degrees downward relative to the axis extending generally from the sensor assembly and/or generally perpendicular to the front surface of the sensor assembly. In certain embodiments, when the front surface of the cover member 6, 106 is at an angle relative to the front surface of the mirror, the sensing region can have a range from about 0 degrees to about 25 degrees downward relative to the axis extending generally from the sensor assembly and/or generally perpendicular to the front surface of the sensor assembly.

The sensor assembly 28, 128 may only require enough power to generate a low power beam of light, which may or may not be visible to the human eye. Additionally, the sensor assembly can operate in a pulsating mode. For example, the transmitters can be powered on and off in a cycle such as, for example, for short bursts lasting for any desired period of time (e.g., less than or equal to about 0.01 second, less than or equal to about 0.1 second, or less than or equal to about 1 second) at any desired frequency (e.g., once per half second, once per second, once per ten seconds). Cycling can greatly reduce the power demand for powering the sensor assembly. In operation, cycling does not degrade performance in some embodiments because the user generally remains in the path of the light beam long enough for a detection signal to be generated.

In some embodiments, if the receiving portion 38, 138 detects reflections (e.g., above a threshold level) from an object within the beam of light emitted from the transmitter, the sensor assembly 28, 128 can send a signal to a controller to activate a light source. In some embodiments, the controller assembly is operably connected (via a wire or a conduit) to one or a plurality of printed circuit boards (PCBs), which can provide hard wired feedback control circuits, a processor and memory devices for storing and performing control routines, or any other type of controller.

In some embodiments, the sensor assembly 28, 128 can send different signals to the controller (not pictured) based on the amount of light reflected back toward the receiver. For example, in some embodiments, the sensor assembly is configured such that the amount of light emitted by the light sources is proportional to the amount of reflected light, which can indicate the distance between the mirror and the user. In certain variants, if the user is in a first sensing region, then the controller causes the one or more light sources to activate from an off state or to emit a first amount of light. If the user is in a second sensing region (e.g., further away from the sensor assembly than the first sensing region), then the controller causes the one or more light sources 30a, 30b, 130a', 130a", 130b', 130b" to emit a second amount of light (e.g., less than the first amount of light).

In some embodiments, the controller can trigger at least two different levels of brightness from the light sources, such as brighter light or dimmer light. For example, if the user is anywhere in a first sensing region, then the controller signals for bright light to be emitted; if the user is anywhere in a second sensing region, then the controller signals for dim light to be emitted.

In some embodiments, the controller can also trigger more than two brightness levels. In certain implementations, the level of emitted light is related (e.g., linearly, exponentially, or otherwise) to the distance from the sensor to the user. For example, as the user gets closer to the sensor assembly, the one or more light sources emit more light. Alternatively, the mirror assembly 2, 102 can be configured to emit more light when the user is further away from the sensor assembly 28, 128 and less light as the user moves closer to the sensor assembly (as may be configured using user settings). In some embodiments, the mirror assembly 2, 102 can be configured to emit more light when the user is closer to a focal point of a mirror of the sensor assembly 28, 128 and less light as the user moves farther from the focal point of the mirror of the sensor assembly (as may be configured using user settings). In some embodiments, the multiple sensing regions allow the mirror assembly to calculate the distance an object is from the mirror and to adjust lighting settings accordingly. For instance, in certain implementations, based on the distance the object is from the mirror assembly, an algorithm can calculate the amount of illumination necessary to illuminate the object. Based on the distance, more or less light can be emitted from the light source to illuminate the object.

In some embodiments, each transmitter of the sensor emits a cone of light with proper shielding or guiding on the transmitters, which defines the detection zones of the sensors (subject to the nominal range of the sensors). The area in which the two cones overlap creates a primary sensing region, and areas in which the two cones emit light but do not overlap create a secondary sensing region. If a user is detected in the primary sensing region, then the sensor assembly sends an appropriate signal to the controller, which triggers a first level of light from the light sources. If a user is detected in the secondary sensing region, then the sensor assembly sends an appropriate signal to the controller, which activates a second level of light from the light sources. In some embodiments, the first level of light is brighter than the second level of light. In other embodiments, the second level of light is brighter than the first level of light. In some embodiments, the sensor assembly defines more than two sensing regions and triggers more than two levels of light.

As shown in FIG. 6, the light emitting portions 38 can be positioned generally along the same horizontal plane (e.g., relative to the ground). The sensor assembly 28 can issue an appropriate signal to the controller, which can trigger brighter light when the user is within a first sensing region, directly in front of the sensor assembly 28. The sensor assembly can trigger dimmer light when the user is within a second sensing region, in the periphery of the mirror assembly 2, 102.

The sensor assembly 28, 128 can include two or more light emitting portions that do not create overlapping detection cones within the nominal range of the sensors. A first cone of light defines a first sensing region and a second cone of light defines a second sensing region. If a user is detected in the first sensing region alone or the second sensing region alone, then the sensor assembly signals the controller, which activates a first level of light from the light sources. In certain variants, if a user is concurrently detected in the first and second sensing regions, then the sensor assembly signals the controller to activate a second level of light from the light sources. In some embodiments, the first level of light is brighter than the second level of light. In other embodiments, the second level of light is brighter than the first level of light.

Activation of the light sources or adjusting the amount of light emitted from the light sources can be based on factors other than the presence of a user within a sensing region. For example, the amount of light emitted from the light sources can adjust based on motion within the detection zone and nominal range of the sensor. Certain implementations are configured such that, if a user moves his/her hand in an preset direction (e.g., up, down, left, right, diagonally, etc.), then the controller changes an aspect of the light emitted from the light source (e.g., color temperature change, color, or light intensity). If the user moves then moves his/her hand in a in the opposite direction, the opposite light effect will be accomplished.

Once a light source 30a, 30b, 130a', 130a", 130b', 130b" activates, the light source can remain activated so long as the sensor assembly 28, 128 detects an object in a sensing region. Alternatively, the light source remains activated for a pre-determined period of time. For example, activating the light source can initialize a timer. If the sensor assembly does not detect an object before the timer runs out, then the light source is deactivated. If the sensor assembly detects an object before the timer runs out, then the controller reinitializes the timer, either immediately or after the time runs out.

In some embodiments, the sensor assembly can detect an object's movement in a sensing region. In certain implementations, when the object's movement is sufficient in nature, the mirror assembly will activate. In some variants, the sufficiency of an object's movement is based on whether the moving object is of a certain minimum size (e.g., about that of a human adult or child), whether the movement of the object is of a certain minimum speed (e.g., an average walking speed, or the speed of waving hand), and/or whether the movement of the object is of a certain maximum distance from the mirror assembly (e.g., less than about 10, 5, 3, 2, or 1 foot).

Once activated, the light source can remain activated for a pre-determined period of time. For example, as discussed above, activating the light source can initialize a timer. If the sensor assembly does not detect sufficient movement from the object before the timer runs out, then the light source deactivates. However, if the sensor assembly detects movement sufficient in nature before the timer runs out, then the controller reinitializes the timer, keeping the mirror assembly in an active state. In some embodiments, the amount of object movement required to reinitialize the timer can be the same as or smaller in kind, speed, or frequency than the amount of movement sufficient to initially activate a mirror assembly that is inactive, or the proximity distance of the object to the mirror assembly can be the same as or greater than the proximity distance of the object to the mirror assembly sufficient to initially activate the mirror system that is inactive. For instance, in certain embodiments, a movement that is insufficient to activate the mirror assembly in the first place can be sufficient to keep the mirror assembly active once in the active state. The timing and increased sensitivity features can be used to ensure that the mirror assembly does not deactivate prematurely or unexpectedly or at a time when it is still in use.

The one or more sensing regions can be used in any type of configuration that allows the user to control an aspect of the operation of the mirror assembly 2, 102. For example, the one or more sensing regions can be used to trigger the mirror assembly 2, 102 to emit different levels of light, operate for varying durations of time, pivot the mirror, or any other appropriate parameter.

In several embodiments, the mirror assembly 2, 102 has one or more modes of operation, for example, an on mode and an off mode. A controller can activate different modes based on signals received from different sensing regions, motions, or any other parameter. Any of the modes described below can be used separately or in combination with each other.

The mirror assembly 2, 102 can include a task mode. When the task mode is activated, the mirror assembly 2, 102 can trigger a light source to remain activated or cause the sensor to enter a hyper mode (e.g., during which the sensor is configured to have increased sensitivity to movement within a zone, or to have a larger or wider sensitivity zone, or to have some other increased sensitivity signal detection) for a pre-determined period of time. For example, in some embodiments, the task mode can be especially useful when the user plans to use the mirror assembly 2, 102 for an extended period of time, especially if the user's body position is substantially still for an extended period, to avoid intermittent loss of lighting while the user is still looking into the mirror. The task mode can trigger a light source to remain activated for a predetermined amount of time, even if the user is not detected within a sensing region. The pre-determined amount of time can be less than or equal to about: 3 minutes, 5 minutes, 10 minutes, or any other suitable period of time. If the sensor assembly 28 does not detect a user before the timer runs out, then the mirror assembly 2, 102 deactivates task mode. In certain embodiments, the mirror assembly 2, 102 remains in task mode until the user signals a light source to deactivate.

The mirror assembly 2, 102 can include a power saver mode. When the power saver mode is activated, the light source emits less light than the mirror assembly 2, 102 when not in power saver mode. The power saver mode can be user-activated and can be used when a user plans to use the mirror for a relatively long period of time. Alternatively, the mirror assembly 2, 102 enters power saver mode automatically as a transition between on mode and off mode. For example, a controller can initialize a timer when a light source activates. If the sensor assembly does not detect a user before the timer runs out, then the controller enters power saver mode and initializes a second timer. If the sensor assembly does not detect a user before the second timer runs out, then the controller deactivates the light source.

The mirror assembly 2, 102 can include a hyper mode. As described above, in some embodiments, the mirror assembly 2, 102 has two light transmitters, each emitting a cone of light. In certain implementations, the controller only triggers the light sources to activate when the sensor assembly detects an object in the region where the two cones of light intersect (e.g., the primary sensing region). In some embodiments, after the light source has been activated, the mirror assembly 2, 102 enters hyper mode. The controller can keep the light sources activated as long as the sensor assembly detects the user in either one or both of the cones of light (the secondary or the primary sensing regions). The secondary sensing region can be different from the primary sensing region. For example, the secondary sensing region can be larger than the primary sensing region. In some embodiments, this allows the user to move around and still keep the light source activated. Hyper mode can also help save power by preventing unintentional activation when the user is near a periphery of the mirror assembly 2, 102.

The mirror assembly 2, 102 can also include ambient light sensing capabilities. For example, when the ambient light is relatively low, the light emitting from the light source will be brighter than if the ambient light is relatively bright. Conversely, when the ambient light is relatively low, the light emitting from the light source can be dimmer than if the ambient light is relatively bright. In some embodiments, dimming the emitted light in dim ambient conditions advantageously conserves power and/or battery life used by the mirror assembly. The receiver 38, 138 can detect both ambient light and light emitted from the transmitter, or the mirror assembly 2, 102 can include a second sensor assembly for detecting ambient light.

The controller can adjust the amount of signal necessary to trigger a light source based on the amount of detected ambient light. For example, the amount of detected light required to activate the light sources can be proportional to the ambient light. Such a configuration can allow the light source to be activated even when the level of ambient light is modest (e.g., in dimmed bathroom lighting). When the ambient light is less than or equal to a first level, the controller activates light source when a first level of the reflected signal is detected. When the ambient light is greater than the first level, the controller activates light source when a second level (e.g., greater than the first level) of the reflected signal is detected.

The controller can also adjust the amount of light emitted by the light sources based on the ambient light. Such a configuration can, for example, avoid emitting a starting burst of very bright light that would be uncomfortable to a user's eyes, especially when the user's eyes were previously adjusted to a lower light level, such as when the surrounding environment is dim. For example, the amount of light emitted by the light sources can be proportional to the amount of ambient detected light.

The controller can also gradually increase the level of emitted light from the light sources when the light sources are activated and/or gradually decrease the amount of light emitted from the light sources when the light sources are deactivated. Such a configuration can inhibit discomfort to a user's eyes when the light sources turn on.

The mirror assembly 2, 102 can also include a calibration mode. For example, the calibration mode can calibrate the different sensing regions with different output characteristics as desired by the user. An algorithm can be configured to utilize multiple sensing regions to perform different functions. For example, a user can configure a first sensing region to correspond with a first level of light (e.g., lower intensity light) and configure a second sensing region to correspond with a second level of light (e.g., higher intensity light). In another example, the user can adjust the size (e.g., width or height) of the sensing region. The user can designate a first sensing region to correspond with a first level of light and designate a second sensing region to correspond with a second level of light. This calibration mode can be triggered by a user indicator, such as pressing a button, activating a sensor, or any other appropriate mechanism.

In some embodiments, the sensing region is designed so that the center of a user's face is generally positioned at about the center of the mirror portion, at a suitable perpendicular distance away from the mirror to permit the user to generally closely fit the user's face within the outer periphery of the mirror. For example, in some embodiments, the region can be within a range of at least about 10 inches and/or less than or equal to about 12 inches (e.g., about 11 inches) from the front face of the mirror, and another region can be in a range of at least about 7 inches and/or less than or equal to about 9 inches (e.g., about 8 inches) from the front face of the mirror.

An algorithm can be configured to send a command to activate the light sources based on the detected signal. The algorithm can also be configured to emit different levels of light or vary durations of time. The algorithm can also be configured to send a command to trigger one or more modes, including any of the modes discussed above. The command can vary based on the signal received. For example, the signal can depend on the distance between an object and the sensor assembly 28, 128, and/or other parameters such as duration or path of motion.

The algorithm can initialize a timer when a light source is activated. The timer can run for at least 30 seconds and/or less than or equal to 60 seconds, or any other quantity of time. In some embodiments, the timer can run for less than 30 seconds. In some embodiments, the timer can run for about five seconds. In some embodiments, the light source will immediately turn off when the time runs out. In some embodiments, the light will remain activated so long as the sensor assembly 28, 128 detects an object before time runs out. If the sensor assembly detects the object, the timer can immediately restart, or restart when the time runs out. If the sensor assembly does not detect an object before the time runs out, then the light source will turn off.

The algorithm can incorporate a delay that deactivates the sensor or otherwise prevents a light source from emitting light immediately after the light source deactivates. The delay can be for 1 second, 5 seconds, or any other amount of time. The delay helps prevent the user from unintentionally triggering the light source. During the delay period, the light source will not emit light even if an object is in a sensing region during the delay period. If the sensor assembly detects an object after the delay period, the light sources can emit light again.

The level of light emitted from the light sources does not depend solely or at all on the length of time that the user remains in the sensing region. The level of light emitted from the light sources can differ depending on the location of the user in a different sensing region, even if certain other parameters are the same (such as the length of time that the user is sensed in a region).

In some embodiments, the mirror assembly 2, 102 can include an algorithm configured to detect whether the mirror was inadvertently activated, such as with a false trigger or by the presence of an inanimate object. For example, when the sensor detects an object, the controller can initialize a timer. If the mirror assembly does not detect any movement before the timer runs out, then the light sources will turn off. If the mirror assembly does detect movement, then the timer can re-initialize.

The illuminance level can be higher at a distance closer to the face of the mirror. In certain variants, the lux at a distance of 6 inches from the sensor (and/or the mirror 4, 104, 104', 104") is about 600 lux. In certain variants, the lux at a distance of 6 inches from the sensor (and/or the mirror) is at least about 1 lux and/or less than about 1400 lux, at least about 100 lux and/or less than about 1100 lux, at least about 200 lux and/or less than about 1000 lux, at least about 300 lux and/or less than about 900 lux, at least about 400 lux and/or less than about 800 lux, at least about 500 lux and/or less than about 700 lux, ranges between the values comprising the aforementioned ranges, or otherwise. In some embodiments, the illuminance at an outer periphery of the sensing region is about 700 lux. In some embodiments, the illuminance at an outer periphery of the sensing region is about 600 lux. In some embodiments, the illuminance at an outer periphery of the sensing region is at least about $5 \times 10^{-5}$ lux (about the illuminance of starlight) and/or less than about $1 \times 10^5$ lux (about the illuminance of direct sunlight). In certain variants, the lux at the outer periphery of the sensing region is at least about $1 \times 10^{-4}$ lux and/or less than about $1 \times 10^4$ lux, at least about $1 \times 10^{-3}$ lux and/or less than about $1 \times 10^3$ lux, at least about $1 \times 10^{-2}$ lux and/or less than about $1 \times 10^3$ lux, at least about $1 \times 10^{-1}$ lux and/or less than about $1 \times 10^4$ lux, ranges between the aforementioned values, or otherwise. Many other sensing regions can also be utilized, some of which are described below. In certain variants, the mirror assembly 2, 102 can include a dimmer to adjust the intensity of the light.

In some embodiments, the sensing region extends less than or equal to about: 8, 12, 16, or 24 inches away from the face of the mirror. Many other sensing regions can also be utilized, some of which are described herein. In certain variants, the mirror assembly 2, 102 can include a dimmer to adjust the intensity of the light.

As shown in FIG. 6, the light sources can be positioned near the uppermost region of the mirror assembly. As shown in FIG. 16, the light sources can be positioned near the bottommost region of the mirror assembly. In other embodiments, the light sources are positioned at other portions of the mirror assembly 2, 102, such as, within the light pipe 10, 110 at spaced-apart intervals around the periphery of the support portion mirror and/or along a side of a mirror. In some embodiments, as described elsewhere herein and as shown in FIGS. 6 and 16, the light emitters are not aimed at a back surface of the outer face 42, 142. Instead, the light emitters project light into a light pipe 10, 110 which resides in a channel 41, 141 of the mirror assembly 2, 102. The light sources can be positioned to emit light substantially orthogonally to the viewing surface of the mirror assembly 2, 102. The light emitters 130a', 130a", 130b', 130b" shown in FIG. 16 are positioned and/or aimed so that the light emitted from them is directed substantially orthogonally to the viewing surface (e.g., in a direction not toward the user). In some embodiments, the light emitters are positioned to emit light in a direction that is substantially in a plane formed by the mirror 104 and/or in a direction that is substantially in a plane that is parallel to the plane formed by the mirror 104. In some embodiments, despite being positioned to not emit light toward the user, the light from the mirror assembly is projected in a manner that allows it to exit the outer face 42, 142 to illuminate the user.

The mirror assembly 2 can include a mechanism to actively or passively dissipate, transfer, or radiate heat energy away from the light sources, such as a fan, vent, and/or one or more passive heat dissipating or radiating structures 34, 134. As shown in FIG. 7, the support portion 20 can include a receiving portion near an upper region of the mirror assembly 2 for receiving a heat dissipating structures 34a, 34b. The heat dissipating structures 34a, 34b can formed of materials with a high rate of heat conduction, such as aluminum or steel, to help remove heat from the mirror assembly that is generated by the light sources. Many other heat dissipating materials, such as copper or brass, can be used. Similar heat dissipating structures may be present in the embodiment shown in FIG. 9 (for instance, in the support portion 120).

The heat dissipating structures can dissipate heat created by the light sources and/or conduct electricity to the light sources, reducing the total number of necessary components. In some embodiments, the heat dissipating structure 34a, 34b can include one or more components that are generally comparatively long in one dimension, generally comparatively wide in another dimension, and generally comparatively narrow in another dimension, to provide a large surface area over a thin surface to conduct heat efficiently through the heat dissipating structure and then readily transfer such heat into the surrounding air and away from heat-sensitive electronic components in the mirror assembly. For example, the length of the heat dissipating structure 34a, 34b can be substantially greater than the width of the heat dissipating structure, and the width of the heat dissipating structure can be substantially greater than the thickness.

As shown in FIG. 7, the heat dissipating structures 34a, 34b can be separate components. The heat dissipating structures 34a, 34b can be positioned such that the first ends of each of the structures 34a', 34b' are closer together than the second ends of the fins 34a", 34b" (e.g., generally V-shaped). The structures 34a, 34b can be directly or indirectly connected to the light sources. For example, each of the structures 34a, 34b can receive a light source.

FIG. 7 shows a rear side of the mirror assembly without a rear cover portion 18. The second end of each of the heat dissipating structures 34a", 34b" can be positioned between the first end 40a and the second end 40b of the light pipe and on either side of the sensor assembly 28. The heat dissipating structures 34a, 34b can be positioned behind or within the support structure 20, 120. For example, the heat dissipating structures 34a, 34 can be positioned between a circuit board and the rear cover portion (not shown). The support portion 20, 120 can also include one or more clasps or other structures for engaging, for example, a circuit board.

As described elsewhere herein, the support portion 20, 120 can support the mirror 4, 104, 104', 104" and a light conveying structure, such as a light pipe 10, 110, positioned around at least a portion of a periphery of the mirror 4, 104, 104', 104". In some embodiments, the light pipe 10, 110 is positioned only along an upper portion of mirror 4, 104, 104', 104" or a side portion of the mirror 4, 104, 104', 104". In other embodiments, the light pipe 10, 110 extends around at least majority of the periphery of the mirror 4, 104, 104', 104", substantially the entire periphery of the mirror 4, 104, 104', 104", or around the entire periphery of the mirror 4, 104, 104', 104". In some embodiments, the support portion 20, 120 can include a structure, such as a ridge 121, which can support the light pipe 10, 110 (e.g., a portion of the light pipe 110 can be disposed along the ridge 121).

Some or all of the light from the light sources can be transmitted generally toward, or into, the light pipe 10, 110 (e.g., along the circumferential length of the light pipe). For example, as shown in FIG. 18, the light pipe 110 can include ends 140a, 140b, and the light sources can emit light into one or both of the ends 140a, 140b of the light pipe 110. The light sources can be positioned such that the light is emitted generally toward a user facing the viewing surface of the mirror assembly 102. For example, some or all of the light from the light sources and/or the light pipe 110 can be emitted toward, and reflected off of, another component before contacting the user.

When installed on the support member 20, 120, the light pipe 10, 110 has a radial width and an axial depth. Some variants have a radial width that is greater than or equal to than the axial depth. In certain implementations, the light pipe 10, 110 is configured to provide adequate area for the reflecting surface of the mirror 4, 104, 104', 104" and to provide sufficient area for light to be emitted from the light pipe 10, 110, as will be discussed in more detail below. For example, the ratio of the radial width of the light pipe 10, 110 to the radius of the mirror 4, 104, 104', 104" can be less than or equal to about: ⅕, ¹⁄₁₅, ¹⁄₃₀, ¹⁄₅₀, values in between, or otherwise.

As shown in FIG. 18, the light pipe 110 can be substantially circularly shaped. The light pipe 110 can include a gap 144, and the sensor assembly 128 and/or the light sources can be positioned in the gap 144. In some embodiments, the light pipe can be substantially linearly shaped, or the light pipe has a non-linear and non-circular shape. The light pipe 10, 110 can include acrylic, polycarbonate, or any other clear or highly transmissive material. The light pipe 10, 110 can be at least slightly opaque.

The light can pass along and through a portion of the light pipe 10, 110 and/or emit from the light pipe 10, 110 via an outer face 42, 142 of the light pipe 10, 110. In some embodiments, the light pipe is configured to transmit at least about 95% of the light emitted from the light sources. The light sources can be configured, in combination with light pipe, to emit light generally around the periphery of the mirror 4, 104, 104', 104". The light pipe 10, 110 can be configured to disperse light from the light sources through the light pipe 10, 110. The light sources and the light pipe 10 110 can be configured such that the amount of light emitted from the outer face 42, 142 is substantially constant along the length of the light pipe 10, 110. Many different ways of achieving a substantially constant intensity of conveyed light around the light pipe 10, 110 can be used.

The support portion 20, 120 and/or the light pipe 10, 110 can include features to facilitate generally even or uniform diffusion, scattering, and/or reflection of the light emitted by the light sources around the periphery of the mirror. For example, the support portion 20, 120 and/or light pipe 10, 110 can include an irregular anterior and/or posterior surface that is molded in a non-flat and/or non-planar way, etched, roughened, painted, and/or otherwise surface modified. The light scattering elements can be configured to disperse a substantially constant amount of light along the periphery of the mirror 4, 104, 104', 104". These features can help achieve high energy-efficiency, reducing the total number of light sources necessary to light substantially the entire periphery of the mirror and reducing the running temperature of the mirror assembly 2, 102.

The light pipe 10, 110 can comprise a generally translucent material with varying degrees of scattering. In some embodiments, a lower and/or minimum amount of scattering occurs in a region near the light source(s) and a higher and/or maximum scattering occurs in a region of the light pipe 10, 110 that is located furthest from the light source(s). The light pipe 10, 110 can comprise a region configured to scatter light in a varying manner. In some embodiments, the light conveying pathway or light pipe 10, 110 can comprise a varying, non-constant, non-smooth anterior, posterior, and/or interior surface formed from any suitable process, such as molding, etching (e.g., chemical, etc.), roughening (e.g., sand-blasting, abrading, etc.), painting, coating, and/or other methods. In some embodiments, one or more surface irregularities can be very small bumps, protrusions, and/or indentations.

In some embodiments, light passing through the light pipe 10, 110 can be scattered at a plurality of different intensity levels, depending on the location of the light within the light pipe 10, 110. For example, light at a first location on the light pipe 10, 110 can be scattered at a first intensity level, light at a second location on the light pipe 10, 110 can be scattered at a second intensity level, and light at a third location on the light pipe 10, 110 can be scattered at a third intensity level, with the third intensity level being more than the second intensity level, and the second intensity level being more than the first intensity level, etc. Many other levels of scattering and many ways of spatially increasing or decreasing scattering can be used instead of or in addition to providing macro scattering elements, such as spatially varying a level of die or a frosting effect within the material of the light pipe 10, 110, or by spatially varying scattering particles embedded within the material, or by spatially varying a surface pattern on one or more outside surfaces of the material. In some embodiments, a smooth gradient of scattering elements can be used to achieve the desired lighting effect (e.g., constant light intensity emission or gradient light intensity emission).

The light pipe 10, 110 can include a surface pattern, such as light scattering elements 74 (e.g., a dot pattern) as shown in FIGS. 8A-8C. The light scattering elements 74 can be configured to encourage a portion of the light passing through the light pipe 10, 110 to exit the outer face 42, 142 of the light pipe 10, 110, thereby generally illuminating the user in a generally even or generally uniform manner. The light scattering elements can be configured such that the light intensity emitted from the outer face 42, 142 of the light pipe 10, 110 is substantially constant along a substantial portion of, or virtually the entirety of, the length of the light pipe 10, 110. Accordingly, the user can receive generally constant light volume or intensity around the periphery of the mirror 4, 104. For example, the light scattering elements can include one or more of varied density, irregular patterns, or varied sizes.

As shown in FIG. 8A-8C, the light scattering elements 74 can be less dense near the light sources (FIG. 8C), and become increasingly dense as a function of increased distance from the light sources (FIG. 8B). Such a configuration can, for example, reduce the amount of light that is scattered or reflected (and thus exits the outer face 42, 142) in areas having generally increased light volume or light intensity, such as portions of the light pipe 10, 110 that are near the light sources. Further, such a configuration can encourage additional scattering or reflection (and thus increase the amount that exits the outer face 42, 142) in areas having generally decreased light volume or intensity, such as portions of the light pipe 10, 110 that are spaced away from the light sources. Accordingly, the mirror assembly 2, 102 can avoid bright areas at some portions of the periphery of the mirror 4, 104 and dark areas at other portions. The mirror assembly 2, 102 can have a substantially constant amount of light emitted along some, substantially all, or all of the periphery of the mirror 4, 104.

The light scattering elements can be dispersed in an irregular pattern, such that the light scattering pattern in a first region is different than a light scattering pattern in a second region. A distance between a first light scattering element and a second light scattering element can be different than a distance between a first light scattering element and a third light scattering element.

The sizes (e.g., the diameter) of the light scattering elements can be varied. In some variants, the light scattering elements near the light sources can have a smaller size when compared to light scattering elements that are farther from the light sources. For example, the light scattering elements can include a smaller diameter near the light sources and become increasingly larger as a function of distance from the light sources. Such a configuration allows substantially even reflection of light to the outer surface 42, 142. In certain embodiments, each light scattering element has a diameter of less than or equal to about one millimeter. In some embodiments, the light scattering elements each have a diameter greater than or equal to about one millimeter.

In some embodiments, the light scattering elements can be generally circular. In some embodiments, the light scattering elements have other shapes, such as generally square, generally rectangular, generally pentagonal, generally hexagonal, generally octagonal, generally oval, and otherwise. In certain embodiments, the pattern in the light pipe 10, 110 is a series of lines, curves, spirals, or any other pattern. In certain embodiments, the light scattering elements are white. The light scattering elements can be dispersed such that the light pipe 10, 110 appears frosted. In some embodiments, the light scattering elements are not easily visible to the user. For example, the light pipe 10, 110 can be slightly opaque to conceal the appearance of the surface pattern. In some embodiments, the light scattering elements are visible to the user, the light pipe 10, 110 can be clear to show the general color and pattern of the surface elements.

In some embodiments, the light path is concealed by a mirrored surface and only visible when the light sources 130a', 130a", 130b', 130b" are activated. For instance, in some embodiments, the support portion 20, 120 has at least some portion that is partially transparent at or along the general direction of the light strip. In some embodiments, the light sources can be hidden behind a portion of mirrored surface so that they are out of sight. For instance, partially transparent mirrored surfaces (e.g., two-way mirrored glass) can form the side portions of the central mirrored surface. When viewed from the front of the mirror, these partially transparent surfaces are reflective and appear as a normal part of the mirrored surface. As a light emitter or a light source is activated, light can then transmit through the two-way mirror and illuminate the user. In some embodiments, only when illuminated are the light sources visible from the on the mirror system. In some variants, the light strip is not concealed by the viewing surface. For instance, in certain implementations, even when inactive, the light source(s) are visible when a user is positioned in front of the mirror.

In some embodiments, the light sources are positioned within the mirror head and behind a portion of the mirror (e.g., creating a backlighting effect of the mirror). In some embodiments, the light sources are positioned (e.g., by tilting) such that light emitted from the light sources contacts the viewing surface of the mirror assembly 2, 102 at an angle, such as an acute angle. In some embodiments, the light sources are positioned such that light emitted from the light sources contacts the viewing surface of the mirror assembly 2, 102 at an obtuse angle.

When installed on the support portion 20, 120, the light pipe 110 has a length (measured alone the general direction of light emitted from the light emitter, e.g., circumferentially) a width (measured in a general direction transverse to the length and the along the same general plane of the viewing surface) and an depth (measured in a direction generally transverse to the length and generally orthogonal to the viewing surface). Some variants have a width that is greater than or equal to than the depth. In some embodiments, the width is less than the depth. In certain implementations, the light pipe is configured to provide adequate area for the reflecting surface of the mirror and to provide sufficient area for light to be emitted from the light pipe, as discussed in detail elsewhere herein. For example, in some embodiments, the ratio of the width of the light column to the diameter of the mirror (e.g., the central mirrored surface 4, 104) can be less than or equal to about: $1/5$, $1/15$, $1/30$, $1/50$, values in between those values, ranges between those values, or otherwise.

The light pipe 10, 110 can include a reflective material to achieve high reflectivity. For example, the light pipe 10, 110 can include a reflective backing material along the rear side of the light pipe. In some embodiments, the reflective material can reflect at least about 95% of light. In some embodiments, the reflective material reflects about 98% of light. The reflective material can be optically reflective paper.

As shown in FIG. 18, the mirror assembly 102 can also include a diffuser 156. The diffuser 156 can be positioned on the surface of the light pipe 110 and/or around the periphery of the mirror 104. For example, the diffuser 156 can be positioned between the light pipe 110 and the user to provide a diffuse, scattered light source, not a focused, sharp light source, which would be less comfortable on the user's eyes. In some embodiments, the transmissivity of the diffuser is substantially constant around its perimeter or circumference. In some embodiments, the diffuser 156 can surround a majority of the periphery of the mirror 104, substantially the entire periphery of the mirror, or the entire periphery of the mirror. As shown in FIG. 18, the diffuser 156 can surround generally the same portion of the periphery of the mirror 104 as the light pipe 110. The diffuser 156 can also include an opening 160 for the sensor assembly 128 and/or a receiving portion 157 for receiving the mirror 104. The diffuser 156 can include an at least partially opaque material. For example, the diffuser 156 can include optical grade acrylic.

The diffuser 156 can include an irregular anterior and/or posterior surface formed from etching, roughening, painting, and/or other methods of surface modification. For example, the diffuser 156 can include a pattern of light scattering elements (not shown) created using any of the methods discussed herein. The light scattering elements can be modified to include any of the shapes and/or sizes discussed in connection with the light pipe 110.

The light scattering elements can be configured to create soft light by further scattering the light. For example, the light scattering elements can include a plurality of dots having the same diameter or different diameters. In some embodiments, the light scattering elements can be evenly dispersed across the diffuser 156.

In other embodiments, the light scattering elements can be randomly dispersed across the diffuser. In certain implementations, where the light sources are provided in the mirror head 103, the mirrors can comprise a semi-opaque, non-smooth (at a micro or macro level), and/or non-uniform surface that can be formed in any suitable manner, such as by molding, scraping, thermal treatment, particle bombardment (e.g., "sand blasting"), and/or chemical treatment, such as etching, to provide light diffusion or scattering. In some variants, these light scattering elements and/or diffusing portions of the mirrored surface can be positioned over or adjacent to or otherwise in light communication with the light sources. In certain implementations, these light scattering elements and/or diffusing surfaces adjust the light properties from the light sources as discussed elsewhere herein. In some embodiments, these surfaces can be used in addition to, or instead of the transmissive light covers. In some embodiments, these diffusing or otherwise light scattering portions can be integrally formed with a mirrored surface, such as by changing or treating a portion of the mirrored surface to produce a light scattering region.

To adjust the height of the mirror assembly 2, 102, the shaft portion 12, 112 can be configured to translate generally perpendicular to the ground when the mirror assembly 2, 102 is positioned on the base 14, 114. In some embodiments, the height of the shaft portion 12, 112 can be adjusted within a range of at least about three inches and/or within a range less than four inches. In some embodiments, the height of the shaft portion 12, 112 can be adjusted within about a four inch range. In some embodiments, the height of the shaft portion 12, 112 can be adjusted within about a three inch range. In some embodiments, the height is adjustable via the shaft portion 12, 112, such as by using a telescoping joint.

Figure 21:
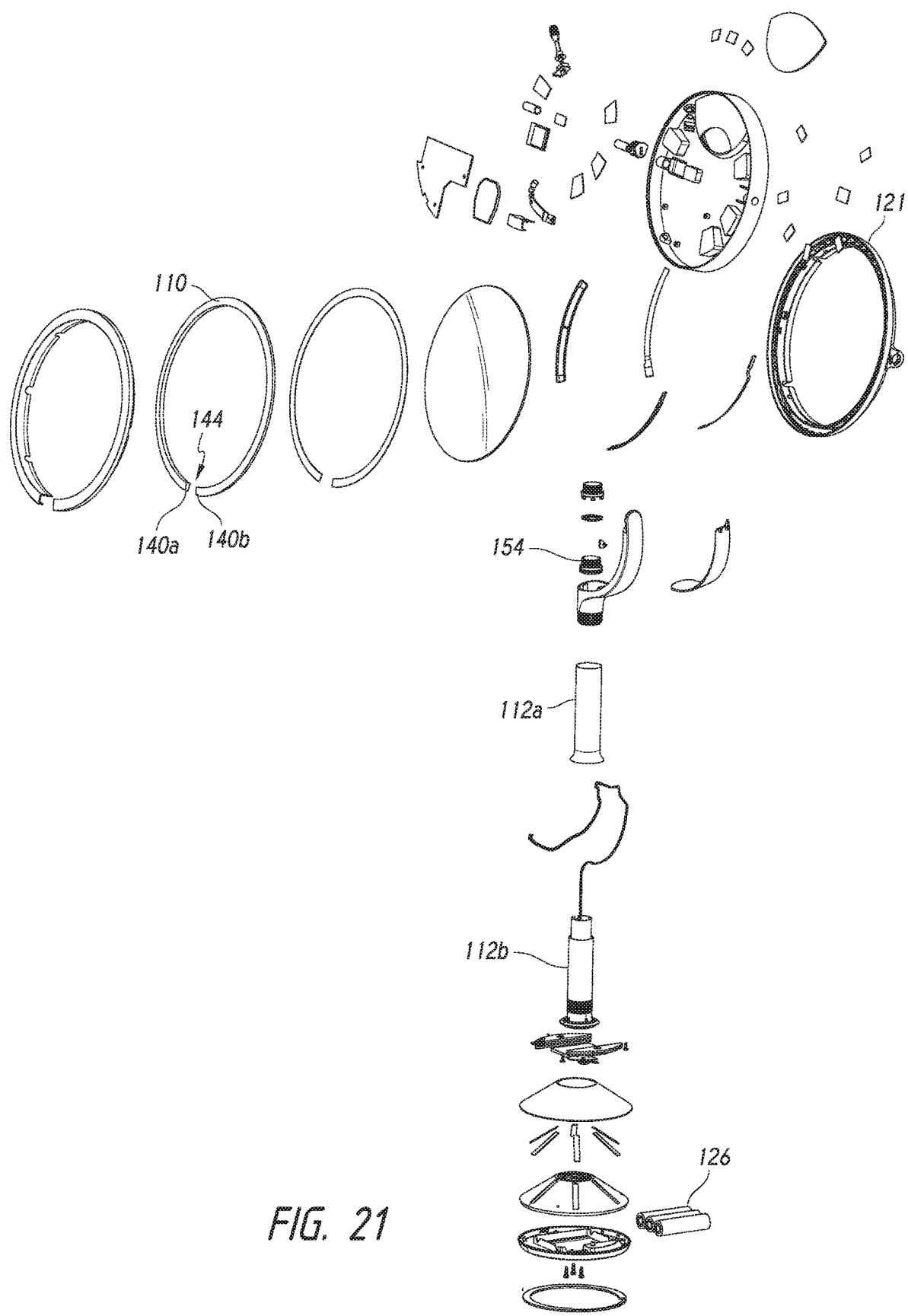
FIG. 21 illustrates an exploded view of the embodiment of FIG. 9.

As shown in FIG. 21, The shaft portion 112 can include a first shaft portion 112a and a second shaft portion 112b. The shaft portions 112a, 112b can be configured to adjustably engage each other, thereby allowing the user to select and maintain the mirror assembly 102 at a desired height. For example, the first shaft portion 112a can include one or more biased adjustment structures, such as spring-loaded retractable pegs (not shown), and the second shaft portion 112b can include one or more corresponding adjustment structures, such as notches (not shown). The pegs of the first shaft portion 112a can engage (e.g., snap into) with the notches of the second shaft portion 112b to control provide articulating adjustment of the height of the mirror assembly 102.

In some embodiments, the first shaft portion 112a and the second shaft portion 112b can form an interference fit. This applied pressure allows the first shaft portion 112a and the second shaft portion 112b to be stationary relative to each other (e.g. hold the support portion 120 in desired height) without external force being applied. However, the applied pressure between the shaft portions 112a and 112b can be controlled so that when the user wants to adjust the height of the support portion 120, the pressure can be overcome and shaft portions 112a and 112b can move relative to each other. For example, the amount of force required to downwardly or upwardly adjust the height or effective length of the shaft portion 112 can be greater than the downward force of gravity induced by the mass of the mirror assembly and upper shaft portion but generally less than or equal to a natural human adjustment force for an appliance, such as less than or equal to about 3 or about 4 pounds. The sliding or adjustment of the height or effective length of the shaft components can be configured to stop virtually immediately when the user's adjustment force stops, without requiring further adjustments or securing structure to stop the sliding or to secure the components of the shaft portion against further unintended movement or change in height or length. The applied pressure can also simulate a dampening effect during movement of the shaft portions 112a and 112b.

The shaft portion 112 can also include a constraining member, such as ring member, that dampens or prevents the first shaft portion 112a from moving relative to the second shaft portion 112b. For example, certain variants of the ring member threadably engage with the second shaft portion 112b, thereby radially compressing the second shaft portion 112b against the first shaft portion 112a, which in turn inhibits the first shaft portion 112a from translating relative to the second shaft portion 112b. In certain implementations, loosening the ring member allows the user to adjust the height of the shaft portion 112, while tightening the ring member secures the first shaft portion 112a to the second shaft portion 112b.

In some embodiments, the shaft portion 112 includes a connector, such as a set-screw (not shown), which can be positioned generally perpendicular to the first shaft portion 112a. The second shaft portion 112b can include an opening (not shown) through which the screw member can extend. In certain implementations, when the set-screw is loosened, the first shaft portion 112a can be adjusted relative to the second shaft portion 112b. Tightening the screw member until it contacts the first shaft portion 112a can inhibit or prevent the first shaft portion 112a from moving relative to the second shaft portion 112b.

As shown in FIG. 21, the shaft portion 112 can include one or more biasing members 154, such as springs (e.g., spiral coil springs, wave springs, conical springs, or otherwise). In certain variants, the one or more biasing members 154 are configured to facilitate adjustment of the height of the shaft portion 112. For example, the one or more biasing members 154 can reduce the amount of vertical force a user must exert to raise the height of the mirror head 103 relative to the base 114. The biasing members can be positioned in a lumen of the shaft portion 112.

The shaft portion 112 can include plastic, stainless steel, aluminum, or other suitable materials. The first shaft portion 112a can also include compressible materials, such as rubber, nylon, and plastics, on at least a portion of its outer surface that press against the inner surface of the second shaft portion 112b when the first shaft portion 112a is inserted into the second shaft portion 112b.

A portion of the support portion 20, 120 can be cantilevered outward from the longitudinal axis of the shaft portion 12, 112. Such a configuration can impart a moment of force on the mirror assembly 2, 102, which, if uncompensated for, could lead to tipping. The base portion 14, 114 can also be configured to counteract such a moment. For example, the base portion 14, 114 can include a weight that is sufficient to reduce substantially the likelihood of tipping of the mirror assembly 2, 102.

The base 14, 114 and/or other portions of the mirror assembly 2, 102 can be generally balanced in mass distribution such that the center of mass of the mirror assembly 2, 102 is generally positioned near the shaft 12, 112 and/or near the base 14, 114. The base portion 14, 114 can weigh at least about 2 lbs., 4 lbs., 6 lbs., 8 lbs., 10 lbs., values in between, or otherwise. The base portion 14, 114 can also include one or more supporting feet or be configured to be semi-permanently mountable (e.g., to be mounted to a countertop with one or more fasteners).

In some embodiments, as illustrated, the base portion 14, 114 can have a generally curved outer surface. For example, a horizontal cross-section of the base at a plurality of points along its height can be generally circular or generally elliptical. In the illustrated embodiment, the base portion 14, 114 is generally conical, such as generally frusto-conical. The outer surface of the base can be generally smooth, generally tapered and/or generally sloping, as illustrated, and/or present a virtually entirely continuous surface generally circumscribing the periphery of the base 14, 114. The horizontal cross-sectional area or diameter of the top of the base 14, 114 generally can be about the same as the horizontal cross-sectional are or diameter of the bottom of the shaft portion 12, 112. The horizontal cross-sectional area of the base 14, 114 can generally continuously increase from the top region of the base 14, 114 to the bottom region of the base 14, 114. For example, a horizontal cross-sectional area or diameter at the bottom region of the base 14, 114 can be substantially larger than a horizontal cross-sectional area or diameter at the top region of the base 14, 114 (e.g., at least about two or at least about three times larger), which is an example of a base 14, 114 that can help resist tipping of the mirror. In some embodiments, as illustrated, the distance along the shaft portion 12, 112 from the bottom of the mirror portion to the top of the base portion can be generally about the same as the height of the base portion 14, 114. As shown, in FIG. 22, the base 114 can include an exit aperture 171' configured to receive a wire in electronic communication with a cord or wire that can be inserted through a base aperture 171 (e.g., that can be plugged into the port 124) shown in FIG. 23. In some embodiments, the base aperture 171 (e.g., tunnel, hole, etc.) is configured to receive the cord. In some embodiments, the base aperture 171 allows the base 114 to reside flushly and/or evenly on a surface without tilting the mirror assembly 102 even while a cord and/or wire is inserted into, for example, the port 124.

Figure 22:
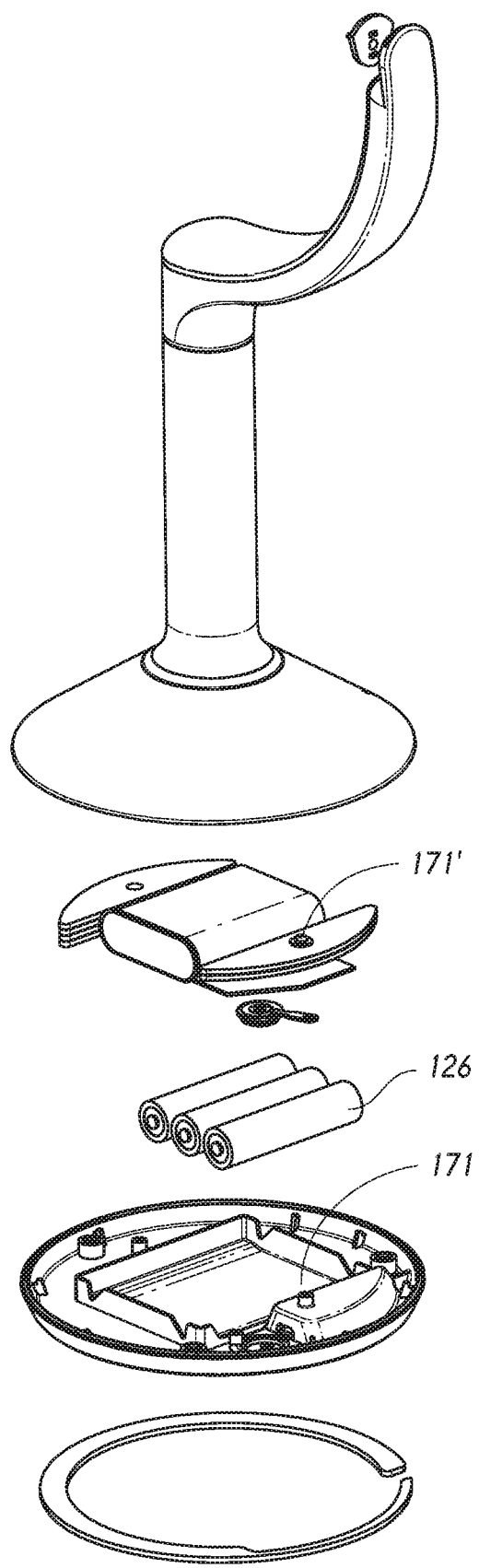
FIG. 22 illustrates an exploded view of a portion of the embodiment of FIG. 9.
Figure 23:
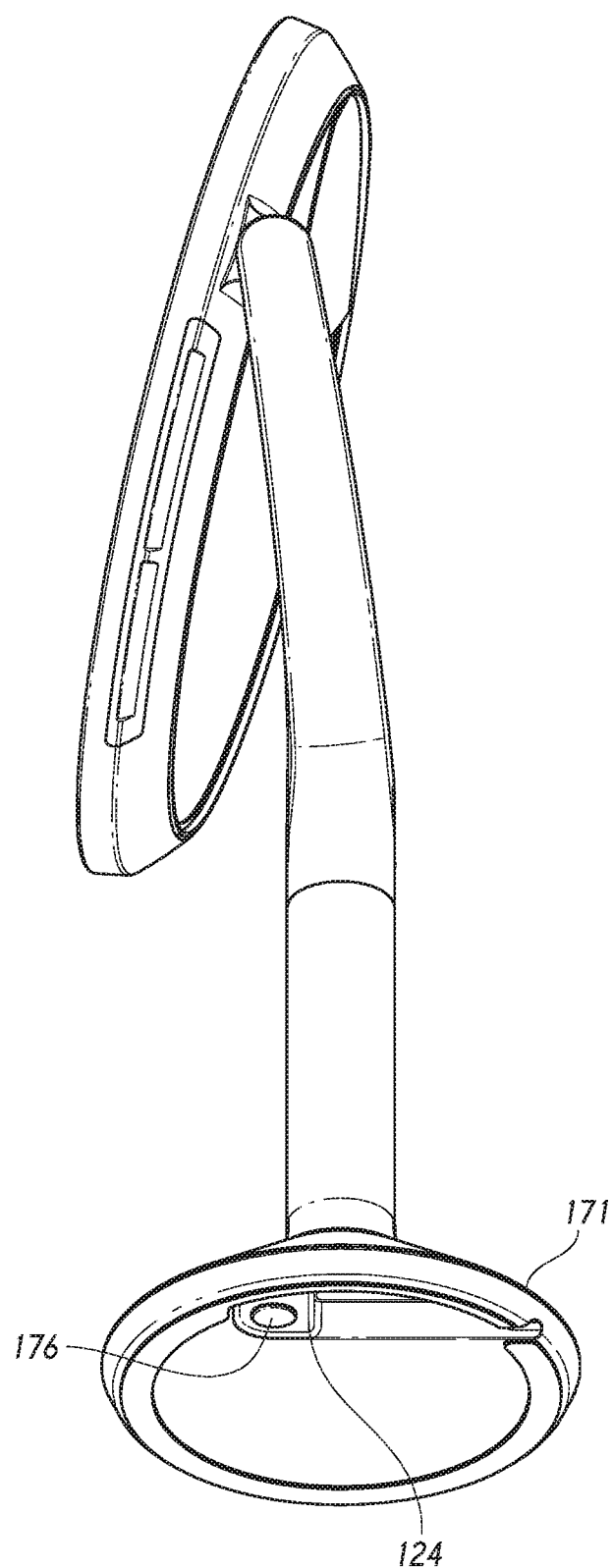
FIG. 23 illustrates a perspective view of the bottom of the embodiment of FIG. 9.

As discussed in further detail below, the base portion 114 can include a battery (e.g., a rechargeable battery). The weight and positioning of the battery can also reduce the chances of tipping of the mirror assembly 102 (e.g., increase stability). In some embodiments, the battery can deliver power to the light sources for at least about ten minutes per day for about thirty days. The battery 126 can be recharged via a port 124 (e.g., a universal serial bus (USB) port or otherwise), as shown in FIGS. 22-23. The port 124 can be configured to permanently or removably receive a connector coupled with a wire or cable (not shown). The port 124 can also be configured to allow electrical potential to pass between the batteries 126 with a power source via the connector. The port 124 may be used to program or calibrate different operations of the mirror illumination or object sensing when connect to a computer. Other charging methods can be used, such as via conventional electric adapter to be plugged in to an electric outlet. In some embodiments, as shown in FIG. 23, a power button 176 is located on the mirror assembly 102 to activate the power to the mirror assembly 102.

The mirror assembly 2, 102 can be powered using an electrical conduit (e.g., a cord) and/or it can be powered using an internal power source (e.g., in embodiments where the mirror assembly is cordless or wireless). The head portion (or some other portion of the mirror assembly) can include a power source (e.g., a battery, a rechargeable battery, or a cord to be plugged into an electrical outlet). In some embodiments, a cord is plugged directly into an external energy source and into the mirror assembly to charge an internal power source of the mirror assembly (e.g., rechargeable batteries). In certain implementations, the external energy source is a standard wall outlet, a computer, or a portable battery. In certain variants, the electrical conduit engages with the external energy source or the mirror assembly via a multi-prong electrical plug, a USB port, a cell phone adaptor, or some other port configured to receive charge and to deliver it to a device (e.g., via the port 124). In some embodiments, the cord and/or the external energy source have guiding features (e.g., magnets) that guide the cord and external energy source into engagement. In some embodiments, the electrical conduit is removable or retractable (e.g., it retracts into the mirror assembly, out of sight). In some embodiments, the cord and/or the mirror assembly source have guiding features (e.g., magnets) that guide the cord and mirror assembly into engagement. In some embodiments, the mirror assembly can be recharged by placing the mirror assembly onto or in contact with a charging pad or mat. In some embodiments, the pad or mat may itself be wireless/cordless.

In some variants, the cordless mirror assembly is powered by rechargeable batteries (e.g., lithium ion, nickel cadmium, nickel, metal hydride, or lithium ion polymer). In some implementations, the batteries of the mirror assembly can be removed from the mirror assembly and replaced (or recharged at a charging station).

The battery 126 can be recharged via a port 124 (e.g., a universal serial bus (USB) port or otherwise), as shown in FIG. 10. The port 124 can be configured to receive permanently or removably a connector coupled with a wire or cable (not shown). The port 124 can also be configured to allow electrical potential to pass between the batteries 126 with a power source via the connector. The port 124 may be used to program or calibrate different operations of the mirror illumination or object sensing when connect to a computer. Other charging methods can be used, such as via conventional electric adapter to be plugged in to an electric outlet.

The mirror assembly 2, 102 can include an indicator device configured to issue a visual, audible, or other type of indication to a user of the mirror assembly 2, 102 regarding a characteristic of the mirror assembly 2, 102, the user, and/or the relationship between the mirror assembly 2, 102 and the user. For example, the indicator can indicate on/off status, battery levels, imminent deactivation, and/or certain mode of operation. The indicator can be used for other purposes as well.

In certain embodiments, the color of the indicator light can vary depending on the indication. For example, the indicator can emit a green light when the mirror assembly is turned on and/or a red light when the battery is running low. The indicator can comprise a light bar that indicates the total battery life (decreasing length with decreasing battery life). In some embodiments, the indicator can ring-shaped and positioned around a portion of the shaft portion 58, 158. The indicator can take on any other shape and be positioned around the mirror head 103 or support portion 120 (e.g., behind a portion of a 2-way mirrored area), along the base portion 114, or on any other location on the mirror assembly 102. As shown in FIGS. 1 and 9, the indicator 58, 158 can ring-shaped and positioned around an upper portion of the base portion 14, 114. The indicator 58, 158 can take on any other shape and be positioned around the support portion 20, 120, along the base portion 14, 114, or on any other location on the mirror assembly 2, 102.

The color of the indicator light can vary depending on the indication. For example, the indicator can emit a green light when the mirror assembly is turned on and/or a red light when the battery is running low.

In certain variants, an actuator, such as a button (e.g., the handle) or a sensor (e.g., a capacitive touch sensor 179, as shown in FIGS. 9-10) is located on the mirror assembly 2, 102, such as in a location behind a portion of a mirrored surface and/or on a side of a mirror surface (such as along an arc of the side of a mirror surface, as illustrated in FIGS. 9-10) and can be activated by touching and/or gesturing near the mirrored surface in designated locations. In some embodiments, the capacitive touch sensor 179 sends one or more signals to a controller module and allows the user to control one or more aspects of the light emitted from the light columns through directional finger movements or by touching specific areas of the capacitive touch sensor. For instance, in some embodiments, a user can swipe (or drag) a finger in one direction (i.e., left, right, down, up, or otherwise) over the capacitive touch sensor 179 to increase the color temperature. The user can then swipe a finger in an opposite direction to decrease the color temperature. In some variants, the user can drag a finger in a different direction over the capacitive touch sensor 179 to increase the brightness of the light emitted from the light columns and in an opposite direction to dim the light. In some embodiments, the color of the light emitted can be adjusted. In some embodiments, the user can tap a portion of the capacitive touch sensor to apply a light setting. In some embodiments, a capacitive touch sensor is not present.

In some embodiments, the capacitive touch sensor is operably connected (via a wire or a conduit) to the controller and/or one or a plurality of printed circuit boards (PCBs), which can provide hard wired feedback control circuits, a processor and memory devices for storing and performing control routines, or any other type of controller.

The mirror assembly 102 can include a processor, which can control, by one or more schemes and algorithms, input and output characteristics and functions of the mirror assembly 102. In some embodiments, the processor is responsive to one or more signals received by the sensor assembly 128 and/or a capacitive touch sensor 179 (shown in FIGS. 9-10, for example). In certain embodiments, the processor enables the sensor assembly 80 or the capacitive touch sensor 179 to actuate or control any one or more of the mirror assembly 2 algorithms (e.g., algorithms regarding the sensor regions, brightness of the light sources, warmth of the light sources, color of the light, CRI, a light environment to select, etc.). The mirror assembly 2 can also include memory, such as firmware, to store the various user settings, control schemes, and algorithms, as well certain instructions and/or settings related to various characteristics of the mirror assembly 2. For example, the memory can include instructions and/or settings regarding the size of the sensing regions, the sensitivity of the sensors, the level of output light, the length of various timers, and otherwise.

The mirror assembly 102 can be configured such that a user can modify (e.g., update, program, or otherwise) the memory, such as by connecting the mirror assembly 102 to a computer (e.g., a smartphone, laptop, etc.) that is equipped with software or an "app" that is configured to enable the computer and/or the mirror assembly to perform any of the functions, tasks, and/or steps described and/or illustrated herein. For example, the mirror 102 can be communicatively connected with a computer via the port 124 (e.g., using a USB, cable). Data can be transferred between the computer and the mirror assembly 102 via the port 124. The mirror assembly 102 can alternatively be configured to communicate with a computer wirelessly, such as by a cellular, Wi-Fi, or Bluetooth® network, infrared, or otherwise.

When the mirror assembly 102 is in communication with the computer, a control panel may be displayed on the computer. The control panel may allow the user adjust various input and output characteristics for the mirror assembly 102. For example, a user can use the control panel to adjust the output of the emitting portions and/or the sensitivity of the transmitter 136. In some embodiments, a database containing light information for particular environments can be assembled (e.g., by a user or a third party) and stored in the memory on the mirror assembly 102 and/or on the computer. This database can contain, for example, particular light parameters (e.g., color temperature, light intensity, color hue, etc.) for individual environments (e.g., restaurants, outdoor venues at different times of day or season or with different weather conditions, sporting arenas, opera houses, dance venues, clubs, auditoriums, office, bar, etc.). In certain embodiments, individual outside light environments can include, for example, sunny, overcast, cloudy, rainy, dawn, dusk, twilight, etc. In some embodiments, a user can access this database in setting the light parameters of the mirror assembly 102 in order to perform light-matched personal grooming and make-up application (e.g., in preparation for attending a database-listed or similar venue). For instance, in certain variants, the user can download a venue's light parameters into a device (e.g., a handheld device, a tablet, a computer, a thumb drive, a smartphone) and transfer that information to the mirror assembly 102 (e.g., by connecting the device to the mirror assembly using a conduit and the port or wirelessly using Bluetooth® or Wi-Fi). Once downloaded (e.g., to a processor or to a memory storage unit), the mirror assembly can automatically set the light parameters to match the suggested settings in the database. In some embodiments, any of these light settings can be preset and/or included on a memory of the mirror assembly (e.g., without need for download from a database). In some embodiments, the user can manually select any of these preset settings (e.g., using a touch screen, capacitive touch sensor, buttons, a wireless device, etc.) or the user can manually create and save one or more different settings from the user's own personal adjustments. Personal (e.g., manual) adjustments can be performed by manipulating one or more of the tint, color, color temperature, brightness, and light intensity of the light emitted from the light assembly (e.g., using a touch screen, capacitive touch sensor, buttons, a wireless device, etc.).

In some embodiments, the mirror assembly 102 can be configured to access environmental information (date, time, season, weather, etc.) from an information source (e.g., the Internet, a home system, etc.). In some embodiments, this information can be transferred to the mirror assembly wirelessly or through a wired connection. In some embodiments, the mirror assembly 102 can include a software or hardware module with an algorithm that selects particular light parameters automatically based on the environmental information to best match those conditions. In some embodiments, the mirror assembly comprises learning devices and/or can be integrated to communicate with such devices (e.g., NEST® devices). In some embodiments, this feature allows the mirror assembly to function and/or program or adjust itself based on user activity (e.g., whether the user is home, in bed, in the bathroom, etc.) and/or based on information gathered by an integrated device (e.g., a NEST® device). In some embodiments, after information is received, the mirror assembly can automatically select lighting settings based on, for example, outside weather (e.g., outside lighting conditions), ambient lighting, the presence of someone in the home (e.g., for power conservation, etc.), time of the day (e.g., to act as an alarm by flashing light, a night light, etc.), or otherwise. In some embodiments, any of the above features can be turned-off or overridden based on input from the user.

In some embodiments, the mirror assembly can act as an alarm or a reminder or a conveyor of one or more types of information to the user. For example, in some embodiments, the mirror assembly can indicate it is time for an event or that a particular amount of time has elapsed or a particular time of day has arrived. In certain implementations, the mirror assembly alarm feature operates by providing a cue to the user when a time is reached (e.g., time to wake-up, time to shower, time to apply make-up, time to leave for school, work, or some other event). In some embodiments, the alarm can be set manually by the user and/or can be set automatically. For instance, the user can set the alarm feature to activate (or deactivate) at a specific recurring time on weekdays and another different time on weekends. When set to automatically activate and deactivate, the mirror assembly can set alarms based on specific information regarding the user, such as specific entries in, for instance, the user's personal electronic calendar. In certain implementations, the automatic alarm setting can be based on past behaviors of the user, or on information gathered from public sources (e.g., the internet).

In some embodiments, the mirror assembly can automatically adjust the timing of an alarm when, for example, the timing of an event has been delayed, or traffic conditions to an event have changed. The mirror assembly can also display suggest alarm changes prior to making them and can display the reasoning for a suggested change (on a LCD screen or the like). Similarly, in some embodiments, the mirror assembly can adjust or suggest different light settings based on changed weather or other light characteristics.

In some embodiments, the alarm cue provided to the user is visual. Visual cues could include flashing of the light sources, dimming of the light sources, powering-down of the mirror assembly (and light sources), brightening of the light sources, color changes of the light source (intermittently flashing an alarm color to the user), etc. In some variants, other or additional features of the mirror assembly provide visual cues. For instance, in some embodiments, an LED (light bulb, colored panel, etc.) is provided on the periphery of one or more of the mirror surfaces or the mirror frame. In some embodiments, the alarm LED illuminates, blinks, or provides other visual cues to the user. In certain embodiments, the alarm can be hidden behind the a portion of a mirrored surface that functions as a two-way mirror such that the visual cue and alarm system only become visible through the mirrored surface when lit. In some embodiments, the mirror assembly comprises a display (as explained elsewhere herein) that includes features that can act as an alarm. For instance, the display can show a timer, a clock, reducing bar scale, a colored indicator (e.g., that changes from green to yellow to red), or the like to indicate it is time for an event (e.g., time to go).

In certain variants, the cue is auditory. Auditory cues include one or more of a ring, beep, beeping, a buzzer, turning on music or a radio broadcast, the quieting or silencing of music or a radio broadcast, statements made by a voice (e.g., indicating "good morning," "time to go," or "good night", etc.), etc. In some embodiments, where the auditory cue is a voice, the voice can be recorded (e.g., by the user), prerecorded (e.g., a preset installed during manufacture), a computerized, or downloaded using an app. In certain implementations, the cue provided to the user is some other sensorially perceived indicator (e.g., a vibration or other physical cue). In some embodiments, more than one cue (or cue type) can be used in combination.

In some embodiments, a device providing the alarm (visual, auditory, physical, or otherwise) is located on the base, shaft, or head of the mirror assembly. In some embodiments, for instance, the cue is provided by a speaker that can be located on the back, front, side, top or bottom of the mirror assembly, the shaft, the base, or otherwise.

In some embodiments, the software or hardware module in the mirror assembly or computer can be configured to enable a user to set particular default settings of the mirror assembly 2, 102 using a computing device (e.g., a computer, smartphone, or the like) to download particular desired settings from the mirror assembly (e.g., a favored color temperature, light intensity, color hue, etc.). In certain variants, software or hardware module in the mirror assembly or computer can be configured to enable the user can later reset the mirror assembly to those desired settings by uploading them from the computing device (e.g., wirelessly, wired, or otherwise). In certain embodiments, the user can set particular mirror assembly settings (e.g., lighting settings, mirror positions, etc.) and save/store those settings.

In some embodiments, when attending a particular venue, the user can use a sensing device (e.g., on a smart phone, other mobile electronic communication device, or another data collecting device) to detect particular light parameters of the environment. In certain implementations, the user can then capture light information at the venue using the sensing device. The user can later use this light parameter information to calibrate the mirror assembly 2, 102 to match that particular environment (or to create a new preset light environment that can be stored in a memory of the mirror assembly). In some embodiments, an application (software, etc.) can be loaded onto the sensing device to allow the user to capture light information at a particular venue. In some variants, for instance, a light environment capture application (available at an app store or online) is downloaded to a mobile communication device and when the app is opened, light information can be captured automatically, by actuation of a button on the device, or by touching engaging a touchscreen. In some embodiments, the user can gather lighting information, such as by taking a picture (e.g., a digital image or photograph) or a "selfie" using the sensing device. Then, in certain implementations, the lighting information or picture or "selfie" can be analyzed by software or an application to capture light environment information therefrom.

In some embodiments, a calibrating implement can be used to detect particular light parameters of the environment. For instance, in certain implementations, a calibrating card can be used. In some variants, the calibrating card contains various shapes or images with various colors, or shades of colors. In some embodiments, when the sensing device views the calibrating card (e.g., when ambient light that is reflected off the card is sensed by the sensing device), the light parameters of the environment are captured.

Other types of interactions (additionally or alternatively) between the mirror system, mobile devices, and a user are possible in addition to those described above. For example, a user may be able to input data into or control the mirror system through other devices, such as keyboards, mouses, or remote controls. In some embodiments, the mirror system settings can be implemented with one or more computing devices, such as several interconnected devices. Thus, each of the components depicted in the mirror system can include hardware and/or software for performing various features.

In some embodiments, the mirror system and/or the computing device comprises a non-transitory, computer-readable medium storing computer-executable instructions for the mirror system or assembly. In certain embodiments, the computer-readable medium storing computer-executable instructions, when executed by one or more processors, cause the one or more processors to perform one or more of the following: receive a light environment information from a sensing device; compare the light environment received by the sensing device to light settings on a mirror assembly; indicate a deviation from or proximity to the light environment based at least in part on the comparison of the light environment and the light settings on the mirror assembly; adjust the light settings of the mirror assembly to match or approximate the light environment information.

In certain embodiments, the one or more processors are configured to cause a display to display an indication of one or more aspects of the light environment and/or the light settings. For example, in some embodiments, the display displays the deviation between the light environment and light settings, information about the light environment (when it was captured—date, time, season, temperature, etc.), a prompt (asking whether the user would like to change one or more of the light settings to match the light environment information), etc.

In some embodiments, the non-transitory, computer-readable medium storing computer-executable instructions is located in a mobile device or is located in a medium configured to be downloaded onto a mobile device (such as over the internet). In some embodiments, the non-transitory, computer-readable medium storing computer-executable instructions is located on the mirror assembly.

As described elsewhere herein, in some embodiments, the mirror assembly and its components are actuated by or include one or more computing devices. For example, in some embodiments, a computing device (either as part of or remote from the mirror system) that has components including a central processing unit (CPU), input/output (I/O) components, storage, and/or memory may be used to execute any, some, or all of the processes of the mirror system. The I/O components can include a display (e.g., a touch screen), a network connection to the network, a computer-readable media drive and other I/O devices (e.g., a keyboard, a mouse, speakers, a touch screen, etc.). Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces. In some embodiments, the mirror system may be configured differently than described above.

One or more of the settings of the mirror assembly or other information as described elsewhere herein can be stored as one or more executable program modules in the memory of the computing device and/or on other types of non-transitory computer-readable storage media, and the mirror system can interact with computing assets over a network or other communication link. In some embodiments, the mirror system may have additional components or fewer components than described above.

In certain implementations, each of the processes, methods and algorithms described anywhere in this specification may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Figure 25:
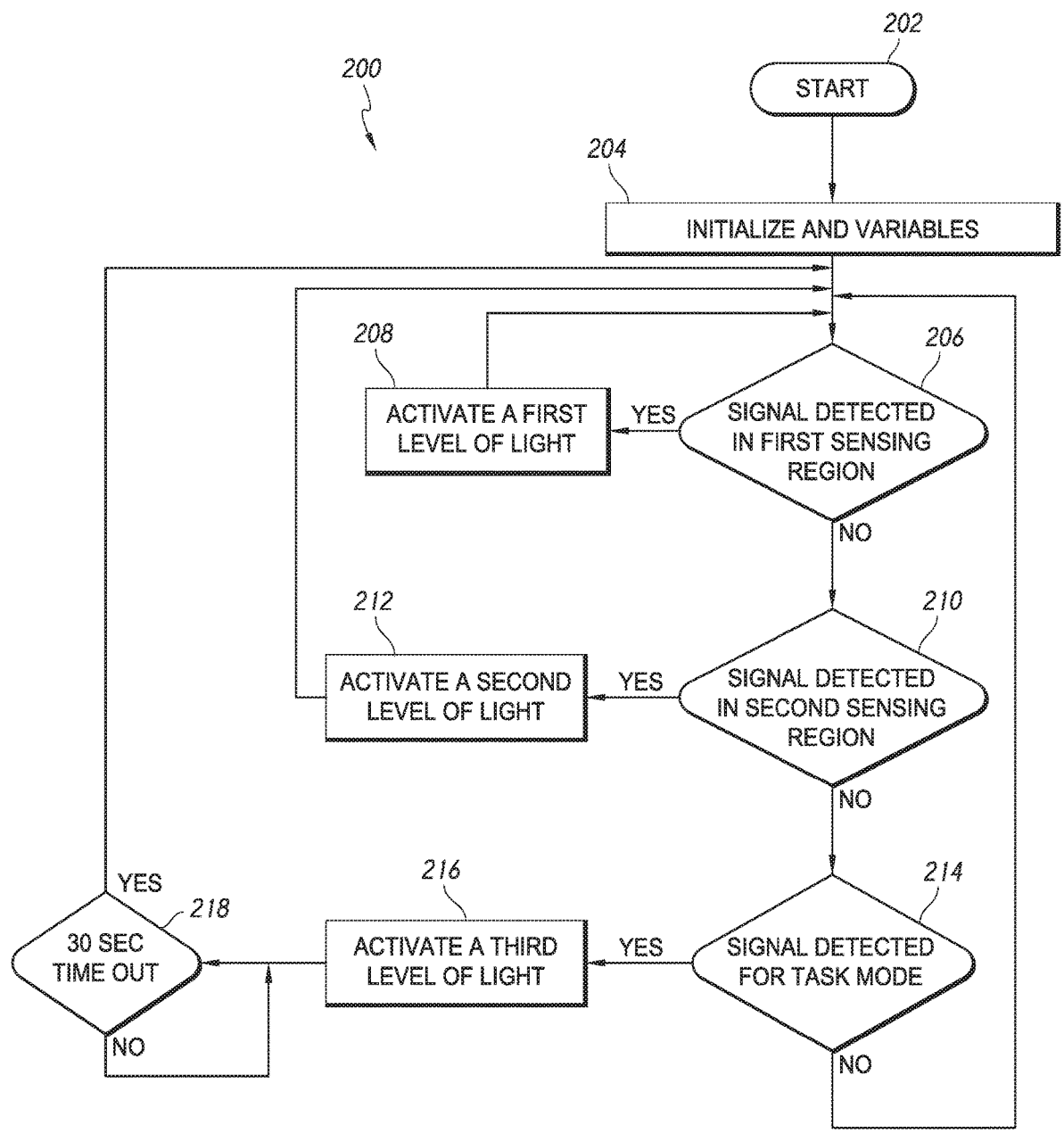
FIG. 25 illustrates a block diagram of an embodiment of an algorithm that can be performed by components of the mirror assembly of FIG. 1 and of FIG. 9.

The mirror assembly 2, 102 can also include an algorithm 200 configured to send a command to trigger the light sources to activate based on the detected signal. For example, the algorithm 200 can resemble the flow chart depicted in FIG. 25. Beginning at start block 202, the controller initializes mirror assembly hardware and variables in operation block 204. Moving on to decision block 206, if the signal is detected in a first sensing region, then the controller activates first level of light in operation block 208. If a signal is not detected in a first sensing region, then the algorithm moves on to decision block 210. If a signal is detected in a second region, then the controller activates a second level of light in operation block 212. If a signal is not detected in a second sensing region, then the algorithm moves on to decision block 214. If a signal is detected for a task mode then the controller activates a third level of light in operation block 216.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

When the mirror assembly 2, 102 is in electronic communication with the computer, a software or hardware module (e.g., an "app") can be configured to display a control panel on the computer and/or to perform any or all of the tasks, steps or functions that are illustrated and/or described herein. The control panel may allow the user adjust various input and output characteristics for the mirror assembly 2, 102. For example, a user can use the control panel to adjust the output of the emitting portions and/or the sensitivity of the transmitter.

The user can also configure the light levels associated with the first and second sensing regions. In another example, the user can adjust the size (e.g., depth, width, and/or height) of one or more of the sensing regions. In some implementations, the user can use the control panel to modify the operation and output (e.g., intensity and/or color of the light) of the light source based on certain conditions, such as the time of day, level of ambient light, amount of battery power remaining, and otherwise. In certain variants, the ability to modify the operational parameters of the mirror assembly 2, 102 with the control panel can reduce or obviate the need for one or more adjustment devices (e.g., buttons, knobs, switches, or the like) on the mirror assembly, thereby providing a generally uniform exterior surface of the mirror assembly (which can facilitate cleaning) and reducing the chance of unintentional adjustment of the operational parameters (such as when transporting the mirror assembly).

In various embodiments, instead of or in addition to the control panel (and/or the capacitive touch sensor described elsewhere herein), one or more physical dials (or knobs, switches, slide keys, buttons, etc.) can be provided on the mirror assembly to perform or actuate any function described and/or illustrated in this specification. These physical structures, like the control panel (or capacitive touch sensor), can be used to change any of the various settings of the mirror assembly described herein (e.g., the quality of the light emitted, volume of sounds emitted, timing of alarms, brightness of displays, etc.).

In certain implementations, instead of or in addition to the other control mechanisms described herein, a display (e.g., a virtual display, touchscreen, LCD, OLED, LED, or the like) can be provided on the mirror assembly. In some embodiments, the display is hidden from sight (e.g., on the back of the mirror). In some variants, the display is behind (and/or is within) one or more portions of a mirrored surface of the mirrored assembly 102. For example, in some embodiments, the display is in a position that is behind a two-way mirror portion of a surface of the mirror assembly. Upon illumination, the display becomes visible to the user. In some variants, when inactive, the display is no longer visible and appears to be just another portion of the mirror. In certain implementations, the display is activated by an input from the user (e.g., by touching a portion of the mirror or the display, by stating a voice command, by making a movement that the mirror is programmed to recognize, or by any of the other activation methods described elsewhere herein). In some embodiments, the display can be activated by actuating the sensor 179 (e.g., by touching, swiping a finger across, gesturing, etc.).

In some embodiments, the display can be configured to perform any or all of the tasks, steps or functions that are illustrated and/or described herein. For example, in certain implementations, the display is in electronic communication with a capacitive touch sensor (e.g., a touch screen). When active, the display can indicate some level of a lighting variable (e.g., brightness, color temperature, etc.). The capacitive touch sensor can then receive an input from the user to change that variable through a predetermined slide, tap, or rotation of the finger. For example, in some embodiments, the display shows one or more virtual dials, knobs, or switches that can be used to change qualities of the light emitted from the light columns (e.g., the brightness, color, or temperature of the light).

In some variants, the display can also (or alternatively) be used to provide information to the user. For example, in some embodiments, the display can act as a clock, an advertisement block, a text message panel (displaying text messages received by a user's smart phone), an email panel (displaying email messages received by a user's email address), or the like. In some implementations, the display receives information from an information source (e.g., the internet, a home computer, etc.) and, based on a user's past behavior (e.g., purchases, websites visited, etc.), transmits related information to the user. As an illustration, based on past make-up purchases, the display may provide information about similar make-up, sales, promotions, etc. Based on past venues that the user has attended, the mirror may suggest other similar events. The display may also provide information about events that are upcoming (e.g., alarms) with updates as to traffic conditions or changed meeting times.

In certain variations, the mirror assembly may comprise facial recognition features. In some instances, several different subjects may make use of the same mirror assembly. Facial recognition allows the mirror assembly to recognize a particular user and to select certain baseline parameters based on that user. For instance, if "User 1" works under fluorescent lights on weekdays, the mirror assembly could load a corresponding light profile on weekday mornings when that "User 1" is recognized. If "User 2" works primarily in environments lit by incandescent bulbs on weekends, when that user is recognized, those light parameters could be selected. In some embodiments, a specific individual's email, texts, or suggested promotions are displayed based on that individual's proximity to the mirror.

In certain implementations, the facial recognition feature allows the display to show tailored/targeted promotions (e.g., for make-up etc.) to specific users. For illustration, in some embodiments, the mirror may assess the complexion, skin tone, or hair color of the user. In some variants, the display can then suggest products for the user to purchase. In some embodiments, when a product or promotion is displayed, the user can purchase or bookmark an item by touching the capacitive touch sensor in a specific area (e.g., a "purchase" or "bookmark" button).

In some implementations, when the mirror assembly 2, 102 is in communication with a computer, data can be transferred from the mirror assembly to the computer. For example, the mirror assembly can transfer data, such as power consumption, estimated remaining battery power, the number of activations and/or deactivations of the light source, the length of use (e.g., of individual instances and/or in total) of the light source, and otherwise. Software can be used to analyze the transferred data, such as to calculate averages, review usage statistics (e.g., during specific periods), recognize and/or draw attention to unusual activity, and display usage statistics on a graph. Transferring usage statistics from the mirror assembly to the computer allows the user to monitor usage and enables the user to calibrate different characteristics of the mirror assembly (e.g., based on previous usage and parameters). Transferring data from the mirror assembly to the computer can also reduce or avoid the need for one or more adjustment or display devices on the mirror assembly itself.

When the mirror assembly 2, 102 is in communication with the computer, the mirror the computer can also transfer data to the mirror assembly. Furthermore, when the mirror assembly is in communication with the computer, electrical potential can be provided to the battery 26, 126 before, during, or after such two-way data transfer.

The mirror assembly 302 can include one or more of the features described in connection with the mirror assemblies 2, 102, including but not limited to, any of the optical, lighting, sensing, charging, user interface, wireless communication, and/or other operational capabilities described above. Where features of one embodiment correspond with features of another embodiment (e.g., are the same, substantially the same, achieve the same or similar purposes, etc.), those features are offset numerically by factors of 100 (while having the same ones and tens numerical value). As an illustration, feature 110 of mirror assembly 102 can correspond to feature 310 of mirror assembly 302.

Figure 26:
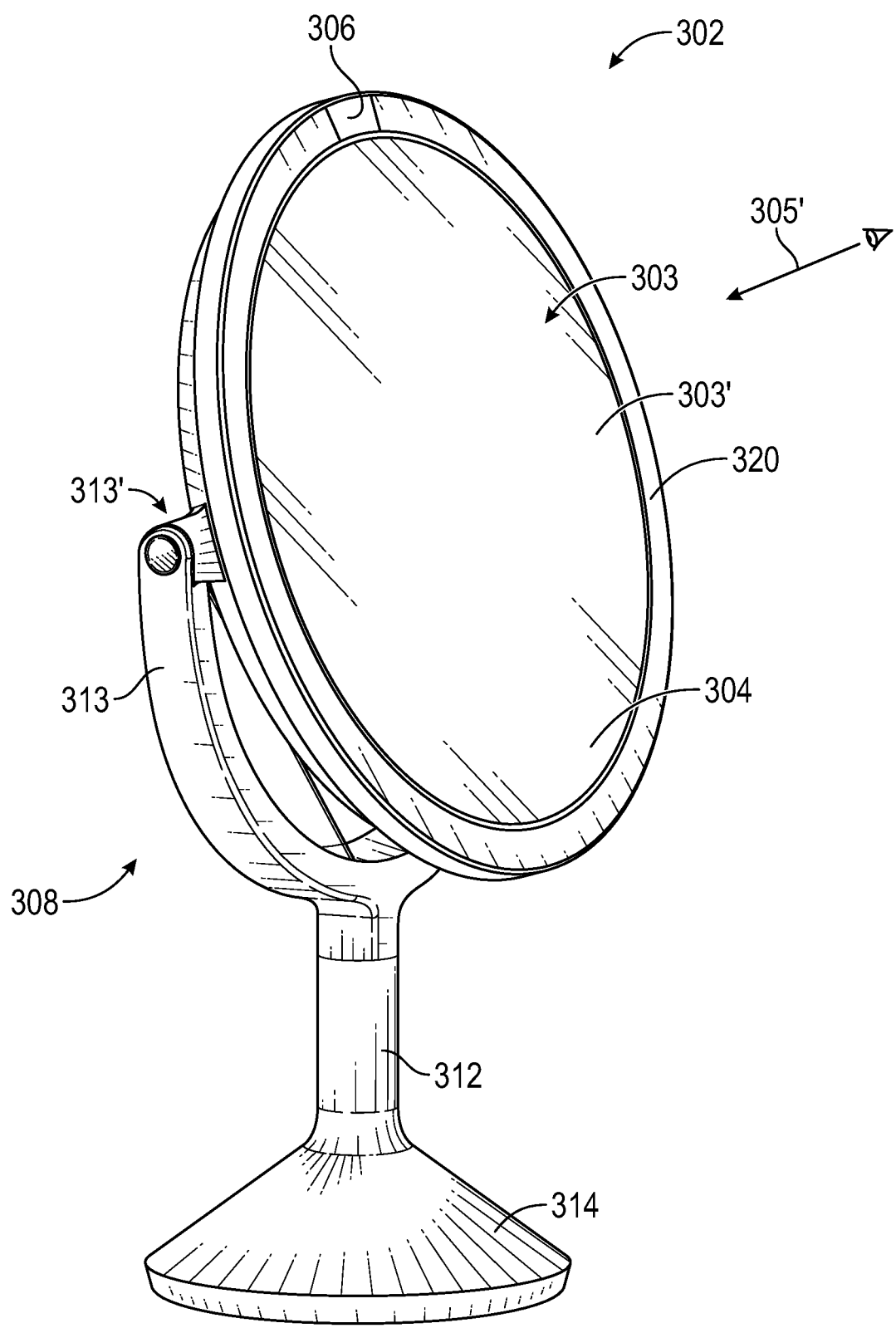
FIG. 26 illustrates a front perspective view of another embodiment of the mirror assembly in a first state.
Figure 27:
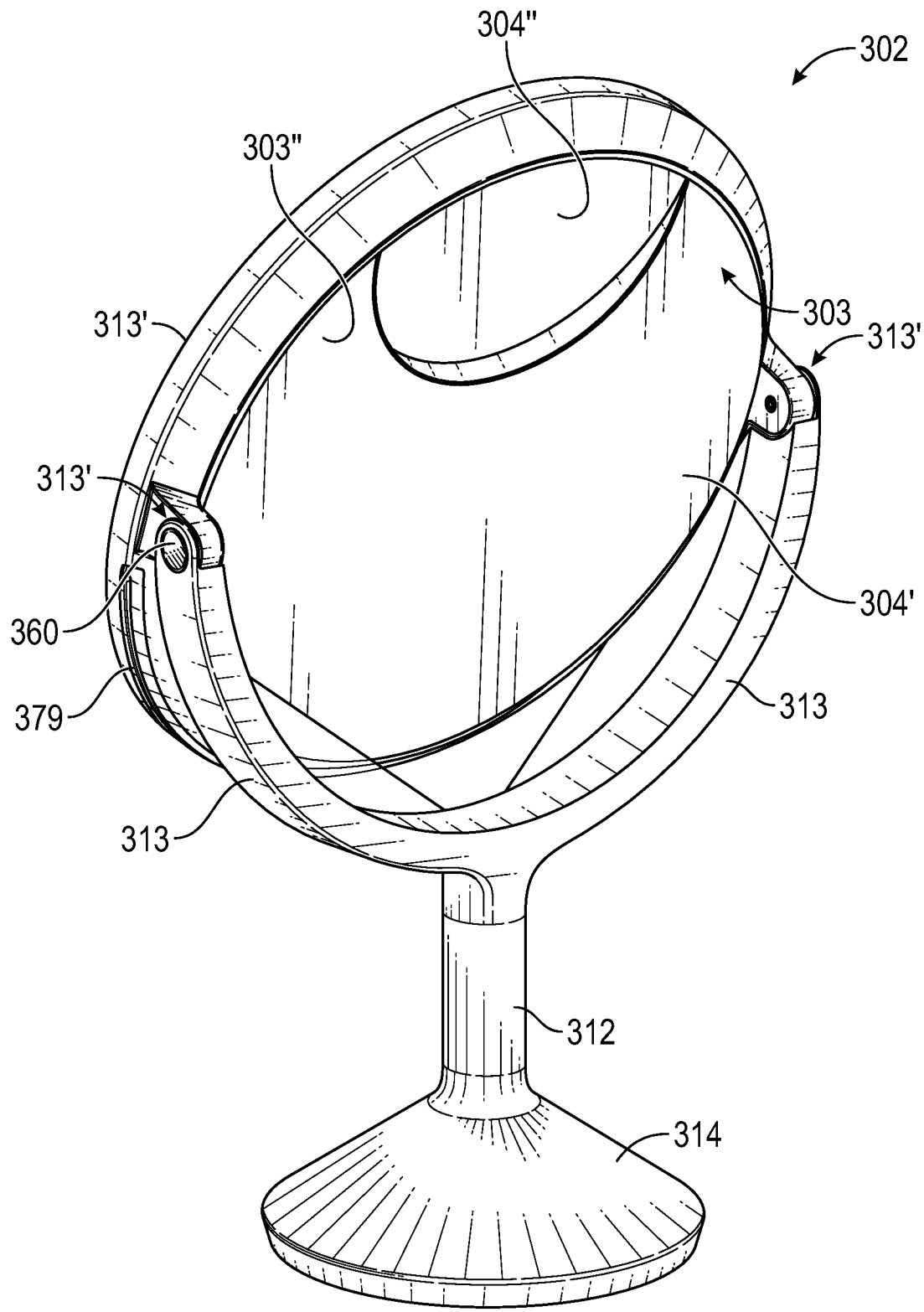
FIG. 27 illustrates a rear perspective view of the mirror assembly shown in FIG. 26.

As shown in FIGS. 26 and 27, the mirror assembly 302 includes a mirror head 303 supported by a support portion 320. The mirror head 303 may have any of the multiple different optical capabilities described above with respect to mirror assembly 102. As illustrated, the support portion 320 at least partially or fully surrounds the mirror head 303. As shown, the support portion 320 may be a ring that fully surrounds the mirror head 303. The mirror head 303 and the support portion 320 may be rotatable relative to each other or fixed in a static position relative to each other.

The support portion 320 may include any of the user interface features described above with respect to mirror assembly 102. For example, the support portion 320 may include an actuator 379, such as a button, wheel, dial, or capacitive touch sensor, to allow the user to control one or more operations of the mirror assembly 302 (see FIG. 27). As shown, the actuator 379 is located along a bottom portion of the support portion 320, but the actuator 379 may be located anywhere along the support portion 320 or elsewhere on the mirror assembly 302.

The mirror head 303 may be connected to a housing portion 308 via the support portion 320 in a manner that permits the mirror head 303 and/or support portion 320 to tilt, rotate, flip, twist, or otherwise move relative to the housing portion 308. The housing portion 308 may include a shaft portion 312 extending from a base portion 314. The housing portion 308 may also include one or more arms 313 extending from the shaft portion 312. The one or more arms 313 may form an interference fit or a friction fit with the shaft portion 312 to hold the one or more arms 313 and the shaft portion 312 stationary relative to each other or at a desired adjustable height. As shown, the mirror assembly 302 may include two arcuate arms 313 extending from an upper end of the shaft portion 312. Together, the arms extend at least 45 degrees and/or less than or equal to about 360 degrees around a periphery of the mirror head 303, for example, between about 90 degrees and about 180 degrees or between about 180 degrees and about 270 degrees. Although the arms 313 in FIGS. 26 and 27 have an arcuate shape, the arms 313 may also be straight or otherwise shaped.

The height and/or angle of the arms 313 may be adjustable relative to the shaft portion 312 using any of the mechanisms described above with respect to mirror assemblies 102, 2. For example, the shaft portion 312 may include one or more biased adjustment structures, such as a spring-loaded mechanism, to adjust the height of the arms 313. When the user wants to adjust the height of the mirror head 303, the user can apply a force that overcomes the biased adjustment structures so the one or more arms 313 can move relative to the shaft portion 312.

The one or more arms 313 may be directly or indirectly connected to one of more portions of the support portion 320 or mirror head 303. For example, the one or more arms 313 may be connected to the support portion 320 or an otherwise peripheral portion of the mirror head 303 that is not in an interior or central region thereof, to permit the mirror head 303, support portion 320, and/or some portion thereof to rotate by a wide angle about an axis that traverses through the mirror head 303, such that the support portion 320 and/or the mirror head 303 may be selectively tilted or rotated. The arms 313 may be connected to the support portion 320 on a front side, rear side, or outermost periphery of the mirror assembly 302.

One or more of the arm 313, the support portion 320, and the mirror head 303 may be tiltable, rotatable, and/or twistable to provide multiple mirror angles with respect to the base portion 314 of the mirror assembly 302. Any of the one or more of the arm 313, the support portion 320, and the mirror head 303 may be fully rotatable 360° about one or more axes or rotatable at a range that is less than 360°, for example rotatable less than or equal to about 270°, less than or equal to about 180°, less than or equal to about 90°, or otherwise. This rotation enables the user to reposition or adjust the mirror image based on or to correspond to the user's height, body position (e.g., sitting or standing), etc. The mirror head 303 and/or support portion 320 may be pivotally attached to the housing portion 308 at one or more pivot portions 313'. For example, as shown in FIGS. 26 and 27, the support portion 320 and mirror head 303 are pivotally attached to the housing portion 308 at two separate pivot portions 313'. When the support portion 320 and mirror head 303 are pivotally attached at two pivot portions 313', the pivot portions 313' may be diametrically opposed from each other. As shown, the pivot portions 313' are positioned along a transverse axis of the mirror head 303 such that the support portion 320 and mirror head 303 may be pivoted about the transverse axis of the mirror head 303, but in other configurations, the pivot portions 313' may be positioned along a longitudinal axis of the mirror head 303 or any other axis oblique to the longitudinal axis of the mirror head 303.

The pivot portions 313' may include one or more of a hinge, a swivel, a ball joint, or other pivoting or rotating connection. The pivot portions 313' allow the support portion 320 and/or mirror head 303 to be pivoted in one or more directions (e.g., up, down, right, left, clockwise, counter-clockwise, etc.). The pivot portions 313' enable positioning of the mirror head 303 and/or support portion 320 at various different angles, where an angle of approximately 0° indicates that the mirror head 303 and/or support portion 320 is substantially vertical and where 90° indicates that the mirror head 303 and/or support portion 320 is substantially horizontal (and directed upwardly). For example, the pivot portions 313' enable positioning of the mirror head 303 at angles of equal to about 0°, equal to or less than about 45°, equal to or less than about 90°, or ranges including and/or spanning the aforementioned values. In some embodiments, the pivot portions 313' can be locked in place and held in a static position (e.g., by using a locking joint) such that the mirror head 303 and/or support portion 320 is fixed at a particular angle equal to about 0°, less than or equal to about 15°, less than or equal to about 40°, less than or equal to 90°, or ranges including and/or spanning the aforementioned values.

Figure 28:
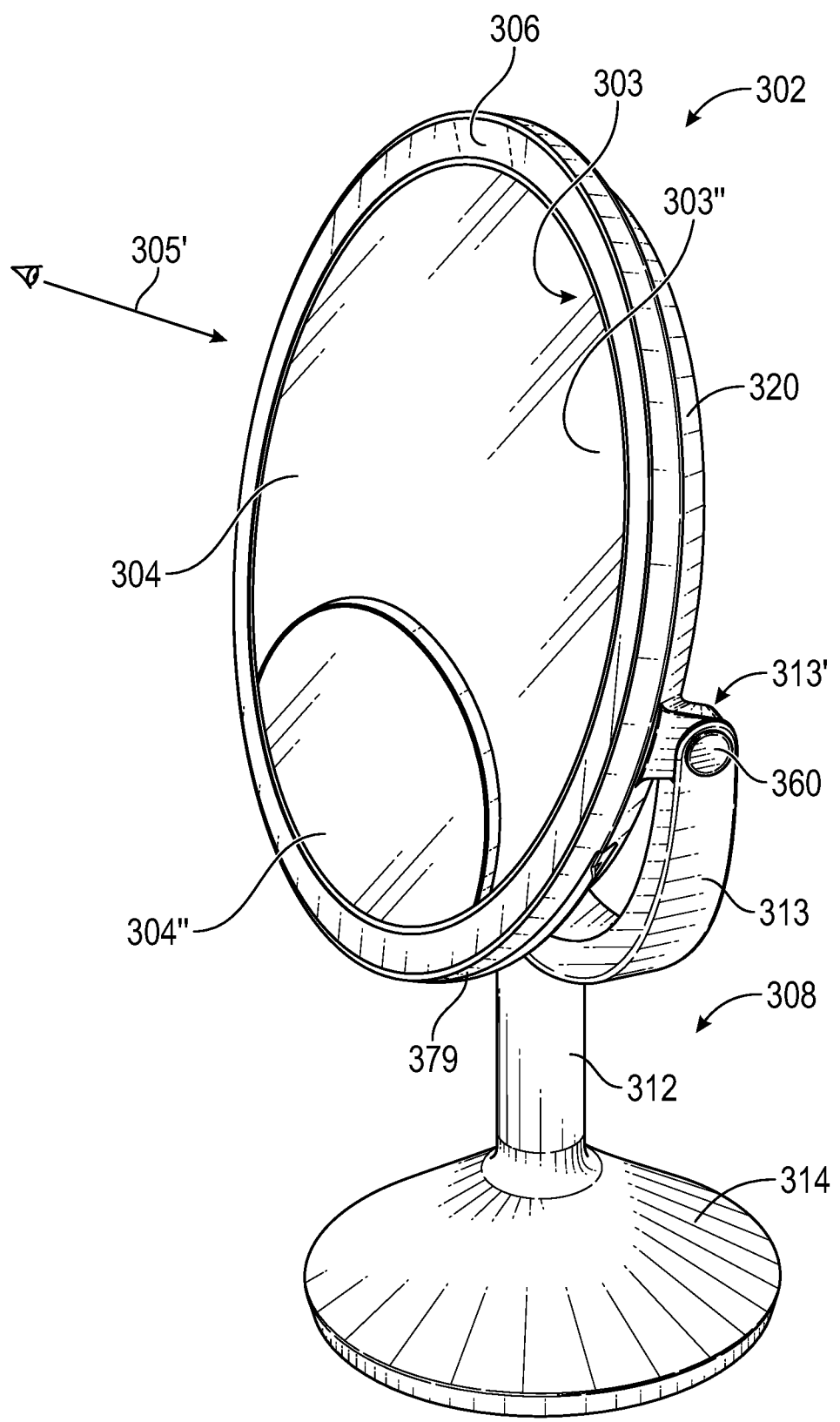
FIG. 28 illustrates a front perspective view of the mirror assembly shown in FIG. 26 in a second state.
Figure 29:
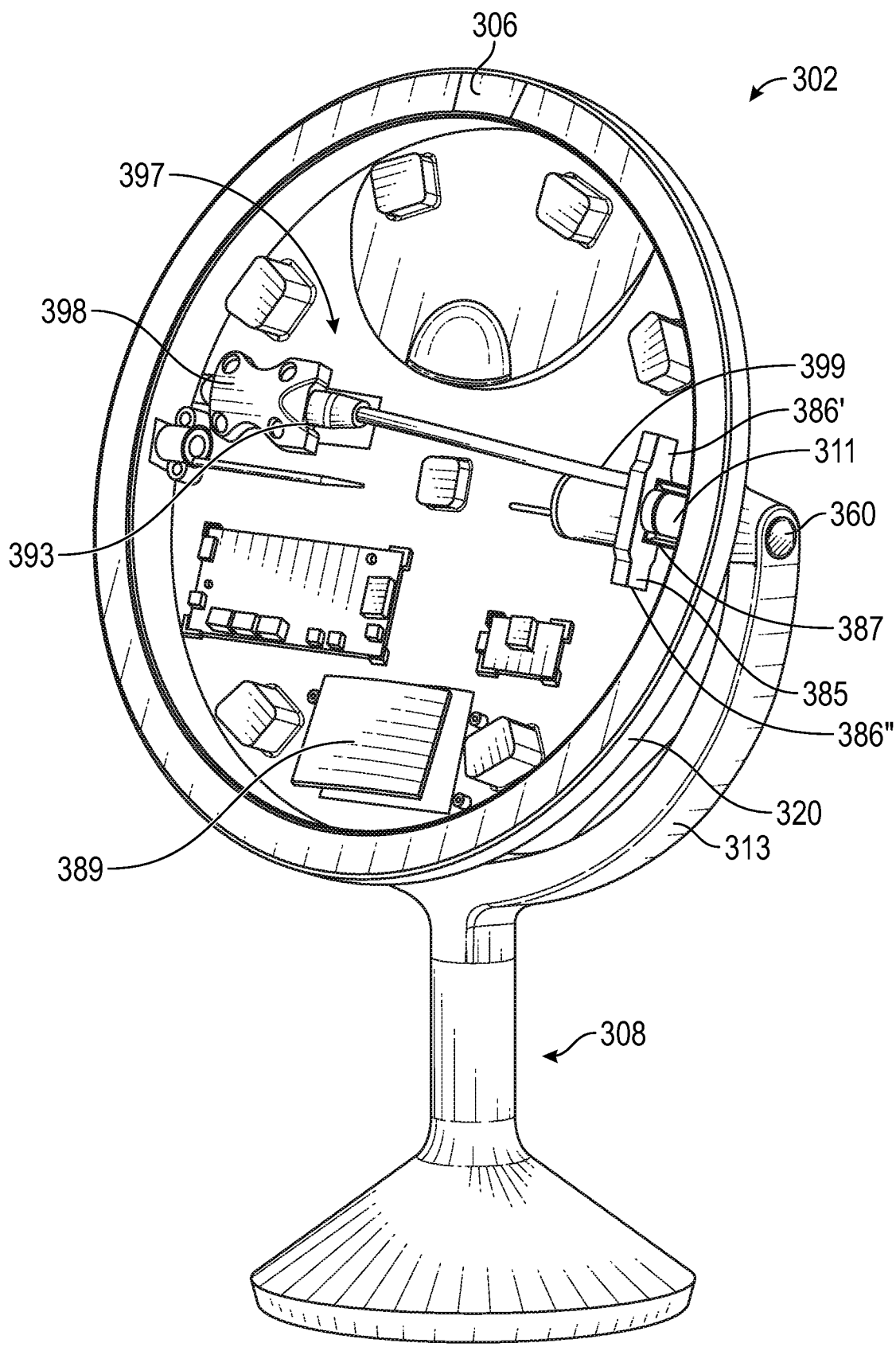
FIG. 29 illustrates the mirror assembly shown in FIG. 26 with the mirror removed.

As shown in FIG. 29, the mirror 304 or the mirror head 303 and the support portion 320 may be attached to each other via one or more pivot assemblies 311 (a hinge, swivel, ball-joint, etc.). FIG. 29 illustrates the mirror assembly 303 with the mirror 304 removed. In some embodiments, the mirror head 303 can be rotated within the support portion 320, for example about the axis of the one or more pivot assemblies 311. This rotation allows the user to transition from the front face 303' (see FIG. 26) to the back face 303" (see FIG. 28) by flipping (e.g., rotating on an axis, etc.) the mirror head 303 within the support portion 320 (e.g., moving the mirror head 303 backward or forward) without movement of the support portion 320. For instance, in some embodiments, the mirror head 303 moves about an axis created by the pivot assembly 311 while the support portion 320 remains in place and/or static. In some embodiments, by using the pivot assembly 311, the mirror head 303 can be rotated in a first direction within the support portion 320 from a start position to an end position. The mirror head 303 can then be rotated back by rotating the mirror head 303 in the opposite, second direction from the end position back to the starting position. Additionally or alternatively, the mirror head 303 can be rotated in the first direction and fully rotated back to the starting position.

In some embodiments, the mirror assembly 302 includes an electrical actuator 360 (e.g., a button, physical dial, switch, capacitive touch sensor, microphone, etc.) for actuating rotation of the mirror head 303 and/or support portion 320. As illustrated, the actuator 360 is positioned at one of the pivot portions 313', but the actuator 360 can be located at various positions about the mirror head 303, support portion 320, or housing portion 308. The actuator 360 may be configured to initiate movement of the mirror head 303 from the front mirror face 303' to the back mirror face 303" (or vice versa), by simply rotating, flipping, turning the mirror head 303 about an axis of the mirror head 103, as described above. In some embodiments, the actuator 360 can be used to rotate the mirror head 303 while the support portion 320 remains in place (e.g., static), without requiring the user to touch any mirror face or side, thus avoiding smudges or finger prints on the mirror face. In some embodiments, such as when the actuator is a microphone, a user can speak a fixed or modifiable command (such as "flip" or "turn" or "other mirror") or make a sound, which can actuate a processor within the mirror assembly 302 to emit an electrical signal to move the mirror head 303 in any desired manner. In some embodiments, where the user is positioned in front 305' of the mirror assembly 302 (shown in FIG. 26) and is viewing the mirror 304 of the front face 303', the user can rotate the mirror head 303 within the support portion 320 to view the back face 303" (shown in FIG. 28). As shown, the mirror head 303 rotates 180°, but the mirror head 303 may rotate to any angle more or less than about 180° Likewise, the front face 303' of the mirror assembly can again be viewed by using the actuator 360 to initiate rotation of the mirror head 303 in the same or opposite direction.

In some embodiments, the actuator 360 actuates an electro-mechanical mechanism to flip the mirror head 303 and/or support portion 320. For example, the mirror assembly 302 can include a drive assembly 397 that includes or is in communication with a computer processor to flip the mirror head 303. As shown in FIG. 29, the drive assembly 397 is disposed within the mirror head 303, but in other embodiments, the drive assembly 397 may be disposed in the support portion 320 or housing portion 308, or in any other suitable location. The drive assembly 397 can include an electric motor 398 and a drive cable 399 or shaft connecting the motor 398 to the pivot assembly 311. When actuated, the motor 398 drives the drive cable 399 to flip the mirror head 303.

Although the motor 398 is illustrated on the opposite side of the mirror head 303 from the pivot assembly 311, in some embodiments, the motor 398 may be directly connected to the pivot assembly or located anywhere within the mirror head 303. As shown, the motor 398 is positioned off-axis from the central axis of the mirror head 303, but in some embodiments, the motor 398 and the drive cable 399 may extend along a central or transverse axis of the mirror head 303. As shown in FIG. 29, the drive assembly 397 only connects to a single pivot assembly 311, but in some embodiments, the drive assembly 397 may be connected to additional pivot assemblies 311, such as two pivot assemblies 311 positioned diametrically opposed from each other.

In some embodiments, the drive cable 399 may be a flexible cable. For example, the flexible cable may be capable of expanding and/or bending, but not rotating or twisting. A first end of the flexible cable may be connected to the motor 398, while the opposite end of the flexible cable may be rotationally fixed or otherwise fixed to the pivot assembly 311. The motor 398 causes the flexible cable to expand and contract, which in turn drives the pivot assembly 311 to flip the mirror head 303. In some embodiments, the drive cable 399 may be a rigid shaft that rotates to flip the mirror head 303. For example, if the motor 398 and drive cable 399 were in line with the one or more pivot assemblies 311, the drive cable 399 may be a rotatable shaft configured to flip the mirror head 303.

In some embodiments, the drive assembly 397 includes one or more sensing elements 393, such as interrupt-type sensors, potentiometers, or otherwise, to detect a position of the mirror head 303. The one or more sensing elements 393 are communicatively (e.g., electrically connected, etc.) connected with a controller, such as a processor or other electrical circuit configured to execute one or more algorithms. The controller can be configured to determine the position of the mirror head 303, such as based on a signal from the one or more sensing elements 393. Based on the detected position of the mirror head 303, the controller can stop the rotational movement of the mirror head 303. For example, when the mirror head 303 arrives at the predetermined position, the controller can deactivate the motor 398.

Additionally or alternatively to the one or more sensing elements 393, the drive assembly 397 may include a bridge 385. As shown in FIG. 29, the bridge 385 includes a first end 386' and a second end 386" with an opening 387 therebetween. The drive cable 399 extends through the opening 387 to the pivot assembly 311. When the user is positioned in front 305' of the mirror assembly 302 and the front face 303' of the mirror head 303 is facing the user, the drive cable 399 contacts the first end 386' of the bridge 385. As the mirror head 303 flips, the relative position of the drive cable 399 within the opening 385 changes until the drive cable 399 contacts the second end 386" of the bridge 385 when the back face 303" of the mirror head 303 is facing the user.

In some embodiments, the mirror assembly 302 may include a clutch mechanism, such as a selectively engageable power and/or torque transfer member. The clutch mechanism can be rotatably engageable (e.g., able to be engaged and disengaged) with the mirror head 303 or the drive assembly 397. The clutch mechanism can be configured to receive torque from the motor 398, such as via the drive cable 399, and to transmit the torque to the pivot assembly 311 to move the mirror head 303 between the front face 303' and the back face 303". The drive assembly 397 and the clutch member can be configured to allow a user to manually move (e.g., push, pull, rotate, translate, lift, etc.) the mirror head 303 between the between the front face 303' and the back face 303" substantially without applying a force (e.g., torque) to at least one of: the motor 398, the drive cable 399, and the clutch mechanism. Similarly, if a user interrupts the motion of the mirror head 303 in its path of travel by manually halting, speeding up, or slowing down the mirror head 303, the clutch member can temporarily disengage the mirror head 303 from driving mechanical engagement with one or more components of the drive assembly 397 to resist or avoid damage to the mirror head 303 or the drive assembly 397. The clutch mechanism can be configured to move (e.g., rotate, translate, slide, etc.) when the mirror head 303 flips between the front face 303' and the back face 303" without operation of the driving mechanism (e.g., generally without rotational movement of the motor 398 and/or the drive cable 399).

The actuator 360 can alternatively or additionally be provided with one or more internal electronic components (e.g., one or more switches or dials) in electronic communication with a controller that are configured to actuate or adjust one or more electronic parameters or features of the mirror assembly. For example, the actuator 360 interacts with a controller configured to actuate or adjust the intensity, brightness, color, and/or temperature of the light emitted by the mirror or any other adjustable light or display variable disclosed herein.

The mirror assembly 302 may include one or more electronic displays 389 (e.g., a virtual display, LCD, OLED, LED, or the like). As shown in FIG. 29, the display 389 may be mounted within the mirror head 303 such that it can be viewed through at least one of the mirrors 304, 304', 304" (e.g., through a physical opening in the mirror or through one or more panes or layers of the mirror). Although the display 389 is shown within the mirror head 303, the display 389 may be positioned anywhere, such as external to the mirror head 303 or as part of the support portion 320 or housing portion 308. The one or more displays 389 can display different types of content or current information, such as the time, weather, calendar reminders, news alerts, alarms, social media posts, stock information, texts, traffic status, etc.

The display 389 can be controlled in any manner described herein. For example, the display 389 may be activated by the proximity sensor 306 and remain activated so long as the proximity sensor 306 detects the user. In some embodiments, the display 389 can receive user input through one or more actuators. The user input can be used by the display processor to adjust or modify one or more parameters of the display 389, such as by changing the type of content displayed (e.g., switching between different types of information displayed or selecting new information), or changing the manner of displaying the content on the display 389. As another example, the display 389 may be activated by one of the actuators 360, 379 or by a separate and distinct actuator. Any of the actuators 360, 379 may control one or more display features, for example by controlling or cycling the type of content to be displayed. For example, the display features may be activated and/or altered from a first type of content to a different type of content by touching, swiping, and/or otherwise gesturing near one of the actuators 360, 379.

The mirror assembly 402 can include one or more of the features described in connection with the mirror assemblies 2, 102, 302 including but not limited to, any of the optical, lighting, sensing, charging, user interface, wireless communication, and/or other operational capabilities described above. Where features of one embodiment correspond with features of another embodiment (e.g., are the same, substantially the same, achieve the same or similar purposes, etc.), those features are offset numerically by factors of 100 (while having the same ones and tens numerical value). As an illustration, feature 303 of mirror assembly 302 can correspond to feature 403 of mirror assembly 402.

Figure 30:
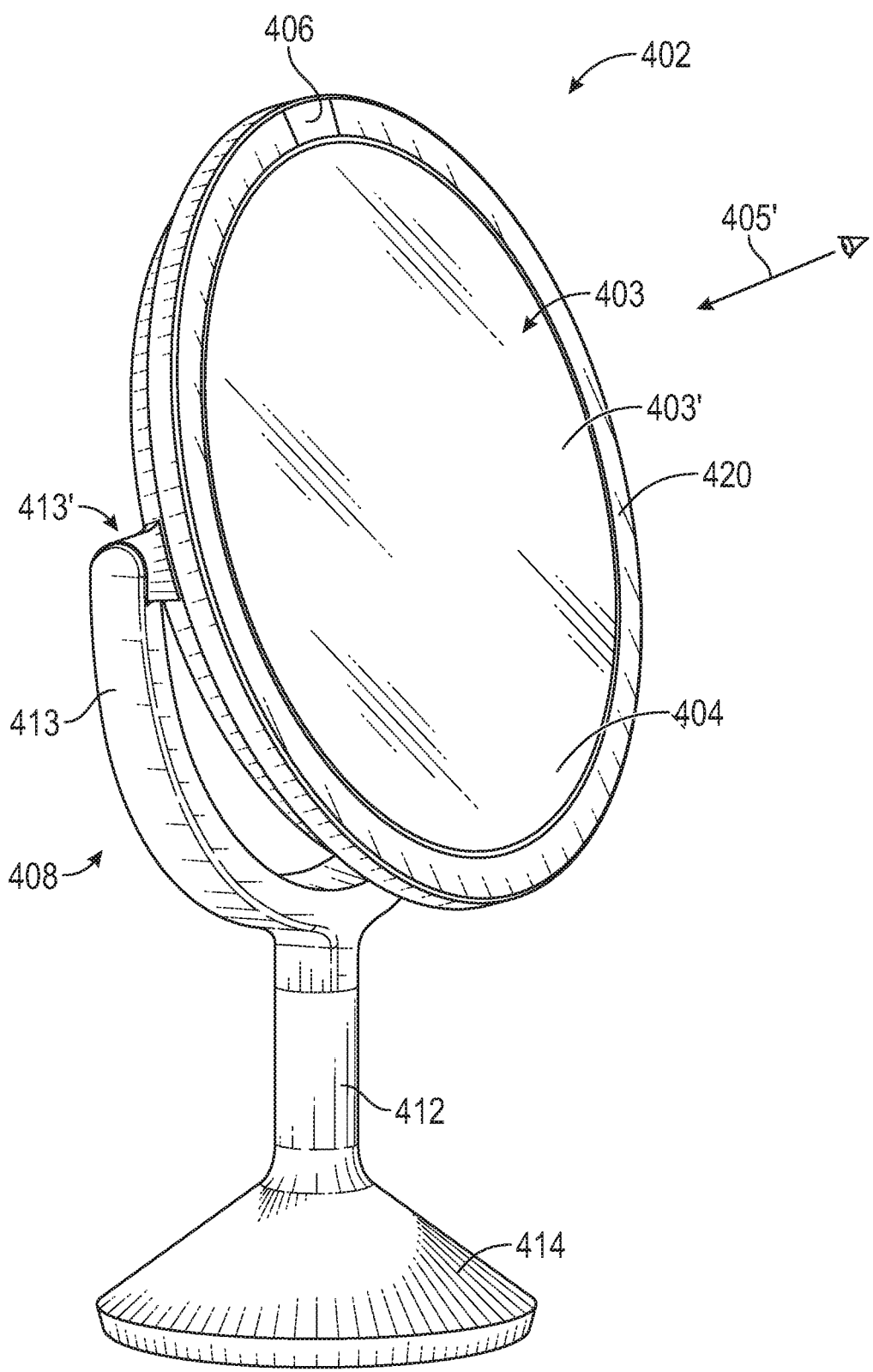
FIG. 30 illustrates a front perspective view of another embodiment of the mirror assembly in a first state.
Figure 31:
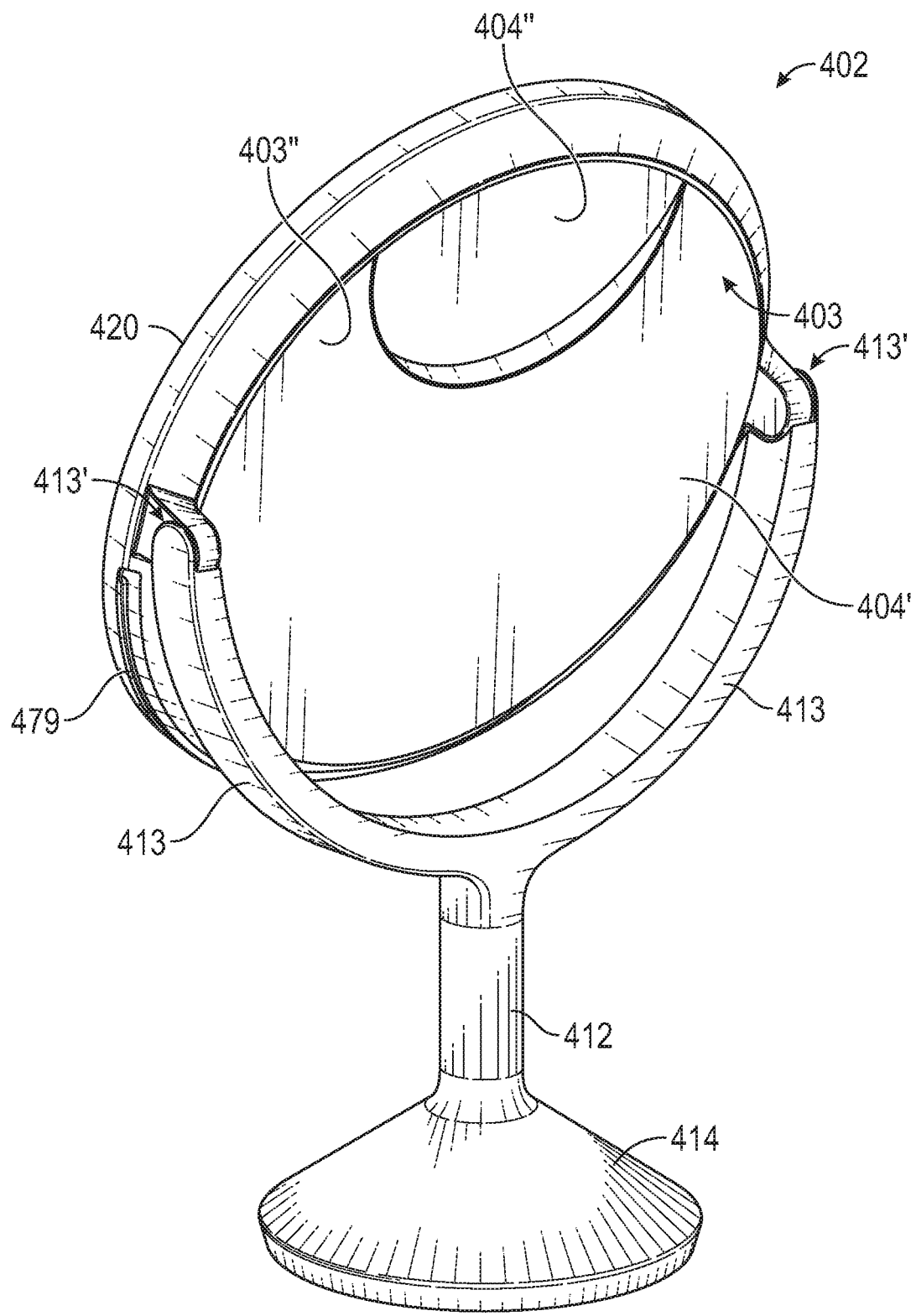
FIG. 31 illustrates a rear perspective view of the mirror assembly shown in FIG. 30.

As shown in FIGS. 30 and 31, the mirror assembly 402 includes a mirror head 403 supported by a support portion 420. The mirror head 403 may have any of the multiple different optical capabilities described above with respect to mirror assembly 102. The support portion 420 at least partially or fully surrounds the mirror head 403. As shown, the support portion 420 may be a ring that fully surrounds the mirror head 403. The mirror head 403 and the support portion 420 may be rotatable relative to each other or fixed in a static position relative to each other.

The mirror head 403 may be connected to a housing portion 408 via the support portion 420 in a manner that permits the mirror head 403 and/or support portion 420 to tilt, rotate, flip, twist, or otherwise move relative to the housing portion 408. The housing portion may include a shaft portion 412 extending between a base portion 414 and one or more arms 413. The one or more arms 413 may extend from the shaft portion 412 to the mirror head 403 and/or support portion 420. The housing portion 408 may include any of the features described above with respect to the housing portion 308, including but not limited to, the features of the base 314, the shaft portion 312, and/or the one or more arms 313 and their connection to the mirror head 303 and/or support portion 320.

The mirror head 403 and/or support portion 420 may be pivotally attached to the housing portion 408 at one or more pivot portions 413'. For example, as shown in FIGS. 30 and 31, the support portion 420 and the mirror head 403 are pivotally attached to the housing portion 408 at two separate pivot portions 413'. When the support portion 420 and mirror head 403 are pivotally attached at two pivot portions 413', the pivot portions 413' may be diametrically opposed from each other. As shown, the pivot portions 413' are positioned along a transverse axis of the mirror head 403 such that the support portion 420 and mirror head 403 may be pivoted about the transverse axis of the mirror head 403, but in other configurations, the pivot portions 413' may be positioned along a longitudinal axis of the mirror head 403 or any other axis oblique to the longitudinal axis of the mirror head 403.

The pivot portions 413' may include one or more of a hinge, a swivel, a ball joint, or other pivoting or rotating connection. The pivot portions 413' allow the support portion 420 and/or mirror head 403 to be pivoted in one or more directions (e.g., up, down, right, left, clockwise, counterclockwise, etc.). The pivot portions 413' enable positioning of the mirror head 403 and/or support portion 420 at any angle about the axis of rotation. An angle of approximately 0° indicates that the mirror head 403 and/or support portion 420 is substantially vertical and where 90° indicates that the mirror head 403 and/or support portion 420 is substantially horizontal (and directed upwardly). In some embodiments, the pivot portions 413' can be locked in place and held in a static position at any angle about the axis of rotation (e.g., by using a locking joint). The mirror head 403 and/or the support portion 420 may be rotatable at least 45 degrees (e.g., at least 90 degrees, at least 120 degrees, at least 180 degrees, or at least 270 degrees) about axis of rotation through the pivot portions 413'.

Figure 32:
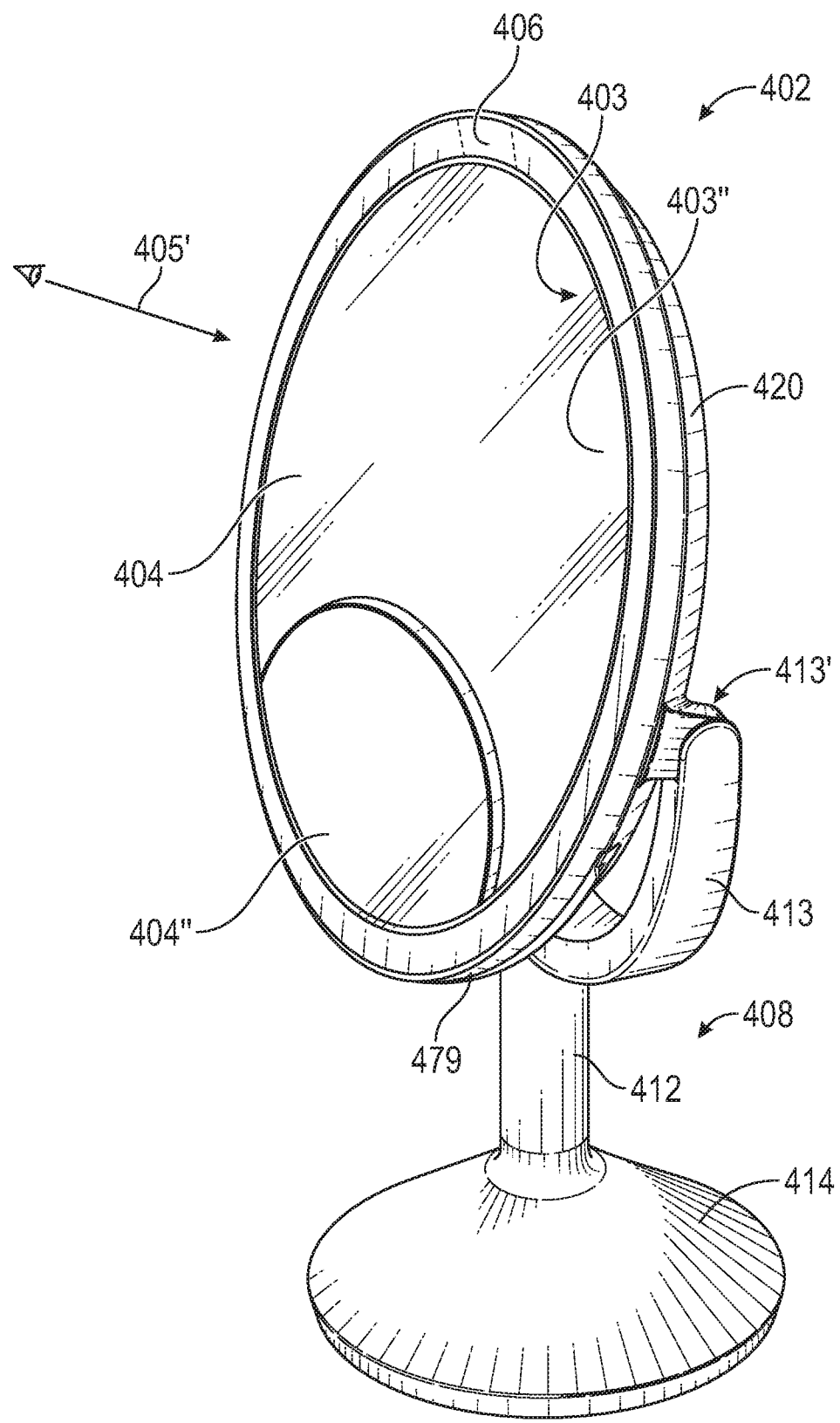
FIG. 32 illustrates a front perspective view of the mirror assembly shown in FIG. 30 in a second state.
Figure 33:
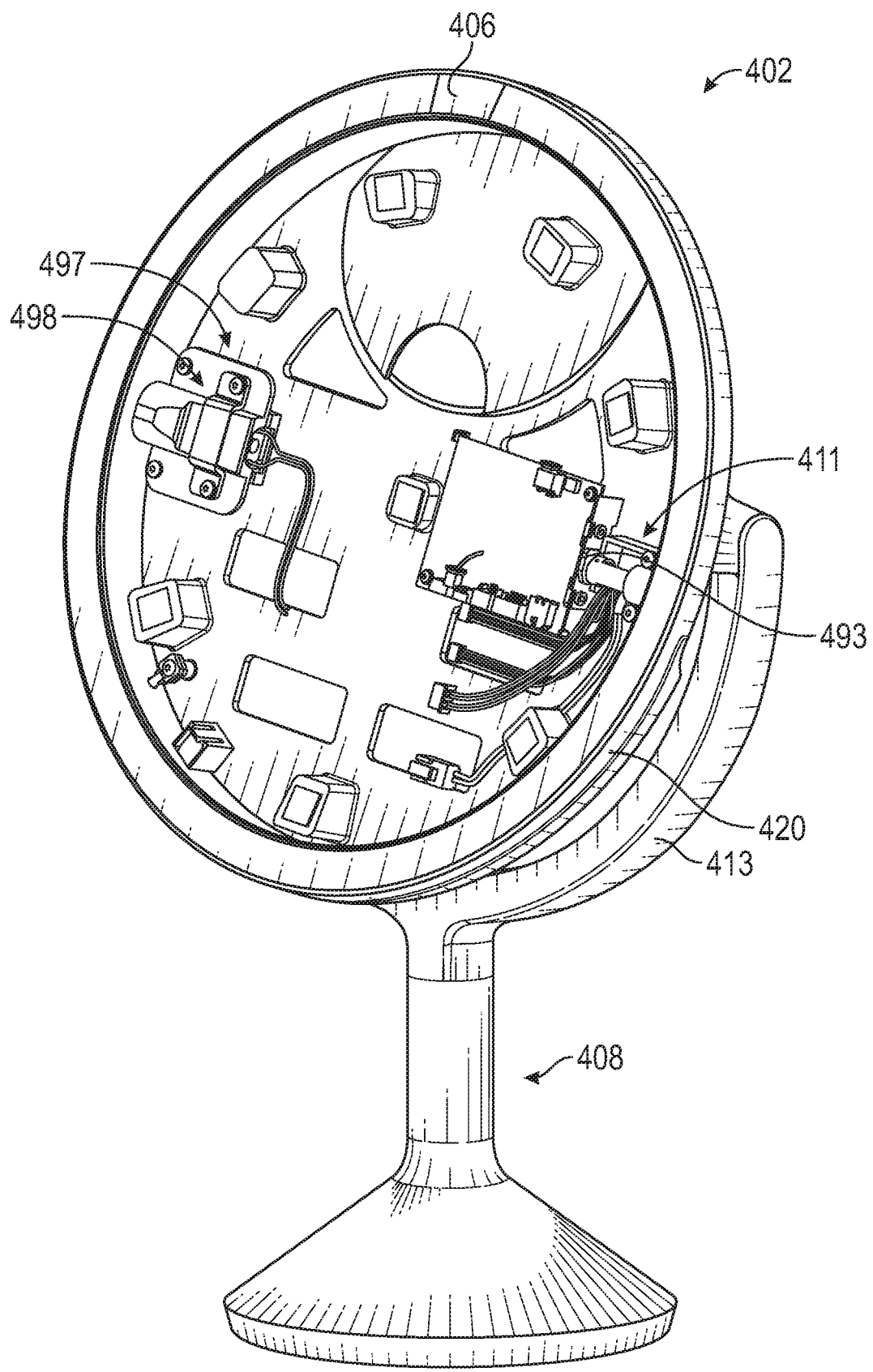
FIG. 33 illustrates the mirror assembly shown in FIG. 30 with the mirror removed.

As shown in FIG. 33, the mirror 404 or the mirror head 403 and the support portion 420 may be attached to each other via one or more pivot assemblies 411 (a hinge, swivel, ball-joint, etc.). FIG. 33 illustrates the mirror assembly 403 with the mirror 404 removed. In some embodiments, the mirror head 403 can be rotated within the support portion 420, for example about the axis of the one or more pivot assemblies 411. This rotation allows the user to transition from the front face 403' (see FIG. 30) to the back face 403" (see FIG. 32) by flipping (e.g., rotating on an axis of the one or more pivot assemblies 411, etc.) the mirror head 403 within the support portion 420 (e.g., moving the mirror head 303 backward or forward) without movement of the support portion 420 and/or the housing portion 408. For instance, in some embodiments, the mirror head 403 moves about an axis created by the one or more pivot assemblies 411 while the support portion 420 remains in place and/or static. In some embodiments, by using the one or more pivot assemblies 411, the mirror head 403 can be rotated in a first direction within the support portion 420 from a start position to an end position. The mirror head 403 can then be rotated back by rotating the mirror head 403 in the opposite, second direction from the end position back to the starting position. Additionally or alternatively, the mirror head 403 can be rotated in the first direction and fully rotated back to the starting position. As illustrated, the pivot assembly 411 creates a transverse axis of rotation, but in other configurations, the one or more pivot assemblies 411 may be located anywhere around the mirror assembly 402 to create a different axis of rotation, for example in the longitudinal direction.

The mirror assembly 402 actuates an electro-mechanical mechanism to flip the mirror head 403 and/or support portion 420. For example, the mirror assembly 402 can include a drive assembly 497 that includes or is in communication with a computer processor to flip the mirror head 403. The drive assembly 497 may include any features of the drive assembly 397, including but not limited to the actuation features, sensing features, and/or processing features. As shown in FIG. 33, the drive assembly 497 is disposed within the mirror head 403, but in other embodiments, the drive assembly 497 may be disposed in the support portion 420 or housing portion 408, or in any other suitable location. The drive assembly 497 can include an electric motor 498 directly or indirectly connected to at least one of the one or more pivot assemblies 411. As shown in FIG. 33, the drive assembly 497 only connects to a single pivot assembly 411, but in some embodiments, the drive assembly 497 or additional drive assemblies 497 may be connected to additional pivot assemblies 411, such as two pivot assemblies 411 positioned diametrically opposed from each other. The motor can operate at less than 100 rpm, for example at least about 25 rpm and/or less than or equal to about 75 rpm or at least about 40 rpm and/or less than or equal to about 60 rpm, such as about 50 rpm. The drive assembly 497 (e.g., the motor and/or gear box drive mechanism) is at least about 200 gf-cm and/or less than or equal to about 400 gf-cm, for example between about 250 gf-cm and about 350 gf-cm, such as about 300 gf-cm.

In some embodiments, the mirror assembly 402 may include a clutch mechanism, such as a selectively engageable power and/or torque transfer member. The clutch mechanism can be rotatably engageable (e.g., able to be engaged and disengaged) with the mirror head 403 or the drive assembly 497. The drive assembly 497 and the clutch mechanism can be configured to allow a user to manually move (e.g., push, pull, rotate, translate, lift, etc.) the mirror head 403 between the between the front face 403' and the back face 403" substantially without applying a force (e.g., torque) to at least one of: the motor 498 and the clutch mechanism. Similarly, if a user interrupts the motion of the mirror head 403 in its path of travel by manually halting, speeding up, or slowing down the mirror head 403, the clutch mechanism can temporarily disengage the mirror head 403 from driving mechanical engagement with one or more components of the drive assembly 497 to resist or avoid damage to the mirror head 403 or the drive assembly 497. The clutch mechanism can be configured to move (e.g., rotate, translate, slide, etc.) when the mirror head 403 flips between the front face 403' and the back face 403" without operation of the driving mechanism (e.g., generally without rotational movement of the motor 498).

In some embodiments, the mirror assembly 402 includes one or more sensing elements 493, such as interrupt-type sensors, potentiometers, or otherwise, to detect a position of the mirror head 403. The one or more sensing elements 493 may be on an opposite side of the mirror head 403 from the motor 498, adjacent the motor 498, or positioned anywhere in the mirror head 403. For example, the motor 498 may be adjacent one pivot assembly 411, while the one or more sensing elements 493 are adjacent to the other pivot assembly 411. The one or more sensing elements 493 may be communicatively (e.g., electrically connected, etc.) connected with a controller, such as a processor or other electrical circuit configured to execute one or more algorithms. The controller may be configured to determine the position of the mirror head 403, such as based on a signal from the one or more sensing elements 493. For example, the one or more sensing elements 493 may include a potentiometer. As the mirror head 403 turns, a shaft engaged with the potentiometer can change the resistance of the potentiometer and generate a signal in relation to angular displacement. Based on the detected position of the mirror head 403, the controller can stop the rotational movement of the mirror head 403. For example, when the mirror head 403 arrives at the pre-determined position, the controller can deactivate the motor 498.

The support portion 420 may include any of the user interface features described above with respect to mirror assembly 102. For example, the support portion 420 may include an actuator 479, such as a button, wheel, dial, capacitive touch sensor, or motion sensor to allow the user to control one or more operations of the mirror assembly 402 (see FIG. 31). In some embodiments, the actuator 479 may not require any physical contact with the actuator 479 to control one or more operations of the mirror assembly 402. As shown, the actuator 479 is located along a bottom portion of the support portion 420, but the actuator 479 may be located anywhere along the support portion 420, housing portion 408, or elsewhere on the mirror assembly 402. As illustrated, the actuator 479 is the sole user actuator or interface on the mirror assembly 402 for controlling any of the mirror operations (e.g., display, sound, lighting, etc.), but in other embodiments, the mirror assembly 402 may include additional actuators as described above.

Rotation of the mirror head 403 and/or the support portion 420 may be actuated by the actuator 479. The actuator 479 may be configured to initiate movement of the mirror head 403 from the front mirror face 403' to the back mirror face 403" (or vice versa), by rotating, flipping, turning the mirror head 403 about an axis of the mirror head 403, as described above. In some embodiments, the actuator 479 can be used to rotate the mirror head 403 while the support portion 420 remains in place (e.g., static), without requiring the user to touch any mirror face or side, thus avoiding smudges or finger prints on the mirror face. In some embodiments, such as when the actuator 479 is a capacitive touch sensor or motion sensor, a user can make a hand gesture (such as one or more touches, swipes, waves, or other gestures), which can actuate a processor within the mirror assembly 402 to emit an electrical signal to move the mirror head 403 in any desired manner. In some embodiments, where the user is positioned in front 405' of the mirror assembly 402 (shown in FIG. 30) and is viewing the mirror 404 of the front face 403', the user can rotate the mirror head 403 within the support portion 420 to view the back face 403" (shown in FIG. 30). The mirror head 403 may be rotatable 360°, or limited to rotation less than 360°, for example the mirror head 403 may be limited to 180° rotation. Likewise, the front face 403' of the mirror assembly can again be viewed by causing the actuator 479 to initiate rotation of the mirror head 403 in the same or opposite direction, for example with the same or different hand gesture as the initial rotation. As an example, a single touch or tap may cause the mirror head 403 to rotate between the front face 403' and the back face 403". In other examples, a swipe or gesture in a first direction may cause the mirror head 403 to rotate from the front face 403' to the back face 403". The same or opposite swipe or gesture may cause the mirror head 403 to rotate from the back face 403" back to the front face 403'.

The actuator 479 can alternatively or additionally be provided with one or more internal electronic components (e.g., one or more switches or dials) in electronic communication with a controller that are configured to actuate or adjust one or more electronic parameters or features of the mirror assembly (e.g., display, sound, or light features). For example, the same actuator 479 may with a controller configured to actuate or adjust the intensity, brightness, color, and/or temperature of the light emitted by the mirror or any other adjustable light or display variable disclosed herein. Different hand motions may be used to actuate different control features.

Although not shown, the mirror assembly 402 may include a display including any of the features described in the previous embodiments. The display may be actuated by the actuator 479 or a separate user interface on the display itself.

Certain aspects of this disclosure are directed toward methods of manufacturing a mirror assembly, such as any of the mirror assemblies disclosed in this specification. The methods can include any one of coupling a mirror and a housing portion, inserting a handle into the support portion or mirror head, attaching the mirror head to a support portion, attaching the support portion to an arm, attaching an arm to a shaft, attaching a shaft to a base, etc. The method can include disposing a light source at a periphery of the mirror. The method can include positioning a light pipe around at least a portion of the periphery of the mirror. The method can include disposing a plurality of light scattering elements along the length of a light pipe. In certain embodiments, the plurality of light scattering elements can have a pattern density. The light scattering elements can be configured to encourage a portion of the light impacting the light scattering elements to be emitted out of the light pipe. The pattern density can be less dense in a region generally adjacent the light source, and the pattern density can be more dense in a region generally opposite from, spaced from, or furthest from, the light source along the periphery of the mirror, thereby facilitating a substantially constant amount of light emitted along the length of the light pipe. In certain embodiments, the method can include positioning the light source near an upper portion of the mirror. In certain embodiments, the method can include positioning the light source to emit light in a direction generally orthogonal to a main viewing direction of the mirror. In certain embodiments, the method can include positioning the light source to emit light into a first end of the light pipe and positioning another light source to emit light into a second end of the light pipe. In certain embodiments, the method can include disposing the light scattering elements in a generally uniform pattern along at least a portion of the light pipe. The methods can include coupling a mirror with a housing portion. The methods can include disposing one or more light sources at a periphery of the mirror. The methods can include configuring a proximity sensor to generate a signal indicative of a distance between an object and the proximity sensor. The methods can include configuring an electronic processor to generate an electronic signal to the one or more light sources for emitting a level of light that varies depending on the distance between the object and the sensor.

Some methods can include positioning the proximity sensor generally near a top region of the mirror. The methods can include configuring the electronic processor to generate an electronic signal to the one or more light sources to deactivate if the proximity sensor does not detect the object for a period of time. The methods can include configuring the proximity sensor to have increased sensitivity after the proximity sensor detects the object. The methods can include configuring an ambient light sensor to detect a level of ambient light. The methods can include configuring the proximity sensor to detect an object within a sensing region extending from about 0 degrees to about 45 degrees downward relative to an axis extending from the proximity sensor. The methods can include mounting the proximity sensor at an angle relative to a viewing surface of the mirror. The methods can include positioning a lens cover near the proximity sensor. In certain embodiments, the method can include positioning a front surface of the lens cover at an angle relative to the proximity sensor. The methods can include disposing a light pipe along substantially all of the periphery of the mirror. The light pipe can be configured to receive light from the one or more light sources and distribute the light generally consistently along the length, thereby providing a substantially constant level of illumination to the periphery of the mirror.

Certain aspects of this disclosure are directed toward a mirror assembly having a housing portion, a mirror, one or more light sources, a proximity sensor, and an electronic processor. The mirror can be coupled with the housing portion. The one or more light sources can be disposed at a periphery of the mirror. The proximity sensor can be configured to detect an object within a sensing region. The proximity sensor can be configured to generate a signal indicative of a distance between the object and the proximity sensor. The electronic processor can be configured to generate an electronic signal to the one or more light sources for emitting a level of light that varies depending on the distance between the object and the sensor.

SUMMARY

Several illustrative embodiments of mirror assemblies and methods manufacturing have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment, flowchart, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

Some embodiments have been described in connection with the accompanying drawings. Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various components in the implementations described above should not be understood as requiring such separation in all implementations, and it should be understood that the described components and systems can generally be integrated together in a single product or packaged into multiple products. Additionally, other implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Any of the vanity mirror features, structures, steps, or processes disclosed in this specification can be included in any embodiment. For example, the proximity sensor can be positioned generally near a top region or a bottom region of the mirror. The electronic processor can be configured to generate an electronic signal to the one or more light sources to deactivate if the proximity sensor does not detect the presence and/or movement of the object for a predetermined period of time. The proximity sensor can be configured to have increased sensitivity after the proximity sensor detects the object (e.g., by increasing the trigger zone distance, by increasing the sensitivity to movement within a trigger zone, and/or by increasing the time period until deactivation). The mirror assembly can include an ambient light sensor configured to detect a level of ambient light. In some embodiments, the sensing region can extend from about 0 degrees to about 45 degrees downward relative to an axis extending from the proximity sensor. The proximity sensor can be mounted at an angle relative to a viewing surface of the mirror. The mirror assembly can include a lens cover positioned near the proximity sensor. In certain embodiments, a front surface of the lens cover can be positioned at an angle relative to the proximity sensor. The mirror assembly can include a light pipe having a length and being disposed along substantially all of the periphery of the mirror. The light pipe can be configured to receive light from the one or more light sources and distribute the light generally consistently along the length, thereby providing a substantially constant level of illumination to the periphery of the mirror.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable. In many embodiments, the mirror system may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible.

In summary, various embodiments and examples of vanity mirrors and methods of manufacturing the same have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

The following is claimed:

1. A mirror assembly comprising:
   a mirror head comprising a front side and a back side;
   a housing portion;
   a support portion coupled to the housing portion and positioned around at least a portion of a periphery of the mirror head;
   a pivot assembly configured to allow rotation of the mirror head about an axis formed by the pivot assembly;
   a drive assembly disposed within the mirror head, the drive assembly configured to rotate the mirror head about the axis formed by the pivot assembly; and
   an actuator configured to initiate the drive assembly to rotate the mirror head.

2. The mirror assembly of claim 1, wherein the pivot assembly is configured to allow rotation of the mirror head relative to the support portion.

3. The mirror assembly of claim 1, wherein the support portion is configured to tilt relative to the housing portion.

4. The mirror assembly of claim 1, wherein the drive assembly comprises a motor and a drive shaft.

5. The mirror assembly of claim 1, further comprising a sensing element configured to provide an indication of a position of the mirror head.

6. The mirror assembly of claim 5, wherein the sensing element is a potentiometer.

7. The mirror assembly of claim 5, further comprising a controller configured to stop rotation of the mirror head based on the indication of the position of the mirror head.

8. The mirror assembly of claim 1, further comprising a clutch mechanism configured to receive torque from the drive assembly so as to rotate the mirror head, the clutch mechanism being configured to move relative to the drive assembly when the mirror head is rotated generally without operation of the drive assembly.

9. The mirror assembly of claim 1, wherein the actuator is a button.

10. The mirror assembly of claim 1, wherein the actuator is a capacitive touch sensor.

11. The mirror assembly of claim 1, further comprising a display.

12. The mirror assembly of claim 11, wherein the display is mounted within the mirror head such that content on the display can be viewed through a mirror on the front side of the mirror head.

13. A mirror assembly comprising:
a housing portion;
a mirror head comprising a front side and a back side;
a support portion coupled to the housing portion and positioned around at least a portion of a periphery of the mirror head, the support portion comprising at least one light source configured to emit light; and
an actuator configured to initiate rotation of the mirror head between the front side and the back side, the actuator configured to control a parameter of the light emitted from the at least one light source.

14. The mirror assembly of claim 13, further comprising a display, wherein the actuator is configured to control a parameter of the display.

15. The mirror assembly of claim 13, wherein the actuator is a capacitive touch sensor.

16. The mirror assembly of claim 13, further comprising:
a pivot assembly configured to allow rotation of the mirror head about an axis formed by the pivot assembly; and
a drive assembly disposed within the mirror head, the drive assembly configured to rotate the mirror head about the axis formed by the pivot assembly.

17. The mirror assembly of claim 16, wherein the drive assembly comprises a motor and a drive shaft.

18. The mirror assembly of claim 16, further comprising a clutch mechanism configured to move relative to the drive assembly when the mirror head is rotated generally without operation of the drive assembly.

19. The mirror assembly of claim 16, further comprising a sensing element configured to provide an indication of a position of the mirror head.

20. The mirror assembly of claim 19, wherein the sensing element is a potentiometer.

\* \* \* \* \*